(12) United States Patent
Liu et al.

(10) Patent No.: US 10,341,067 B2
(45) Date of Patent: Jul. 2, 2019

(54) TRANSMISSION DEVICE AND METHOD FOR TRANSMITTING DATA FRAME

(71) Applicant: Huawei Technologies Co., Ltd., Shenzhen (CN)

(72) Inventors: Le Liu, Shenzhen (CN); Zhou Lan, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 15/418,462

(22) Filed: Jan. 27, 2017

(65) Prior Publication Data

US 2017/0141888 A1 May 18, 2017

Related U.S. Application Data

(63) Continuation of application No. PCT/CN2014/096007, filed on Dec. 31, 2014.

(30) Foreign Application Priority Data

Jul. 31, 2014 (WO) ................ PCT/CN2014/083483

(51) Int. Cl.
*H04L 5/00* (2006.01)
*H04W 84/12* (2009.01)
(Continued)

(52) U.S. Cl.
CPC ............ *H04L 5/0023* (2013.01); *H04B 1/707* (2013.01); *H04L 25/0204* (2013.01); *H04L 27/2634* (2013.01); *H04W 84/12* (2013.01)

(58) Field of Classification Search
CPC ............... H04L 5/0023; H04L 25/0204; H04L 27/2634; H04W 84/12; H04B 1/707
See application file for complete search history.

(56) References Cited

U.S. PATENT DOCUMENTS 8,611,477 B1 12/2013 Nabar et al.
2007/0258541 A1 11/2007 Yamaura
(Continued)

FOREIGN PATENT DOCUMENTS

CN      1937598 A     3/2007
CN      101064543 A   10/2007
(Continued)

OTHER PUBLICATIONS

Notice of Allowance KR 10-2017-7004742 dated Mar. 29, 2019.

*Primary Examiner* — Ajay Cattungal
(74) *Attorney, Agent, or Firm* — Leydig, Voit & Mayer, Ltd.

(57) ABSTRACT

A transmission device includes: an acquiring unit acquires LTF parameters, and acquires a start position I of allocated subcarriers, where the LTF parameters include a frequency domain transform parameter and a time domain transform parameter that are required for generating an LTF sequence; a frequency domain transform unit performs, according to the frequency domain transform parameter and the start position I, a frequency domain transform on an LTF basic sequence to obtain an LTF symbol; a time domain transform unit performs, according to the time domain transform parameter, a time domain transform on the LTF symbol to obtain the LTF sequence; and a sending unit adds the LTF sequence to a first data frame, and sends the first data frame to a second device, so that the second device determines the LTF basic sequence according to the LTF sequence and performs channel estimation according to the LTF basic sequence.

11 Claims, 17 Drawing Sheets

| L-STF | L-LTF | L-SIG | VHT-SIG-A | VHT-STF | VHT-LTF | VHT-SIG-B | Data |

(51) Int. Cl.
  *H04B 1/707* (2011.01)
  *H04L 25/02* (2006.01)
  *H04L 27/26* (2006.01)

(56) References Cited

U.S. PATENT DOCUMENTS

| | | |
|---|---|---|
| 2010/0046656 A1 | 2/2010 | Van Nee et al. |
| 2011/0013607 A1* | 1/2011 | Van Nee ............. H04L 27/2613 370/338 |
| 2011/0194544 A1* | 8/2011 | Yang .................. H04L 27/2613 370/338 |
| 2011/0199946 A1 | 8/2011 | Breit et al. |
| 2011/0299382 A1* | 12/2011 | Van Nee ............. H04L 27/2613 370/210 |
| 2012/0147866 A1 | 6/2012 | Stacey et al. |
| 2012/0163497 A1* | 6/2012 | Kim .................... H04J 11/0079 375/296 |
| 2012/0263158 A1 | 10/2012 | Lee et al. |
| 2012/0269124 A1* | 10/2012 | Porat ................. H04W 72/1231 370/328 |
| 2013/0114757 A1* | 5/2013 | Park ................... H04L 27/2613 375/295 |
| 2013/0136198 A1* | 5/2013 | Chavali ............... H04L 27/2663 375/260 |
| 2013/0177090 A1 | 7/2013 | Yang et al. |
| 2013/0195092 A1* | 8/2013 | Zhang ................. H04L 5/0048 370/338 |
| 2013/0216002 A1 | 8/2013 | Suh et al. |
| 2013/0229996 A1* | 9/2013 | Wang ................. H04W 72/0413 370/329 |
| 2013/0230120 A1* | 9/2013 | Yang .................. H04L 27/2613 375/295 |
| 2013/0272198 A1* | 10/2013 | Azizi .................... H04W 72/02 370/328 |
| 2013/0286959 A1 | 10/2013 | Lou et al. |
| 2013/0301551 A1* | 11/2013 | Ghosh ................ H04W 72/042 370/329 |
| 2014/0079048 A1 | 3/2014 | Van Nee et al. |
| 2014/0376355 A1 | 12/2014 | Kudo et al. |
| 2015/0236831 A1* | 8/2015 | Kang ................... H04L 5/0048 370/338 |
| 2016/0043783 A1* | 2/2016 | Xia ...................... H04B 7/0417 370/329 |
| 2016/0156497 A1* | 6/2016 | Yang .................. H04B 7/0452 370/328 |
| 2017/0230214 A1* | 8/2017 | Yang .................. H04L 27/2613 |
| 2017/0231009 A1* | 8/2017 | Wang ................. H04W 72/0413 |

FOREIGN PATENT DOCUMENTS

| | | |
|---|---|---|
| CN | 102763388 A | 10/2012 |
| CN | 103138870 A | 6/2013 |
| CN | 103262437 A | 8/2013 |
| JP | 2013509795 A | 3/2013 |
| KR | 20080108553 A | 12/2008 |
| KR | 20110044324 A | 4/2011 |
| KR | 20130117883 A | 10/2013 |
| WO | WO 2013052079 A1 | 4/2013 |
| WO | 2013111784 A1 | 8/2013 |

* cited by examiner

TRANSMISSION DEVICE AND METHOD FOR TRANSMITTING DATA FRAME

CROSS-REFERENCE TO RELATED APPLICATIONS

This application is a continuation of International Application No. PCT/CN2014/096007, filed on Dec. 31, 2014, which claims priority to International Application No. PCT/CN2014/083483, filed on Jul. 31, 2014. The disclosures of all the aforementioned applications are hereby incorporated by reference in their entireties.

TECHNICAL FIELD

The present invention relates to the communications field, and in particular, to a transmission device and a method for transmitting a data frame.

BACKGROUND

As intelligent terminals are extensively applied, people have increasing requirements for data network traffic. To meet the requirements of people for data network traffic, performance of a network system needs to be enhanced continuously. Therefore, a wireless local area network is greatly evolved in this aspect, from the initial 802.11a/b to the 802.11g and 802.11n, and then to the 802.11ac. With continuous evolution of the standards, a throughput that can be provided by the system keeps increasing, and therefore meets various requirements of people for Internet access.

In an 802.11ac system, a very high throughput-long training field (VHT-LTF) included in an 802.11ac presentation protocol data unit (PPDU) structure is obtained through generation in time domain Code Division Multiplexing (CDM) mode. The VHT-LTF may be used to implement channel estimation for distinguishing multiple streams in a single user multiple-input multiple-output (SU-MIMO) scenario, or may be used to implement channel estimation for distinguishing multiple users in a multi-user multiple-input multiple-output (MU-MIMO) scenario.

The 802.11ac standard in the prior art is designed or acquired for an indoor environment. Compared with the indoor environment, an outdoor environment has a long multipath effect, and therefore to avoid interference between Orthogonal Frequency Division Multiplexing (OFDM) symbols, a cyclic prefix (CP) length needs to be increased. If a VHT-LTF is still generated in time domain CDM mode, multiple CPs required by multiple VHT-LTF symbols included in the VHT-LTF cause an increase in signaling overheads and a delay in reception of a data field.

SUMMARY

The present invention provides a transmission device and a method for transmitting a data frame, so as to reduce signaling overheads and reduce a delay in reception of a data field.

To achieve the foregoing objective, the present invention adopts the following technical solutions:

According to a first aspect of the present invention, a transmission device is provided and applied to a wireless local area network system using a multiple-input multiple-output MIMO technology, where the transmission device includes:

an acquiring unit, configured to acquire long training field LTF parameters, and acquire a start position I of allocated subcarriers, where the LTF parameters include a frequency domain transform parameter and a time domain transform parameter that are required for generating an LTF sequence;

a frequency domain transform unit, configured to perform, according to the frequency domain transform parameter and the start position I acquired by the acquiring unit, a frequency domain transform on an LTF basic sequence to obtain an LTF symbol;

a time domain transform unit, configured to perform, according to the time domain transform parameter acquired by the acquiring unit, a time domain transform on the LTF symbol obtained by the frequency domain transform unit to obtain the LTF sequence; and a sending unit, configured to add the LTF sequence obtained by the time domain transform unit to a first data frame, and send the first data frame to a second device, so that the second device determines the LTF basic sequence according to the LTF sequence and performs channel estimation according to the LTF basic sequence.

According to a second aspect of the present invention, a transmission device is provided and applied to a wireless local area network system using a multiple-input multiple-output MIMO technology, where the transmission device includes:

a receiving unit, configured to receive a first data frame that carries a long training field LTF sequence and that is sent by a first device; and a processing unit, configured to determine an LTF basic sequence according to the LTF sequence received by the receiving unit, and perform channel estimation according to the LTF basic sequence.

According to a third aspect of the present invention, a method for transmitting a data frame is provided and applied to a wireless local area network system using a multiple-input multiple-output MIMO technology, where the method includes:

acquiring, by a first device, long training field LTF parameters, and acquiring a start position I of allocated subcarriers, where the LTF parameters include a frequency domain transform parameter and a time domain transform parameter that are required for generating an LTF sequence;

performing, according to the frequency domain transform parameter and the start position I, a frequency domain transform on an LTF basic sequence to obtain an LTF symbol;

performing, according to the time domain transform parameter, a time domain transform on the LTF symbol to obtain the LTF sequence; and adding the LTF sequence to a first data frame, and sending the first data frame to a second device, so that the second device determines the LTF basic sequence according to the LTF sequence and performs channel estimation according to the LTF basic sequence.

According to a fourth aspect of the present invention, a method for transmitting a data frame is provided and applied to a wireless local area network system using a multiple-input multiple-output MIMO technology, where the method includes:

receiving, by a second device, a first data frame that carries a long training field LTF sequence and that is sent by a first device; and determining an LTF basic sequence according to the LTF sequence, and performing channel estimation according to the LTF basic sequence.

According to a fifth aspect of the present invention, a transmission device is provided and applied to a wireless local area network system using a multiple-input multiple-output MIMO technology, where the transmission device includes:

a processor, configured to: acquire long training field LTF parameters, and acquire a start position I of allocated subcarriers, where the LTF parameters include a frequency domain transform parameter and a time domain transform parameter that are required for generating an LTF sequence; perform, according to the frequency domain transform parameter and the start position I, a frequency domain transform on an LTF basic sequence to obtain an LTF symbol; and perform, according to the time domain transform parameter, a time domain transform on the LTF symbol to obtain the LTF sequence; and a transmitter, configured to add the LTF sequence obtained by the processor to a first data frame, and send the first data frame to a second device, so that the second device determines the LTF basic sequence according to the LTF sequence and performs channel estimation according to the LTF basic sequence.

According to a sixth aspect of the present invention, a transmission device is provided and applied to a wireless local area network system using a multiple-input multiple-output MIMO technology, where the transmission device includes:

a receiver, configured to receive a first data frame that carries a long training field LTF sequence and that is sent by a first device; and a processor, configured to determine an LTF basic sequence according to the LTF sequence received by the receiver, and perform channel estimation according to the LTF basic sequence.

According to a transmission device and a method for transmitting a data frame according to the present invention, a first device performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to a second device, so that the second device determines the LTF basic sequence according to the LTF sequence and performs channel estimation according to the LTF basic sequence. In a process in which the first device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
FIG. 1 is a schematic structural diagram of a PPDU according to the prior art.

In an 802.11ac system, a structure of an 802.11ac PPDU is shown in FIG. 1. The PPDU includes a legacy-short training field (Legacy-Short Training Field, L-STF), a legacy-long training field (Legacy-Long Training Field, L-LTF), a legacy signal field (Legacy Signal, L-SIG), a very high throughput-signal field A (Very High Throughput-Signal-A, VHT-SIG-A), a very high throughput-short training field (Very High Throughput-Short Training Field, VHT-STF), a VHT-LTF, a very high throughput-signal field B (Very High Throughput-Signal-B, VHT-SIG-B), and a data field (Data). The VHT-LTF is used to implement channel estimation for distinguishing multiple streams in a SU-MIMO scenario or multiple users in a MU-MIMO scenario. To distinguish multiple streams in the SU-MIMO scenario or multiple users in the MU-MIMO scenario, in the prior art, the VHT-LTF needs to include several VHT-LTF symbols, where the several VHT-LTF symbols are obtained by performing a time domain transform in time domain CDM mode, and is specifically obtained by multiplying the VHT-LTF symbols in the VHT-LTF in a time domain by sequences in different rows of a P-matrix (P-matrix). A quantity N of the VHT-LTF symbols in the VHT-LTF may be determined according to $N_{SS}$, where a correspondence between N and $N_{SS}$ may be shown in Table 1. In Table 1, $N_{SS}$ is a quantity of streams in the SU-MIMO scenario or a quantity of users in the MU-MIMO scenario.

TABLE 1

| $N_{SS}$ | N |
|---|---|
| 7, 8 | 8 |
| 5, 6 | 6 |
| 3, 4 | 4 |
| 2 | 2 |
| 1 | 1 |

Figure 2:
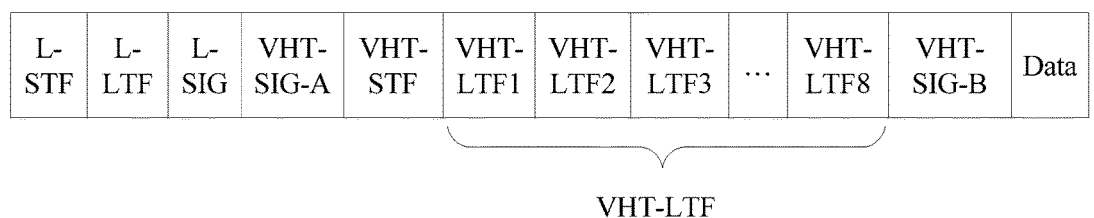
FIG. 2 is a schematic structural diagram of a PPDU according to an embodiment of the present invention.

Assuming that $N_{SS}$ is the quantity of streams in the SU-MIMO scenario, for example, when $N_{SS}$ is equal to 8, a value of N is 8. That is, when the quantity $N_{SS}$ of streams in the SU-MIMO scenario is 8, to distinguish eight data streams in the scenario, the VHT-LTF needs to include eight VHT-LTF symbols when a VHT-LTF is generated in time domain CDM mode. Specifically, a PPDU including the VHT-LTF may be shown in FIG. 2.

A VHT-LTF symbol included in the VHT-LTF includes a symbol and a CP, and the 802.11ac standard in the prior art is designed or acquired for an indoor environment. A length of a CP is generally 0.8 μs. However, compared with the indoor environment, an outdoor environment has a long multipath effect, and therefore a long CP needs to be used to overcome the long multipath effect. For example, a CP with a length of 3.2 μs may be used. When a long CP is used, if a VHT-LTF is still generated in time domain CDM mode in the prior art, the VHT-LTF becomes longer due to the added N long CPs, resulting in an increase in signaling overheads and a delay in reception of a data field.

In the embodiments of the present invention, to reduce signaling overheads and reduce a delay in reception of a data field, a frequency domain transform mode and a time domain transform mode are used to generate a long training field (Long Training Field, LTF) sequence for channel estimation for distinguishing multiple spatial streams in a multiple-input multiple-output (Multiple Input Multiple Output, MIMO) scenario, where the multiple spatial streams are multiple data streams of a user in a SU-MIMO scenario and/or data streams of multiple users in a MU-MIMO scenario.

For ease of understanding by a person skilled in the art, for a specific implementation process of the technical solution provided by the present invention, reference may be made to the following embodiments provided by the present invention.

Figure 3:
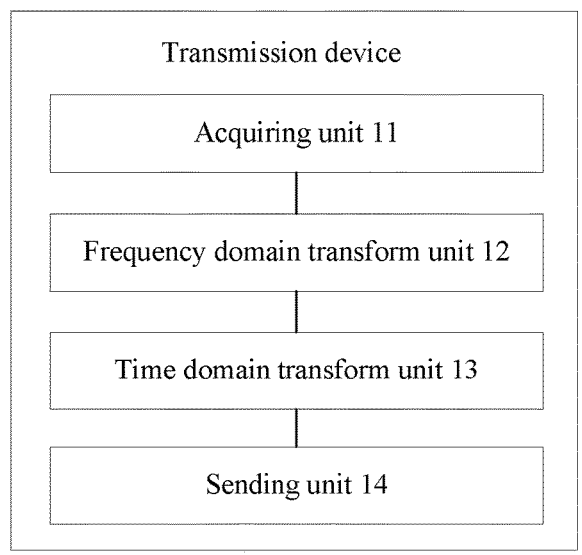
FIG. 3 is a schematic structural diagram of a transmission device according to an embodiment of the present invention.

An embodiment of the present invention provides a transmission device, which is applied to a wireless local area network system using a multiple-input multiple-output MIMO technology. As shown in FIG. 3, the transmission device includes an acquiring unit 11, a frequency domain transform unit 12, a time domain transform unit 13, and a sending unit 14.

The acquiring unit 11 is configured to acquire long training field LTF parameters, and acquire a start position I of allocated subcarriers, where the LTF parameters include a frequency domain transform parameter and a time domain transform parameter that are required for generating an LTF sequence.

The frequency domain transform unit 12 is configured to perform, according to the frequency domain transform parameter and the start position I acquired by the acquiring unit 11, a frequency domain transform on an LTF basic sequence to obtain an LTF symbol.

The time domain transform unit 13 is configured to perform, according to the time domain transform parameter acquired by the acquiring unit 11, a time domain transform on the LTF symbol obtained by the frequency domain transform unit 12 to obtain the LTF sequence.

The sending unit 14 is configured to add the LTF sequence obtained by the time domain transform unit 13 to a first data frame, and send the first data frame to a second device, so that the second device determines the LTF basic sequence according to the LTF sequence and performs channel estimation according to the LTF basic sequence.

In the embodiment of the present invention, further optionally, the frequency domain transform parameter includes a subcarrier quantity M for distinguishing spatial streams, a quantity L of elements in the LTF basic sequence, and a subcarrier quantity S.

Figure 4:
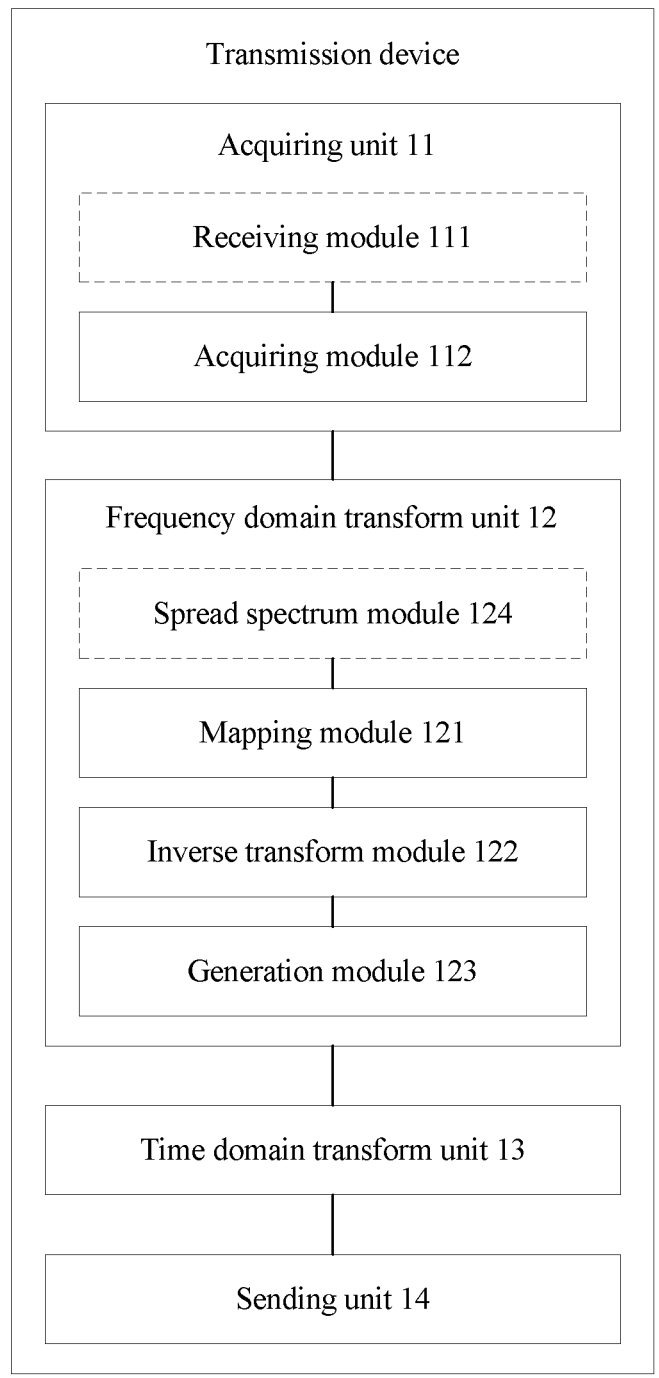
FIG. 4 is a schematic structural diagram of another transmission device according to an embodiment of the present invention.

As shown in FIG. 4, the frequency domain transform unit 12 includes a mapping module 121, an inverse transform module 122, and a generation module 123.

The mapping module 121 is configured to map, starting from the start position I, at intervals of $\lfloor S/L \rfloor$ subcarriers, each element in the LTF basic sequence to a corresponding subcarrier to obtain a frequency domain LTF sequence, where $\lfloor \ \rfloor$ indicates round-down.

The inverse transform module 122 is configured to perform an S-point inverse fast Fourier transform IFFT transform on the frequency domain LTF sequence obtained by the mapping module 121 to obtain an LTF basic symbol.

The generation module 123 is configured to combine the LTF basic symbol obtained by the inverse transform module 122 with a cyclic prefix CP to generate the LTF symbol.

In the embodiment of the present invention, further optionally, the frequency domain transform parameter includes a subcarrier quantity M for distinguishing spatial streams, a quantity L of elements in the LTF basic sequence, and a subcarrier quantity S.

The frequency domain transform unit 12 includes a mapping module 121, an inverse transform module 122, a generation module 123, and a spread spectrum module 124.

The spread spectrum module 124 is configured to perform, according to M, spread spectrum processing on each element in the LTF basic sequence to obtain an LTF spread spectrum sequence, where the LTF spread spectrum sequence includes M*L elements.

The mapping module 121 is configured to map, starting from the start position I, each element in the LTF spread spectrum sequence obtained by the spread spectrum module 124 to a corresponding subcarrier to obtain a frequency domain LTF sequence.

The inverse transform module 122 is configured to perform an S-point IFFT transform on the frequency domain LTF sequence obtained by the mapping module 121 to obtain an LTF basic symbol.

The generation module 123 is configured to combine the LTF basic symbol obtained by the inverse transform module 122 with a CP to generate the LTF symbol.

In the embodiment of the present invention, further optionally, the time domain transform parameter includes a quantity N of the LTF symbols included in the LTF sequence.

The time domain transform unit 13 is specifically configured to perform, according to N, spread spectrum processing on the LTF symbols to generate the LTF sequence.

In the embodiment of the present invention, further optionally, the transmission device is a station STA, and the second device is an access point AP.

The acquiring unit 11 includes a receiving module 111 and an acquiring module 112.

The receiving module 111 is configured to receive a second data frame that carries indication information and that is sent by the second device, where the indication information is used to indicate the LTF parameters.

The acquiring module 112 is configured to acquire the LTF parameters according to the indication information obtained by the receiving module 111 and a preconfigured mapping relationship table.

In the embodiment of the present invention, further optionally, the mapping relationship table includes a quantity $N_{SS}$ of multiplexed spatial streams, a type of the AP, and parameters corresponding to the $N_{SS}$ and the type of the AP.

When the indication information includes the $N_{SS}$, and the transmission device has acquired the type of the AP when accessing the AP, the acquiring module 112 is specifically configured to use, according to the $N_{SS}$ and the type of the AP, the parameters corresponding to the $N_{SS}$ and the type of the AP as the LTF parameters.

When the indication information includes the $N_{SS}$ and the subcarrier quantity S, and the transmission device has not acquired the type of the AP when accessing the AP, the acquiring module 112 is specifically configured to determine the type of the AP according to S, where a correspondence exists between S and the type of the AP, and use, according to the $N_{SS}$ and the type of the AP, the parameters corresponding to the $N_{SS}$ and the type of the AP as the LTF parameters.

When the indication information includes the $N_{SS}$, and the transmission device has not acquired the type of the AP when accessing the AP, the acquiring module 112 is specifically configured to determine S according to a length of the CP, determine the type of the AP according to S, and use, according to the $N_{SS}$ and the type of the AP, the parameters corresponding to the $N_{SS}$ and the type of the AP as the LTF parameters.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located; the indication information includes the $N_{SS}$, and when accessing the AP, the transmission device has acquired the type of the environment in which the AP is located.

The acquiring module 112 is specifically configured to use, according to the $N_{SS}$ and the type of the environment in which the AP is located, the parameters corresponding to the $N_{SS}$ and the type of the environment in which the AP is located, as the LTF parameters.

In the embodiment of the present invention, further optionally, the mapping relationship table includes a quantity $N_{SS}$ of multiplexed spatial streams and parameters corresponding to the $N_{SS}$.

When the indication information includes the $N_{SS}$, the acquiring module 112 is specifically configured to determine, according to the $N_{SS}$ that the parameters corresponding to the $N_{SS}$ are the LTF parameters.

When the indication information includes the quantity N of the LTF symbols included in the LTF sequence, the acquiring module 112 is specifically configured to determine the subcarrier quantity S according to a length of the CP, determine the $N_{SS}$ according to N and S, and determine, according to the $N_{SS}$ that the parameters corresponding to the $N_{SS}$ are the LTF parameters.

In the embodiment of the present invention, further optionally, the mapping relationship table includes a quantity $N_{SS}$ of multiplexed spatial streams, modulation and coding scheme MCS feature information, and parameters corresponding to the $N_{SS}$ and the MCS feature information; the indication information includes the $N_{SS}$ and the MCS feature information.

The acquiring module 112 is specifically configured to use, according to the $N_{SS}$ and the MCS feature information, the parameters corresponding to the $N_{SS}$ and the MCS feature information as the LTF parameters.

In the embodiment of the present invention, further optionally, the transmission device is an AP, and the second device is a STA; or the transmission device is a STA, and the second device is an AP.

The acquiring unit 11 includes an acquiring module 112, configured to acquire the LTF parameters according to a preconfigured mapping relationship table.

The sending unit 14 is specifically configured to add the LTF sequence and indication information to the first data frame, and send the first data frame to the second device, so that the second device determines the LTF basic sequence according to the LTF sequence and the indication information.

In the embodiment of the present invention, further optionally, the mapping relationship table includes a quantity $N_{SS}$ of multiplexed spatial streams, a type of the AP, and parameters corresponding to the $N_{SS}$ and the type of the AP; when the transmission device is the STA, the transmission device has acquired the type of the AP when accessing the AP.

The acquiring module 112 is specifically configured to use, according to the $N_{SS}$ and the type of the AP, the parameters corresponding to the $N_{SS}$ and the type of the AP as the LTF parameters.

If the transmission device is the STA, and the second device is the AP, the indication information includes the $N_{SS}$.

If the transmission device is the AP, and the second device is the STA, the indication information includes the $N_{SS}$ or the indication information includes the $N_{SS}$ and the subcarrier quantity S.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located; when the transmission device is the STA, the transmission device has acquired the type of the environment in which the AP is located when accessing the AP.

The acquiring module 112 is specifically configured to use, according to the $N_{SS}$ and the type of the environment in which the AP is located, the parameters corresponding to the $N_{SS}$ and the type of the environment in which the AP is located, as the LTF parameters. The indication information includes the $N_{SS}$.

In the embodiment of the present invention, further optionally, the mapping relationship table includes a quantity $N_{SS}$ of multiplexed spatial streams and parameters corresponding to the $N_{SS}$.

The acquiring module 112 is specifically configured to determine, according to the $N_{SS}$ that the parameters corresponding to the $N_{SS}$ are the LTF parameters.

The indication information includes the $N_{SS}$ or the indication information includes the quantity N of the LTF symbols included in the LTF sequence.

In the embodiment of the present invention, further optionally, the mapping relationship table includes a quantity $N_{SS}$ of multiplexed spatial streams, MCS feature information, and parameters corresponding to the $N_{SS}$ and the MCS feature information.

The acquiring module 112 is specifically configured to use, according to the $N_{SS}$ and the MCS feature information, the parameters corresponding to the $N_{SS}$ and the MCS feature information as the LTF parameters.

The indication information includes the $N_{SS}$ and the MCS feature information.

In the embodiment of the present invention, further optionally, the quantity of multiplexed spatial streams includes a quantity of users in multi-user multiplexing and/or a quantity of data streams in single-user multiplexing.

It should be noted that, for a specific work process of each functional module in the transmission device provided by the embodiment of the present invention, reference may be made to a detailed description of a corresponding process in a method embodiment, and details are not described herein in the embodiment of the present invention.

The transmission device provided by the embodiment of the present invention performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to a second device, so that the second device determines the LTF basic sequence according to the LTF sequence and performs channel estimation according to the LTF basic sequence. In a process in which the transmission device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced.

Figure 5:
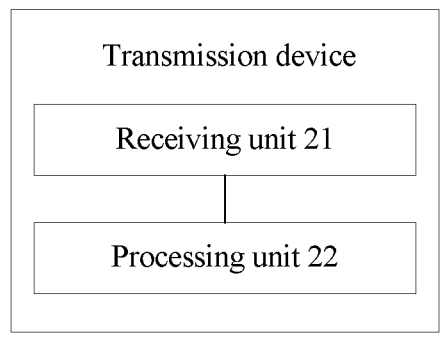
FIG. 5 is a schematic structural diagram of a transmission device according to another embodiment of the present invention.

Another embodiment of the present invention provides a transmission device, which is applied to a wireless local area network system using a multiple-input multiple-output MIMO technology. As shown in FIG. 5, the transmission device includes a receiving unit 21 and a processing unit 22.

The receiving unit 21 is configured to receive a first data frame that carries a long training field LTF sequence and that is sent by a first device.

The processing unit 22 is configured to determine an LTF basic sequence according to the LTF sequence received by the receiving unit 21, and perform channel estimation according to the LTF basic sequence.

Figure 6:
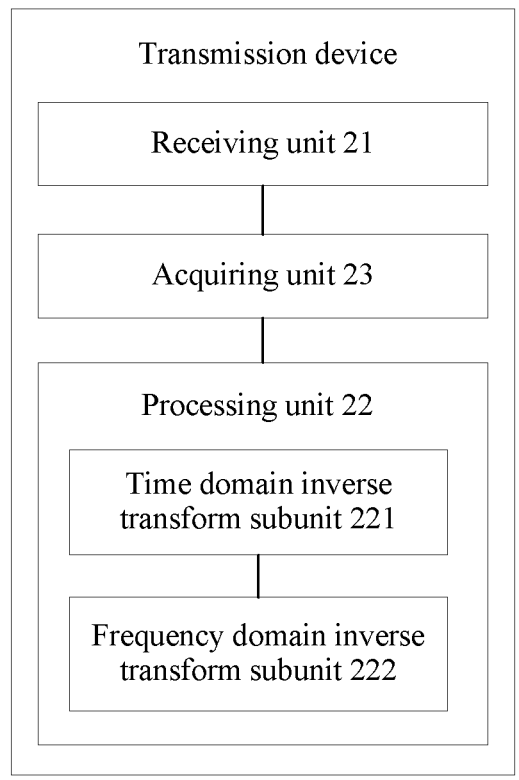
FIG. 6 is a schematic structural diagram of another transmission device according to another embodiment of the present invention.

In the embodiment of the present invention, further optionally, as shown in FIG. 6, the transmission device further includes an acquiring unit 23.

The acquiring unit 23 is configured to: before the processing unit 22 determines the LTF basic sequence according to the LTF sequence, acquire LTF parameters, and acquire a start position I of allocated subcarriers, where the LTF parameters include a frequency domain transform parameter and a time domain transform parameter that are required for generating the LTF sequence by the first device.

The processing unit 22 includes a time domain inverse transform subunit 221 and a frequency domain inverse transform subunit 222.

The time domain inverse transform subunit 221 is configured to perform, according to the time domain transform parameter acquired by the acquiring unit 23, a time domain inverse transform on the LTF sequence to obtain an LTF symbol.

The frequency domain inverse transform subunit 222 is configured to perform, according to the frequency domain transform parameter and the start position I acquired by the acquiring unit 23, a frequency domain inverse transform on the LTF symbol obtained by the time domain inverse transform subunit 221 to obtain the LTF basic sequence.

In the embodiment of the present invention, further optionally, the time domain transform parameter includes a quantity N of the LTF symbols included in the LTF sequence.

The time domain inverse transform subunit 221 is specifically configured to perform, according to N, despread processing on the LTF sequence to obtain the LTF symbols.

In the embodiment of the present invention, further optionally, the frequency domain transform parameter includes a subcarrier quantity M for distinguishing spatial streams, a quantity L of elements in the LTF basic sequence, and a subcarrier quantity S.

Figure 7:
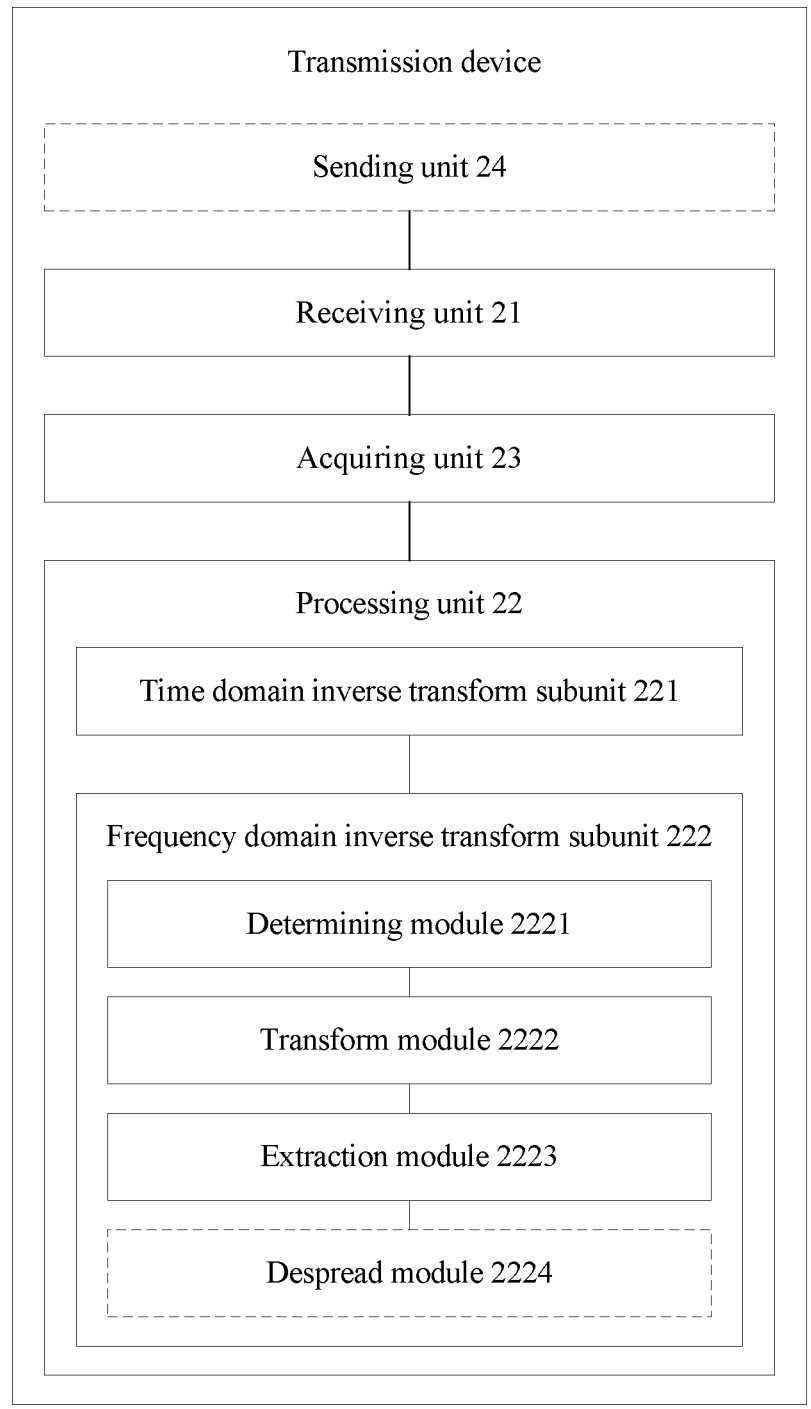
FIG. 7 is a schematic structural diagram of still another transmission device according to another embodiment of the present invention.

As shown in FIG. 7, the frequency domain inverse transform subunit 222 includes a determining module 2221, a transform module 2222, and an extraction module 2223.

The determining module 2221 is configured to determine an LTF basic symbol according to the LTF symbol, where the LTF symbol includes the LTF basic symbol and a cyclic prefix CP.

The transform module 2222 is configured to perform an S-point fast Fourier transform FFT transform on the LTF basic symbol obtained by the determining module 2221 to obtain a frequency domain LTF sequence.

The extraction module 2223 is configured to extract, starting from the start position I, at intervals of $\lfloor S/L \rfloor$ subcarriers, the LTF basic sequence according to the frequency domain LTF sequence obtained by the transform module 2222, where $\lfloor \; \rfloor$ indicates round-down.

In the embodiment of the present invention, further optionally, the frequency domain transform parameter includes a subcarrier quantity M for distinguishing spatial streams, a quantity L of elements in the LTF basic sequence, and a subcarrier quantity S.

The frequency domain inverse transform subunit 222 includes a determining module 2221, a transform module 2222, an extraction module 2223, and a despread module 2224.

The determining module 2221 is configured to determine an LTF basic symbol according to the LTF symbol, where the LTF symbol includes the LTF basic symbol and a CP.

The transform module 2222 is configured to perform an S-point FFT transform on the LTF basic symbol obtained by the determining module 2221 to obtain a frequency domain LTF sequence.

The extraction module 2223 is configured to extract, starting from the start position I, an LTF spread spectrum sequence from corresponding subcarriers according to the frequency domain LTF sequence obtained by the transform module 2222, where the LTF spread spectrum sequence includes M*L elements.

The despread module 2224 is configured to perform, according to M, despread processing on the LTF spread spectrum sequence obtained by the extraction module 2223 to obtain the LTF basic sequence.

In the embodiment of the present invention, further optionally, the first device is a station STA, and the transmission device is an access point AP.

The acquiring unit 23 is further configured to acquire the LTF parameters according to a preconfigured mapping relationship table before the receiving unit 21 receives the first data frame that carries the long training field LTF sequence and that is sent by the first device.

The transmission device further includes a sending unit 24.

The sending unit 24 is configured to send a second data frame carrying indication information to the first device, where the indication information indicates the LTF parameters.

In the embodiment of the present invention, further optionally, the mapping relationship table includes a quantity $N_{SS}$ of multiplexed spatial streams, a type of the AP, and parameters corresponding to the $N_{SS}$ and the type of the AP.

The acquiring unit 23 is specifically configured to use, according to the $N_{SS}$ and the type of the AP, the parameters corresponding to the $N_{SS}$ and the type of the AP as the LTF parameters.

The indication information includes the $N_{SS}$ or the indication information includes the $N_{SS}$ and the subcarrier quantity S.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located.

The acquiring unit 23 is specifically configured to use, according to the $N_{SS}$ and the type of the environment in which the AP is located, the parameters corresponding to the $N_{SS}$ and the type of the environment in which the AP is located, as the LTF parameters. The indication information includes the $N_{SS}$.

In the embodiment of the present invention, further optionally, the mapping relationship table includes a quantity $N_{SS}$ of multiplexed spatial streams and parameters corresponding to the $N_{SS}$.

The acquiring unit 23 is specifically configured to determine, according to the $N_{SS}$, that the parameters corresponding to the $N_{SS}$ are the LTF parameters.

The indication information includes the $N_{SS}$, or the indication information includes the quantity N of the LTF symbols included in the LTF sequence.

In the embodiment of the present invention, further optionally, the mapping relationship table includes a quantity $N_{SS}$ of multiplexed spatial streams, MCS feature information, and parameters corresponding to the $N_{SS}$ and the MCS feature information.

The acquiring unit 23 is specifically configured to use, according to the $N_{SS}$ and the MCS feature information, the parameters corresponding to the $N_{SS}$ and the MCS feature information as the LTF parameters.

The indication information includes the $N_{SS}$ and the MCS feature information.

In the embodiment of the present invention, further optionally, the first device is an AP, and the transmission device is a STA; or the first device is a STA, and the transmission device is an AP.

The receiving unit 21 is specifically configured to receive the first data frame that carries the LTF sequence and indication information and that is sent by the first device.

The acquiring unit 23 is specifically configured to acquire the LTF parameters according to the indication information received by the receiving unit 21 and a preconfigured mapping relationship table.

In the embodiment of the present invention, further optionally, the mapping relationship table includes a quantity $N_{SS}$ of multiplexed spatial streams, a type of the AP, and parameters corresponding to the $N_{SS}$ and the type of the AP.

If the first device is the STA, and the transmission device is the AP, the indication information includes the $N_{SS}$; and the acquiring unit 23 is specifically configured to use, according to the $N_{SS}$ and the type of the AP, the parameters corresponding to the $N_{SS}$ and the type of the AP as the LTF parameters.

If the first device is the AP, and the transmission device is the STA:

when the indication information includes the $N_{SS}$, and the transmission device has acquired the type of the AP when accessing the AP, the acquiring unit 23 is specifically configured to use, according to the $N_{SS}$ and the type of the AP, the parameters corresponding to the $N_{SS}$ and the type of the AP as the LTF parameters; or when the indication information includes the $N_{SS}$ and the subcarrier quantity S, and the transmission device has not acquired the type of the AP when accessing the AP, the acquiring unit 23 is specifically configured to determine the type of the AP according to S, where a correspondence exists between S and the type of the AP, and use, according to the $N_{SS}$ and the type of the AP, the parameters corresponding to the $N_{SS}$ and the type of the AP as the LTF parameters; or when the indication information includes the $N_{SS}$, and the transmission device has not acquired the type of the AP when accessing the AP, the acquiring unit 23 is specifically configured to determine S according to a length of the CP, determine the type of the AP according to S, and use, according to the $N_{SS}$ and the type of the AP, the parameters corresponding to the $N_{SS}$ and the type of the AP as the LTF parameters.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located; the indication information includes the $N_{SS}$, and when the transmission device is the STA, the transmission device has acquired the type of the environment in which the AP is located when accessing the AP.

The acquiring unit 23 is specifically configured to use, according to the $N_{SS}$ and the type of the environment in which the AP is located, the parameters corresponding to the $N_{SS}$ and the type of the environment in which the AP is located, as the LTF parameters.

In the embodiment of the present invention, further optionally, the mapping relationship table includes a quantity $N_{SS}$ of multiplexed spatial streams and parameters corresponding to the $N_{SS}$.

When the indication information includes the $N_{SS}$, the acquiring unit 23 is specifically configured to use, according to the $N_{SS}$, the parameters corresponding to the $N_{SS}$ as the LTF parameters.

When the indication information includes the quantity N of the LTF symbols included in the LTF sequence, the acquiring unit 23 is specifically configured to determine the subcarrier quantity S according to a length of the CP, determine the $N_{SS}$ according to N and S, and determine, according to the $N_{SS}$, that the parameters corresponding to the $N_{SS}$ are the LTF parameters.

In the embodiment of the present invention, further optionally, the mapping relationship table includes a quantity $N_{SS}$ of multiplexed spatial streams, modulation and coding scheme MCS feature information, and parameters corresponding to the $N_{SS}$ and the MCS feature information; the indication information includes the $N_{SS}$ and the MCS feature information.

The acquiring unit 23 is specifically configured to use, according to the $N_{SS}$ and the MCS feature information, the parameters corresponding to the $N_{SS}$ and the MCS feature information as the LTF parameters.

In the embodiment of the present invention, further optionally, the quantity of multiplexed spatial streams includes a quantity of users in multi-user multiplexing and/or a quantity of data streams in single-user multiplexing.

It should be noted that, for a specific work process of each functional module in the transmission device provided by the embodiment of the present invention, reference may be made to a detailed description of a corresponding process in a method embodiment, and details are not described herein in the embodiment of the present invention.

According to the transmission device provided by the embodiment of the present invention, a first device performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to the transmission device, so that the transmission device determines the LTF basic sequence according to the LTF sequence and performs channel estimation according to the LTF basic sequence. In a process in which the first device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced.

Figure 8:
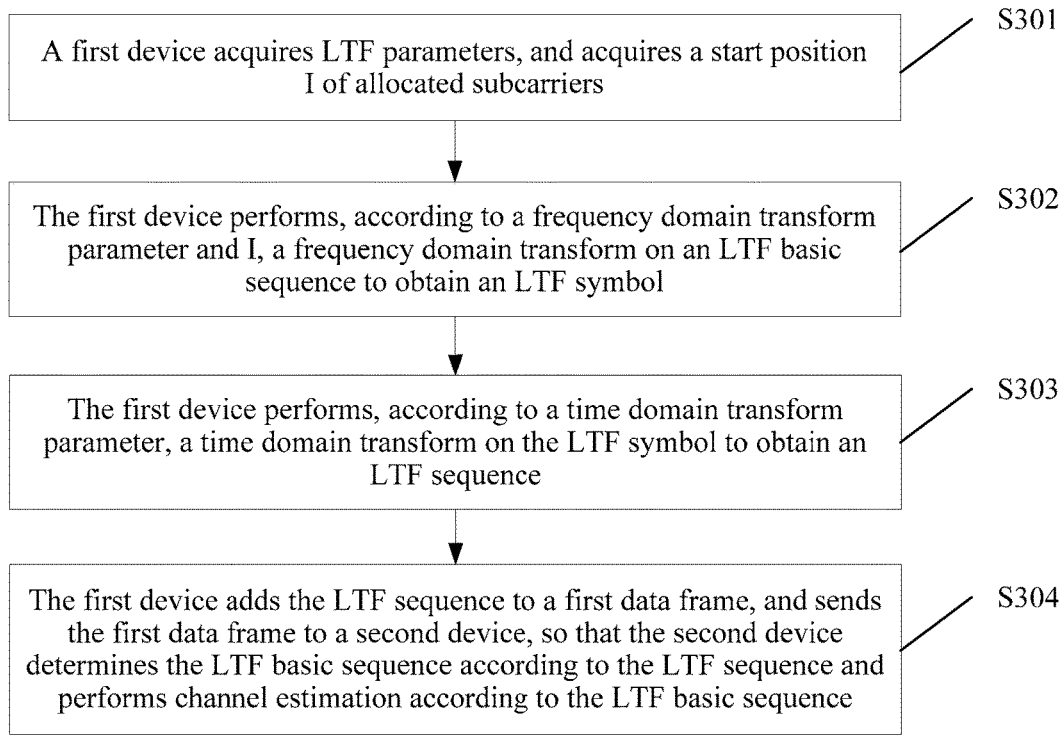
FIG. 8 is a schematic flowchart of a method for transmitting a data frame according to another embodiment of the present invention.

An embodiment of the present invention provides a method for transmitting a data frame, where the method is applied to a wireless local area network system using a MIMO technology. As shown in FIG. 8, the method may include the following steps.

S301. A first device acquires LTF parameters, and acquires a start position I of allocated subcarriers.

The LTF parameters include a frequency domain transform parameter and a time domain transform parameter that are required for generating an LTF sequence.

It should be noted that, a process of acquiring the start position I of the allocated subcarriers may be acquiring by the first device through allocation, or may be acquiring by receiving signaling sent by a second device.

S302. The first device performs, according to a frequency domain transform parameter and I, a frequency domain transform on an LTF basic sequence to obtain an LTF symbol.

After the first device acquires the LTF parameters including the frequency domain transform parameter and the time domain transform parameter that are required for generating the LTF sequence and the start position I of the allocated subcarriers, the first device may perform, according to the frequency domain transform parameter included in the acquired LTF parameters and the acquired start position I of the allocated subcarriers, the frequency domain transform on the LTF basic sequence to obtain the LTF symbol.

S303. The first device performs, according to a time domain transform parameter, a time domain transform on the LTF symbol to obtain an LTF sequence.

After the first device performs, according to the frequency domain transform parameter and I, the frequency domain transform on the LTF basic sequence to obtain the LTF symbol, the first device may perform, according to the time domain transform parameter included in the LTF parameters, the time domain transform on the LTF symbol to obtain the LTF sequence.

S304. The first device adds the LTF sequence to a first data frame, and sends the first data frame to a second device, so that the second device determines the LTF basic sequence according to the LTF sequence and performs channel estimation according to the LTF basic sequence.

After the first device performs, according to the time domain transform parameter included in the LTF parameters, the time domain transform on the LTF symbol to obtain the LTF sequence, the first device may add the obtained LTF sequence to the first data frame, and sends the first data frame to the second device, so that the second device determines the LTF basic sequence according to the LTF sequence and performs channel estimation according to the determined LTF basic sequence. Further, the first device may further perform carrier frequency offset (Carrier Frequency Offset, CFO) estimation according to the determined LTF basic sequence.

It should be noted that, in the embodiment of the present invention, the first device may be an access point (Access Point, AP), or may be a station (Station, STA). In addition, when the first device is an AP, the second device is a STA, or when the first device is a STA, the second device is an AP. The embodiment of the present invention does not specifically limit the first device and the second device herein.

According to the method for transmitting a data frame according to the embodiment of the present invention, a first device performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to a second device, so that the second device determines the LTF basic sequence according to the LTF sequence and performs channel estimation according to the LTF basic sequence. In a process in which the first device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced.

Figure 9:
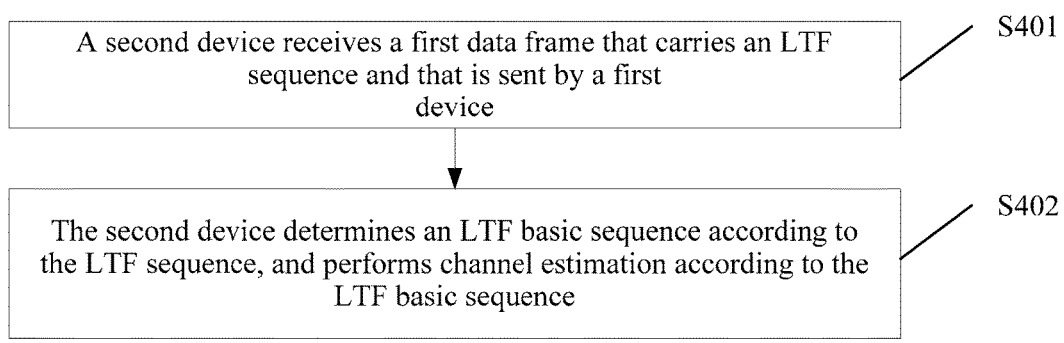
FIG. 9 is a schematic flowchart of a method for transmitting a data frame according to another embodiment of the present invention.

Another embodiment of the present invention provides a method for transmitting a data frame, where the method is applied to a wireless local area network system using a MIMO technology. As shown in FIG. 9, the method may include the following steps.

S401. A second device receives a first data frame that carries an LTF sequence and that is sent by a first device.

S402. The second device determines an LTF basic sequence according to the LTF sequence, and performs channel estimation according to the LTF basic sequence.

After the second device receives the first data frame that carries the LTF sequence and that is sent by the first device, the second device may determine the LTF basic sequence according to the LTF sequence carried in the first data frame, and perform channel estimation according to the LTF basic sequence, and further, may perform CFO estimation according to the LTF basic sequence.

According to the method for transmitting a data frame according to the embodiment of the present invention, a first device performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to a second device, so that the second device determines the LTF basic sequence according to the LTF sequence and performs channel estimation according to the LTF basic sequence. In a process in which the first device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced.

Figure 10:
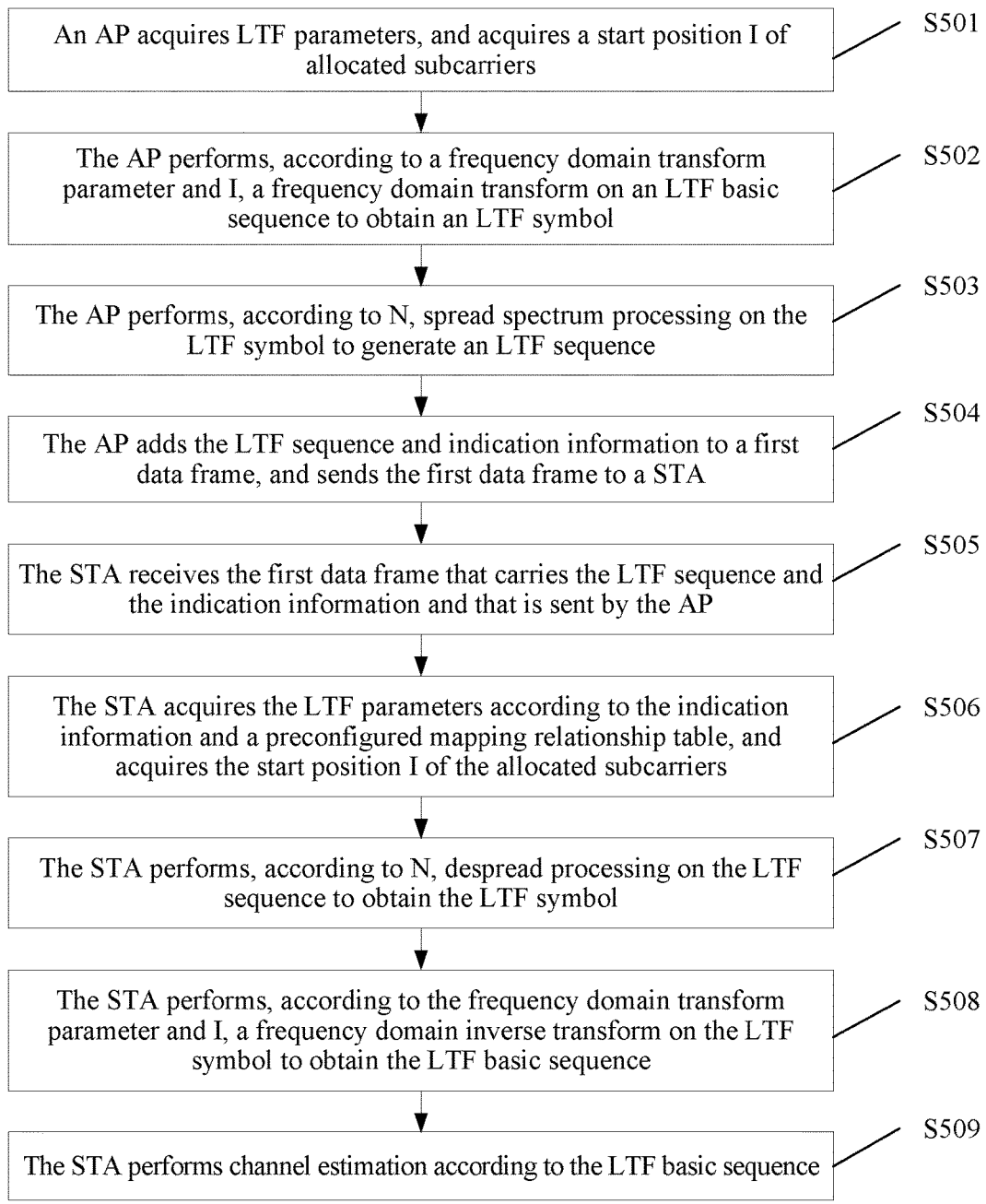
FIG. 10 is a schematic flowchart of a method for transmitting a data frame according to another embodiment of the present invention.

Another embodiment of the present invention provides a method for transmitting a data frame, where the method is applied to a wireless local area network system using a MIMO technology. In addition, for ease of understanding by a person skilled in the art, in the embodiment of the present invention, according to different application scenarios, a specific implementation process of the present invention is described in detail and is specifically as follows:

In a first application scenario, an example is used for description, in which a first device is an AP, a second device is a STA, a MIMO technology used in a wireless local area network is specifically a MU-MIMO technology, and a specific implementation process is used in a process of transmitting downlink data. In the application scenario, the AP may perform communication with multiple STAs simultaneously, and a spatial stream refers to a data stream that is sent by the AP to each user (STA). The method for transmitting a data frame in the application scenario is shown in FIG. 10, and specifically, the method may include the following steps.

S501. An AP acquires LTF parameters, and acquires a start position I of allocated sub carriers.

Specifically, that the AP acquires the LTF parameters may be acquiring the LTF parameters according to a preconfigured mapping relationship table, where the LTF parameters may include a frequency domain transform parameter and a time domain transform parameter that are required for generating an LTF sequence. The frequency domain transform parameter may include a subcarrier quantity M for distinguishing spatial streams, a quantity L of elements in an LTF basic sequence, and a subcarrier quantity S; and the time domain transform parameter may include a quantity N of LTF symbols included in the LTF sequence.

A process of acquiring the start position I of the allocated subcarriers may be acquiring by the AP through allocation. A specific acquiring process is: the AP allocates a start position I of subcarriers to each spatial stream according to an actual application scenario, or the AP allocates, according to a sequence of each spatial stream, a start position I of subcarriers in a sequence same as that of the spatial stream to each spatial stream.

The mapping relationship table may be specifically formed in any one manner of the following manners:

Manner 1: The mapping relationship table includes a quantity $N_{SS}$ of multiplexed spatial streams, a type of the AP, and parameters corresponding to the $N_{SS}$ and the type of the AP.

The quantity $N_{SS}$ of multiplexed spatial streams is a quantity of users in multi-user multiplexing.

For example, the type of the AP may be 802.11ac or 802.11ax, and a formation manner of the mapping relationship table may be shown in Table 2, Table 3, or Table 3a. In the mapping relationship table shown in Table 2, Table 3, or Table 3a, a type 1 indicates that the type of the AP is 802.11ac, and a type 2 indicates that the type of the AP is 802.11ax. Using the mapping relationship table shown in Table 2 as an example, when $N_{SS}$ is 8 and the type of the AP is the type 1, S=64, N=8, M=1, and L=56 are parameters corresponding to the $N_{SS}$ and the type of the AP. Using the mapping relationship table shown in Table 3 as an example, when $N_{SS}$ is 8 and the type of the AP is the type 2, S=512 (equivalent to 8 times a length of a data symbol of the type 1), N=1, M=8, and L=56 are parameters corresponding to the $N_{SS}$ and the type of the AP. Using the mapping relationship table shown in Table 3a as an example, when $N_{SS}$ is 8 and the type of the AP is the type 2, S=128 (equivalent to 2 times a length of a data symbol of the type 1), N=4, M=2, and L=56 are parameters corresponding to the $N_{SS}$ and the type of the AP.

Although for the type 1 and the type 2, the AP (namely, a transmit end) selects an LTF basic sequence with a same L for data streams of all users, because lengths of data symbols of the type 1 and the type 2 are different, when the STA (namely, a receive end) performs channel estimation according to an LTF basic sequence that is despread, a different interpolation algorithm is also used. For the type 1, the length of the data symbol is 64-FFT (64-fast Fourier transform). When the AP performs frequency domain mapping on an LTF basic sequence in which L selected for a data stream of each user is equal to 56, the STA can obtain channel estimation of all subcarriers without interpolation when the STA performs channel estimation according to the LTF basic sequence that is despread, that is, channel estimation required for a data symbol can be obtained without interpolation. However, for the type 2, the length of the data symbol is different from the length of the data symbol of the type 1. Assuming that the length of the data symbol of the type 2 is 256-FFT, when the AP performs frequency domain mapping on an LTF basic sequence in which L selected for a data stream of each user is equal to 56, channel estimation of all subcarriers can be obtained only by using an interpolation factor of 4 when the STA performs channel estimation according to the LTF basic sequence that is despread, that is, channel estimation required for a data symbol can be obtained only by using an interpolation factor of 4.

TABLE 2

| $N_{SS}$ | Type 1 | Type 2 |
|---|---|---|
| 7, 8 | S = 64, N = 8, M = 1, L = 56 | S = 256, N = 2, M = 4, L = 56 |
| 5, 6 | S = 64, N = 6, M = 1, L = 56 | S = 256, N = 2, M = 3, L = 56 |
| 3, 4 | S = 64, N = 4, M = 1, L = 56 | S = 256, N = 1, M = 4, L = 56 |
| 2 | S = 64, N = 2, M = 1, L = 56 | S = 256, N = 1, M = 2, L = 56 |
| 1 | S = 64, N = 1, M = 1, L = 56 | S = 256, N = 1, M = 1, L = 56 |

TABLE 3

| $N_{SS}$ | Type 1 | Type 2 |
|---|---|---|
| 7, 8 | S = 64, N = 8, M = 1, L = 56 | S = 512, N = 1, M = 8, L = 56 |
| 5, 6 | S = 64, N = 6, M = 1, L = 56 | S = 512, N = 1, M = 6, L = 56 |
| 3, 4 | S = 64, N = 4, M = 1, L = 56 | S = 512, N = 1, M = 4, L = 56 |
| 2 | S = 64, N = 2, M = 1, L = 56 | S = 512, N = 1, M = 2, L = 56 |
| 1 | S = 64, N = 1, M = 1, L = 56 | S = 512, N = 1, M = 1, L = 56 |

TABLE 3a

| $N_{SS}$ | Type 1 | Type 2 |
|---|---|---|
| 7, 8 | S = 64, N = 8, M = 1, L = 56 | S = 128, N = 4, M = 2, L = 56 |
| 5, 6 | S = 64, N = 6, M = 1, L = 56 | S = 128, N = 3, M = 2, L = 56 |
| 3, 4 | S = 64, N = 4, M = 1, L = 56 | S = 128, N = 2, M = 2, L = 56 |
| 2 | S = 64, N = 2, M = 1, L = 56 | S = 128, N = 1, M = 2, L = 56 |
| 1 | S = 64, N = 1, M = 1, L = 56 | S = 128, N = 1, M = 1, L = 56 |

Manner 2: The mapping relationship table includes a quantity $N_{SS}$ of multiplexed spatial streams, a type of an environment in which the AP is located, and parameters corresponding to the quantity $N_{SS}$ of users and the type of the environment in which the AP is located.

For example, types of all APs are 802.11ax, and types of the environments in which the APs are located may be indoor or outdoor. A formation manner of the mapping relationship table may be shown in Table 4, Table 5, Table 5a, or Table 5b. An environment type 1 in the mapping relationship table shown in Table 4, Table 5, Table 5a, or Table 5b indicates that the type of the environment in which the AP is located is indoor, and an environment type 2 indicates that the type of the environment in which the AP is located is outdoor. Using the mapping relationship table shown in Table 4 as an example, when $N_{SS}$ is 8 and the type of the environment in which the AP is located is the type 1, S=256, N=2, M=4, and L=56 are parameters corresponding to the $N_{SS}$ and the type of the environment in which the AP is located. Using the mapping relationship table shown in Table 5 as an example, when $N_{SS}$ is 8 and the type of the environment in which the AP is located is the type 2, S=512, N=4, M=2, and L=224 are parameters corresponding to the $N_{SS}$ and the type of the environment in which the AP is located. Using the mapping relationship table shown in Table 5a as an example, when $N_{SS}$ is 8 and the type of the environment in which the AP is located is the type 2, S=128, N=8, M=1, and L=116 are parameters corresponding to the $N_{SS}$ and the type of the environment in which the AP is located.

For the mapping relationship tables in Tables 4 to 5a, because types of the environments in which the APs are located are different, lengths of LTF basic sequences selected by the APs are different. Therefore, when the STA performs channel estimation according to the LTF basic sequences that are despread, different interpolation algorithms are also used. For the environment type 1, because frequency selectivity of an indoor channel is low, the AP may select a short LTF basic sequence for a data stream of each user. Therefore, when the STA performs channel estimation according to the LTF basic sequence that is despread, channel estimation of all subcarriers can be obtained only by using a large interpolation factor, that is, channel estimation required for a data symbol can be obtained only by using a large interpolation factor. However, for the environment type 2, because frequency selectivity of an outdoor channel is high, the AP needs to select a short LTF basic sequence for a data stream of each user. Therefore, when the STA performs channel estimation according to the LTF basic sequence that is despread, channel estimation of all subcarriers can be obtained by using a small interpolation factor, that is, channel estimation required for a data symbol can be obtained by using a small interpolation factor. Using the mapping relationship table shown in Table 4 as an example, if a length of a data symbol is 256-FFT, for the environment type 1, when the AP maps an LTF basic sequence in which L selected for a data stream of each user is equal to 56, to frequency domain subcarriers at intervals of four subcarriers, channel estimation of all subcarriers can be obtained only by using an interpolation factor of 4 when the STA performs channel estimation according to the LTF basic sequence that is despread, that is, channel estimation required for a data symbol can be obtained by using an interpolation factor of 4. However, for the environment type 2, when the AP maps an LTF basic sequence in which L selected for a data stream of each user is equal to 116, to frequency domain subcarriers at intervals of two subcarriers, channel estimation of all subcarriers can be obtained only by using an interpolation factor of 2 when the STA performs channel estimation according to the LTF basic sequence that is despread, that is, channel estimation required for a data symbol can be obtained by using an interpolation factor of 2.

Regardless of whether parameters provided in Table 5b are of the environment type 1 or the environment type 2, the AP may select an LTF basic sequence of a same length for data streams of all users. Therefore, when the STA performs channel estimation according to the LTF basic sequence that is despread, a similar channel estimation interpolation algorithm may be used to obtain channel estimation of all subcarriers. That is, a similar channel estimation interpolation algorithm may be used to obtain channel estimation required for a data symbol. Using the mapping relationship table shown in Table 5b as an example, if a length of a data symbol is 256-FFT, for the environment type 1, the AP selects, for a data stream of each user, an LTF basic sequence in which LTF parameters are S=128 (equivalent to a half of the length of the data symbol) and L=116. Therefore, channel estimation of all subcarriers can be obtained by using an interpolation factor of 2, when the STA performs channel estimation according to the LTF basic sequence that is despread, that is, channel estimation required for the data symbol can be obtained by using an interpolation factor of 2. However, for the environment type 2, the AP selects, for a data stream of each user, an LTF basic sequence in which LTF parameters are S=256 and L=116. When the AP maps the selected LTF basic sequence to frequency domain subcarriers at intervals of two subcarriers, channel estimation of all subcarriers can be obtained by using an interpolation factor of 2 when the STA performs channel estimation according to the LTF basic sequence that is despread, that is, channel estimation required for a data symbol can also be obtained by using an interpolation factor of 2.

TABLE 4

| $N_{SS}$ | Environment type 1 | Environment type 2 |
|---|---|---|
| 7, 8 | S = 256, N = 2, M = 4, L = 56 | S = 256, N = 4, M = 2, L = 116 |
| 5, 6 | S = 256, N = 2, M = 3, L = 56 | S = 256, N = 3, M = 2, L = 116 |
| 3, 4 | S = 256, N = 1, M = 4, L = 56 | S = 256, N = 2, M = 2, L = 116 |
| 2 | S = 256, N = 1, M = 2, L = 116 | |
| 1 | S = 256, N = 1, M = 1, L = 224 | |

TABLE 5

| $N_{SS}$ | Environment type 1 | Environment type 2 |
|---|---|---|
| 7, 8 | S = 512, N = 2, M = 4, L = 116 | S = 512, N = 4, M = 2, L = 224 |
| 5, 6 | S = 512, N = 2, M = 3, L = 116 | S = 512, N = 3, M = 2, L = 224 |
| 3, 4 | S = 512, N = 1, M = 4, L = 116 | S = 512, N = 2, M = 2, L = 224 |
| 2 | S = 512, N = 1, M = 2, L = 224 | |
| 1 | S = 512, N = 1, M = 1, L = 224 | |

TABLE 5a

| $N_{SS}$ | Environment type 1 | Environment type 2 |
|---|---|---|
| 7, 8 | S = 128, N = 4, M = 2, L = 56 | S = 128, N = 8, M = 1, L = 116 |
| 5, 6 | S = 128, N = 3, M = 2, L = 56 | S = 128, N = 6, M = 1, L = 116 |
| 4 | S = 128, N = 2, M = 2, L = 56 | S = 128, N = 4, M = 1, L = 116 |
| 3 | S = 128, N = 2, M = 2, L = 56 | S = 128, N = 3, M = 1, L = 116 |
| 2 | S = 128, N = 1, M = 2, L = 56 | S = 128, N = 2, M = 1, L = 116 |
| 1 | S = 128, N = 1, M = 1, L = 116 | |

TABLE 5b

| $N_{SS}$ | Environment type 1 | Environment type 2 |
|---|---|---|
| 7, 8 | S = 128, N = 8, M = 1, L = 116 | S = 256, N = 4, M = 2, L = 116 |
| 5, 6 | S = 128, N = 6, M = 1, L = 116 | S = 256, N = 3, M = 2, L = 116 |
| 4 | S = 128, N = 4, M = 1, L = 116 | S = 256, N = 2, M = 2, L = 116 |
| 3 | S = 128, N = 3, M = 1, L = 116 | S = 256, N = 2, M = 2, L = 116 |
| 2 | S = 128, N = 2, M = 1, L = 116 | S = 256, N = 1, M = 2, L = 116 |
| 1 | S = 128, N = 1, M = 1, L = 116 | S = 256, N = 1, M = 1, L = 116 |

To ensure accuracy of channel estimation by the STA, the subcarrier quantity M for distinguishing spatial streams needs to be generated according to a different environment in which the AP is located. In addition, to reduce signaling overheads, N needs to be reduced as much as possible while ensuring that M meets a requirement. Specifically, for an AP in the environment type 2, because the AP is located in an outdoor environment, frequency selective fading of a radio channel is great. To ensure accuracy of channel estimation by the STA, the AP needs to map adjacent elements in an LTF basic sequence respectively to subcarriers at intervals that are less than or equal to 2. In this case, a value of the subcarrier quantity M for distinguishing spatial streams is less than or equal to 2. For an AP in the environment type 1, because the AP is located in an indoor environment, frequency selective fading of a radio channel is smaller than that in the outdoor environment. In this way, to ensure accuracy of channel estimation by the STA, the AP needs to map adjacent elements in an LTF basic sequence respectively to subcarriers at intervals that are less than or equal to 4. In this case, a value of the subcarrier quantity M for distinguishing spatial streams is less than or equal to 4.

Manner 3: The mapping relationship table includes a quantity $N_{SS}$ of multiplexed spatial streams, and parameters corresponding to the $N_{SS}$.

For example, types of all APs are 802.11ax, and a formation manner of the mapping relationship table may be shown in Table 6, Table 7, or Table 7a. To reduce signaling overheads, a value of N and a length of an LTF basic symbol should be reduced as much as possible. Specifically, parameters included in the mapping relationship table shown in Table 6, Table 7, or Table 7a include two types of S. When a value of $N_{SS}$ is large, S with a large value may be selected, so that the value of N is reduced. When a value of $N_{SS}$ is small, S with a small value may be selected, so that the length of the LTF basic symbol is reduced when the value of N is reduced. Using the mapping relationship table shown in Table 6 as an example, when $N_{SS}$ is 8, S=256, N=2, M=4, and L=56 are parameters corresponding to the $N_{SS}$ and a type of an environment in which the AP is located. In this case, it can be seen that, the value of S is 256, and the value of N is 2. In the prior art, the value of N is 8 when $N_{SS}$ is 8. Therefore, when the value of $N_{SS}$ is large, the value of N used in the present invention is reduced in comparison with that used in the prior art. That is, the length of the LTF sequence generated by using the parameters in the present invention is shorter than the length of the LTF sequence generated by using the parameters in the prior art. Therefore, signaling overheads are reduced. When $N_{SS}$ is 1, S=64, N=1, M=1, and L=56 are parameters corresponding to the $N_{SS}$. In this case, it can be seen that, when the value of S is 64, the value of N is 1, which is the same as the value of N when $N_{SS}$ is 1 in the prior art. Because the value of S used in the present invention is small, the length of the LTF basic symbol is also short, that is, the length of the LTF sequence generated by using the parameters in the present invention is also short, and therefore, signaling overheads are reduced.

To further reduce signaling overheads, a formation manner of the mapping relationship table may be shown in Table 7b. Parameters included in the mapping relationship table include three types of S. When the value of $N_{SS}$ is large, S with a large value may be selected, so that the value of N is reduced. When the value of $N_{SS}$ is small, S with a small value may be selected, so that the length of the LTF basic symbol is reduced when the value of N is reduced. In the mapping relationship table shown in Table 7b, when $N_{SS}$ is 8, S=256, N=2, M=4, and L=56 are parameters corresponding to the $N_{SS}$. In this case, it can be seen that, when the value of S is 256, the value of N is 2. In the prior art, the value of N is 8 when $N_{SS}$ is 8. Therefore, when the value of $N_{SS}$ is large, the value of N used in the present invention is reduced in comparison with that used in the prior art. That is, the length of the LTF sequence generated by using the parameters in the present invention is shorter than the length of the LTF sequence generated by using the parameters in the prior art. Therefore, signaling overheads are reduced. When $N_{SS}$ is 6, S=128, N=3, M=2, and L=56 are parameters corresponding to the $N_{SS}$. In this case, it can be seen that, when the value of S is 128, the value of N is 3. In the prior art, when $N_{SS}$ is 6, the value of N used is 6. Therefore, when the value of $N_{SS}$ is large, the value of N used in the present invention is reduced in comparison with that used in the prior art. In addition, the length of the LTF basic symbol corresponding to S used in the present invention (the length of the LTF basic symbol corresponding to S used in the present invention is 6.4 µs) is not significantly different from the length of the LTF basic symbol corresponding to S used in the prior art (the length of the LTF basic symbol corresponding to S used in the prior art is 3.2 μs), that is, the length of the LTF sequence generated by using the parameters in the present invention is shorter than the length of the LTF sequence generated by using the parameters in the prior art, and therefore, signaling overheads are reduced. When $N_{SS}$ is 1, S=64, N=1, M=1, and L=56 are parameters corresponding to the $N_{SS}$. It can be seen that, when the value of S is 64, the value of N is 1, which is the same as the value of N when $N_{SS}$ is 1 in the prior art. Because the value of S used in the present invention is small, the length of the LTF basic symbol is also short, that is, the length of the LTF sequence generated by using the parameters in the present invention is also short, and therefore, signaling overheads are reduced.

TABLE 6

| $N_{SS}$ | Parameters |
|---|---|
| 7, 8 | S = 256, N = 2, M = 4, L = 56 |
| 5, 6 | S = 256, N = 2, M = 3, L = 56 |
| 3, 4 | S = 256, N = 1, M = 4, L = 56 |
| 2 | S = 64, N = 2, M = 1, L = 56 |
| 1 | S = 64, N = 1, M = 1, L = 56 |

TABLE 7

| $N_{SS}$ | Parameters |
|---|---|
| 7, 8 | S = 512, N = 2, M = 4, L = 116 |
| 5, 6 | S = 512, N = 2, M = 3, L = 116 |
| 3, 4 | S = 512, N = 1, M = 4, L = 116 |
| 2 | S = 64, N = 2, M = 1, L = 56 |
| 1 | S = 64, N = 1, M = 1, L = 56 |

TABLE 7a

| $N_{SS}$ | Parameters |
|---|---|
| 7, 8 | S = 128, N = 4, M = 2, L = 56 |
| 5, 6 | S = 128, N = 3, M = 2, L = 56 |
| 3, 4 | S = 128, N = 1, M = 2, L = 56 |
| 2 | S = 64, N = 2, M = 1, L = 56 |
| 1 | S = 64, N = 1, M = 1, L = 56 |

TABLE 7b

| $N_{SS}$ | Parameters |
|---|---|
| 7, 8 | S = 256, N = 2, M = 4, L = 56 |
| 5, 6 | S = 128, N = 3, M = 2, L = 56 |
| 4 | S = 256, N = 1, M = 4, L = 56 |
| 3 | S = 64, N = 3, M = 1, L = 56 |
| 2 | S = 128, N = 1, M = 2, L = 56 |
| 1 | S = 64, N = 1, M = 1, L = 56 |

Manner 4: The mapping relationship table includes a quantity $N_{SS}$ of multiplexed spatial streams, modulation and coding scheme (modulation and coding strategy, MCS) feature information, and parameters corresponding to the $N_{SS}$ and the MCS feature information.

The MCS feature information may be acquired from radio channel information exchanged between the AP and a STA, and a size of an MCS reflects the MCS feature information.

For example, types of all APs are 802.11ax, and a formation manner of the mapping relationship table may be shown in Table 8, Table 9, or Table 9a.

TABLE 8

| $N_{SS}$ | MCS0 to MCS4 | MCS5 to MCS9 |
|---|---|---|
| 7, 8 | S = 256, N = 2, M = 4, L = 56 | S = 256, N = 4, M = 2, L = 116 |
| 5, 6 | S = 256, N = 2, M = 3, L = 56 | S = 256, N = 4, M = 2, L = 116 |
| 3, 4 | S = 256, N = 1, M = 4, L = 56 | S = 256, N = 2, M = 2, L = 116 |
| 2 | S = 64, N = 2, M = 1, L = 56 | |
| 1 | S = 64, N = 1, M = 1, L = 56 | |

TABLE 9

| $N_{SS}$ | MCS0 to MCS4 | MCS5 to MCS9 |
|---|---|---|
| 7, 8 | S = 512, N = 2, M = 4, L = 116 | S = 512, N = 4, M = 2, L = 224 |
| 5, 6 | S = 512, N = 2, M = 3, L = 116 | S = 512, N = 4, M = 2, L = 224 |
| 3, 4 | S = 512, N = 1, M = 4, L = 116 | S = 512, N = 2, M = 2, L = 224 |
| 2 | S = 64, N = 2, M = 1, L = 56 | |
| 1 | S = 64, N = 1, M = 1, L = 56 | |

TABLE 9a

| $N_{SS}$ | MCS0 to MCS4 | MCS5 to MCS9 |
|---|---|---|
| 7, 8 | S = 128, N = 4, M = 2, L = 56 | S = 128, N = 8, M = 1, L = 116 |
| 5, 6 | S = 128, N = 3, M = 2, L = 56 | S = 128, N = 6, M = 1, L = 116 |
| 3, 4 | S = 128, N = 2, M = 2, L = 56 | S = 128, N = 4, M = 1, L = 116 |
| 2 | S = 128, N = 1, M = 2, L = 56 | S = 128, N = 2, M = 1, L = 116 |
| 1 | S = 64, N = 1, M = 1, L = 56 | |

To ensure accuracy of channel estimation by the STA, the subcarrier quantity M for distinguishing spatial streams needs to be generated according to the size of the used MCS. In addition, to reduce signaling overheads, N needs to be reduced as much as possible while ensuring that M meets a requirement. Specifically, when the size of the MCS is between 5 and 9, it indicates that the STA is relatively sensitive to a change of a signal-to-noise ratio of a radio channel when the STA performs channel estimation. To ensure accuracy of channel estimation by the STA, the AP needs to map adjacent elements in the LTF basic sequence respectively to subcarriers at intervals that are less than or equal to 2. In this case, a value of the subcarrier quantity M for distinguishing spatial streams is less than or equal to 2. When the size of the MCS is between 0 and 4, it indicates that the STA is not sensitive to a change of a signal-to-noise ratio of a radio channel when the STA performs channel estimation. Likewise, to ensure accuracy of channel estimation by the STA, the AP needs to map adjacent elements in the LTF basic sequence respectively to subcarriers at intervals that are less than or equal to 4. In this case, a value of the subcarrier quantity M for distinguishing spatial streams is less than or equal to 4.

When the formation manner of the mapping relationship table is manner 1, that the AP acquires the LTF parameters according to a preconfigured mapping relationship table may be specifically: using the parameters corresponding to the $N_{SS}$ and the type of the AP as the LTF parameters.

The AP queries the mapping relationship table according to the $N_{SS}$ and the type of the AP, acquires the parameters corresponding to the $N_{SS}$ and the type of the AP, and uses the parameters as the LTF parameters. For example, the mapping relationship table preconfigured in the AP is Table 2 in manner 1. If the type of the AP is the type 2, and the quantity $N_{SS}$ of spatial streams multiplexed by the AP is 8, the AP queries the mapping relationship table according to the $N_{SS}$ and the type of the AP, and may acquire corresponding parameters S=256, N=2, M=4, and L=56, that is, the LTF parameters are S=256, N=2, M=4, and L=56.

When the formation manner of the mapping relationship table is manner 2, that the AP acquires the LTF parameters according to a preconfigured mapping relationship table may be specifically: using, according to the $N_{SS}$ and the type of the environment in which the AP is located, the parameters corresponding to the $N_{SS}$ and the type of the environment in which the AP is located, as the LTF parameters.

The AP queries the mapping relationship table according to the $N_{SS}$ and the type of the environment in which the AP is located, acquires the parameters corresponding to the $N_{SS}$ and the type of the AP, and uses the parameters as the LTF parameters. For example, the mapping relationship table preconfigured in the AP is Table 4 in manner 2. If the type of the environment in which the AP is located is outdoor, and the quantity $N_{SS}$ of spatial streams multiplexed by the AP is 8, the AP queries the mapping relationship table according to the $N_{SS}$ and the type of the environment in which the AP is located, and may acquire corresponding parameters S=256, N=4, M=2, and L=116, that is, the LTF parameters are S=256, N=4, M=2, and L=116.

When the formation manner of the mapping relationship table is manner 3, that the AP acquires the LTF parameters according to a preconfigured mapping relationship table may be specifically: using, according to the $N_{SS}$, the parameters corresponding to the $N_{SS}$ as the LTF parameters.

The AP queries the mapping relationship table according to the $N_{SS}$, acquires the parameters corresponding to the $N_{SS}$, and uses the parameters as the LTF parameters. For example, the mapping relationship table preconfigured in the AP is Table 6 in manner 3. If the quantity $N_{SS}$ of spatial streams multiplexed by the AP is 8, the AP queries the mapping relationship table according to the $N_{SS}$, and may acquire corresponding parameters S=256, N=2, M=4, and L=56, that is, the LTF parameters are S=256, N=2, M=4, and L=56.

When the formation manner of the mapping relationship table is manner 4, that the AP acquires the LTF parameters according to a preconfigured mapping relationship table may be specifically: using, according to the $N_{SS}$ and the MCS feature information, the parameters corresponding to the $N_{SS}$ and the MCS feature information as the LTF parameters.

The AP queries the mapping relationship table according to the $N_{SS}$ and the MCS feature information, acquires the parameters corresponding to the $N_{SS}$ and the MCS feature information, and uses the parameters as the LTF parameters. For example, the mapping relationship table preconfigured in the AP is Table 7 in manner 4. If the quantity $N_{SS}$ of spatial streams multiplexed by the AP is 8, and the MCS feature information is 3, the AP queries the mapping relationship table according to the $N_{SS}$ and the MCS feature information, and may acquire corresponding parameters S=256, N=2, M=4, and L=56, that is, the LTF parameters are S=256, N=2, M=4, and L=56.

S502. The AP performs, according to a frequency domain transform parameter and I, a frequency domain transform on an LTF basic sequence to obtain an LTF symbol.

After the AP acquires the LTF parameters and the start position I of the allocated subcarriers, the AP may perform, according to the frequency domain transform parameter included in the acquired LTF parameters and the acquired start position I of the allocated subcarriers, in frequency domain frequency division multiplexing (Frequency Division Multiplexing, FDM) mode or frequency domain CDM mode, the frequency domain transform on the LTF basic sequence to obtain the LTF symbol.

When the AP uses the frequency domain FDM mode to perform a frequency domain transform on an LTF basic sequence, that the AP performs, according to a frequency domain transform parameter and I, a frequency domain transform on an LTF basic sequence to obtain an LTF symbol may include the following steps S502a1 to S502a4.

S502a1. The AP maps, starting from I, at intervals of $\lfloor S/L \rfloor$ subcarriers, each element in the LTF basic sequence to a corresponding subcarrier to obtain a frequency domain LTF sequence.

The LTF basic sequence is allocated by the AP. When the mapping relationship table preconfigured in the AP uses manner 1, the stored LTF basic sequence is directly acquired. When the mapping relationship table preconfigured in the AP uses any one of manner 2, manner 3, or manner 4, after the AP acquires the LTF parameters, the AP may select, from prestored LTF basic sequences, according to the frequency domain transform parameter L included in the LTF parameters, an LTF basic sequence that needs to be used. For example, when the frequency domain transform parameter L included in the LTF parameters acquired by the AP is 56, an LTF basic sequence selected according to L may be:

LTF basic sequence={1 1LTF$_{left}$0LTF$_{right}$-1-1}, where quantities of elements included in LTF$_{left}$ and LTF$_{right}$ are both 26.

After the AP acquires the LTF parameters, the AP may map, according to the frequency domain transform parameters M, L, and S included in the acquired LTF parameters and the acquired start position I of the allocated subcarriers, starting from I, at intervals of $\lfloor S/L \rfloor$ subcarriers, each element in the LTF basic sequence to a corresponding subcarrier to obtain a frequency domain LTF sequence, where $\lfloor \ \rfloor$ indicates round-down.

Figure 11:
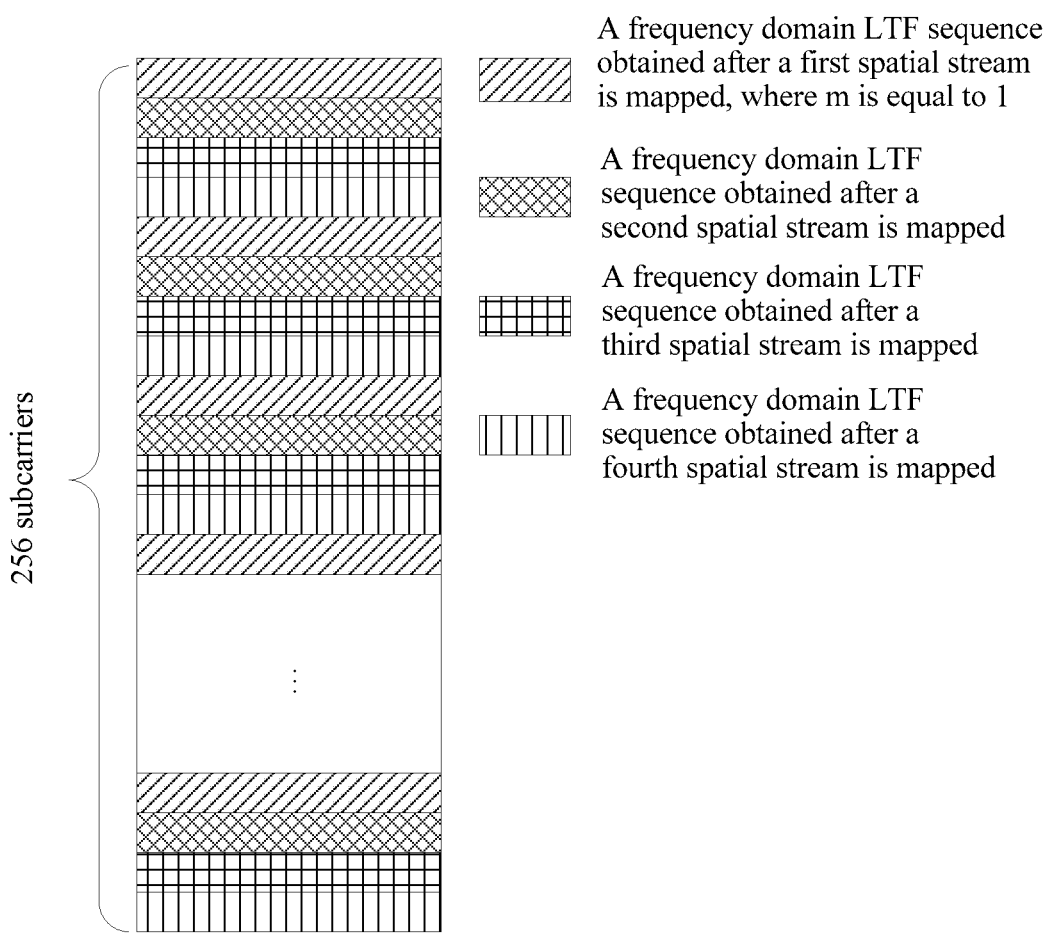
FIG. 11 is a schematic diagram of a frequency domain LTF sequence according to another embodiment of the present invention.

In a possible implementation manner, starting from I, at intervals of $\lfloor S/L \rfloor$ subcarriers, the AP maps each element in the LTF basic sequence to a corresponding subcarrier according to a designed or acquired pattern {f=I+$\lfloor S/L \rfloor$*(l-1); I=I$_0$+m; l=1, K, L; m=0, K, M-1}, where l is the $l^{th}$ element in the LTF basic sequence, I is a start position of subcarriers allocated to a spatial stream, and I$_0$ is a start position of available subcarriers. For example, the mapping relationship table preconfigured in the AP is Table 2 in manner 1. If the type of the AP is the type 2, and the quantity $N_{SS}$ of spatial streams multiplexed by the AP is 8, the AP queries the mapping relationship table according to the $N_{SS}$ and the type of the AP, and may acquire LTF parameters S=256, N=2, M=4, and L=56. When the LTF parameters acquired by the AP are S=256, M=4, and L=56, the AP may determine, according to the frequency domain transform parameter M included in the LTF parameters, that the quantity of spatial streams distinguished in a frequency domain is 4, and correspondingly, the designed or acquired pattern is {f=I+$\lfloor 256/56 \rfloor$*(l-1); I=I$_0$+m; l=1, K, 56; m=0, K, 3}. Using a first spatial stream as an example, assuming that the start position 10 of available subcarriers is equal to 1, and that m is equal to 0, the start position I of subcarriers allocated to the spatial stream is equal to 1. The AP maps, starting from the subcarrier 1, at intervals of four subcarriers, each element in the LTF basic sequence to a corresponding subcarrier according to a designed or acquired pattern {f=1+$\lfloor 256/56 \rfloor$*(l-1); l=1, . . . , 56}. Mapping may be performed for other three spatial streams by referring to the method for mapping the first spatial stream in the frequency domain. FIG. 11 shows a schematic diagram of a frequency domain LTF sequence obtained after frequency domain mapping is performed on the LTF basic sequence for the four spatial streams according to the frequency domain transform parameter and I. Because the four spatial streams distinguished in the frequency domain by the AP are respectively mapped to different subcarriers, the four spatial streams can be distinguished in the frequency domain. A value of m may be any one of 0, 1, 2, or 3, as long as it is ensured that the value is different from a value of m corresponding to any other spatial stream. Corresponding m may be selected according to an actual application scenario, and the value of m is not limited herein in the embodiment of the present invention.

S502a2. The AP performs an S-point IFFT transform on the frequency domain LTF sequence to obtain an LTF basic symbol.

After the AP maps, starting from I, at intervals of ⌊S/L⌋ subcarriers, each element in the LTF basic sequence to the corresponding subcarrier to obtain the frequency domain LTF sequence, the AP may perform the S-point IFFT transform on the frequency domain LTF sequence to obtain the LTF basic symbol.

S502a3. The AP combines the LTF basic symbol with a CP to generate the LTF symbol.

The CP is the same as an element in [($L_1$−Lcp), $L_1$] in the LTF basic symbol, where $L_1$ is a length of the LTF basic symbol, and Lcp is a length of the CP.

When the AP uses the frequency domain CDM mode to perform a frequency domain transform on an LTF basic sequence, that the AP performs, according to a frequency domain transform parameter and I, a frequency domain transform on an LTF basic sequence to obtain an LTF symbol may include the following steps S502b1 to S502b4.

In the process in which the AP uses the frequency domain CDM mode to perform the frequency domain transform on the LTF basic sequence, the frequency domain transform parameter M may be specifically a quantity of contiguous subcarriers for distinguishing spatial streams.

S502b1. The AP performs, according to M, spread spectrum processing on each element in the LTF basic sequence to obtain an LTF spread spectrum sequence.

The AP may determine, according to M, the quantity of spatial streams distinguished in the frequency domain. For each spatial stream, the AP repeats each element for M times, and then multiplies the element by a corresponding frequency domain spread spectrum sequence to obtain an LTF spread spectrum sequence, where the LTF spread spectrum sequence includes M*L elements.

In a possible implementation manner, the spread spectrum sequence may be a sequence {p(i,1), K, p(i,M)} i=1, K M in the $i^{th}$ row of an M*M-dimensional P-matrix, where i is the $i^{th}$ row of the P-matrix. For example, for ease of understanding by a person skilled in the art, the LTF parameters (S=256, N=2, M=4, and L=56) acquired in the example in step S502a1 is still used as an example. According to the frequency domain transform parameter M included in the LTF parameters, it may be determined that the P-matrix is 4*4-dimensional and that the quantity of spatial streams distinguished in the frequency domain is 4. Using the first spatial stream as an example, assuming that a spread spectrum sequence of the first spatial stream is a sequence in the first row of the P-matrix, after repeating each element in the LTF basic sequence for four times, the AP multiplies the element by the spread spectrum sequence (the sequence in the first row of the P-matrix) of the spatial stream to obtain an LTF spread spectrum sequence including 4*56 elements. Spread spectrum processing may be performed for other three spatial streams by referring to the method for spread spectrum processing of the first spatial stream. Because the spatial streams distinguished in the frequency domain by the AP are respectively multiplied by sequences in different rows of the P-matrix during spread spectrum processing, the four spatial streams can be distinguished in the frequency domain. The spread spectrum sequence of the first spatial stream is the sequence in the $i^{th}$ row of the P-matrix, where a value of i may be any one of 1, 2, 3, or 4, as long as it is ensured that the value is different from a spread spectrum sequence of any other spatial stream. Corresponding i may be selected according to an actual application scenario, and the value of i is not limited herein in the embodiment of the present invention.

S502b2. The AP maps, starting from I, each element in the LTF spread spectrum sequence to a corresponding subcarrier to obtain a frequency domain LTF sequence.

After the AP performs, according to M, spread spectrum processing on each element in the LTF basic sequence to obtain the LTF spread spectrum sequence, the AP maps, starting from I, each element in the LTF spread spectrum sequence to the corresponding subcarrier to obtain the frequency domain LTF sequence.

Figure 12:
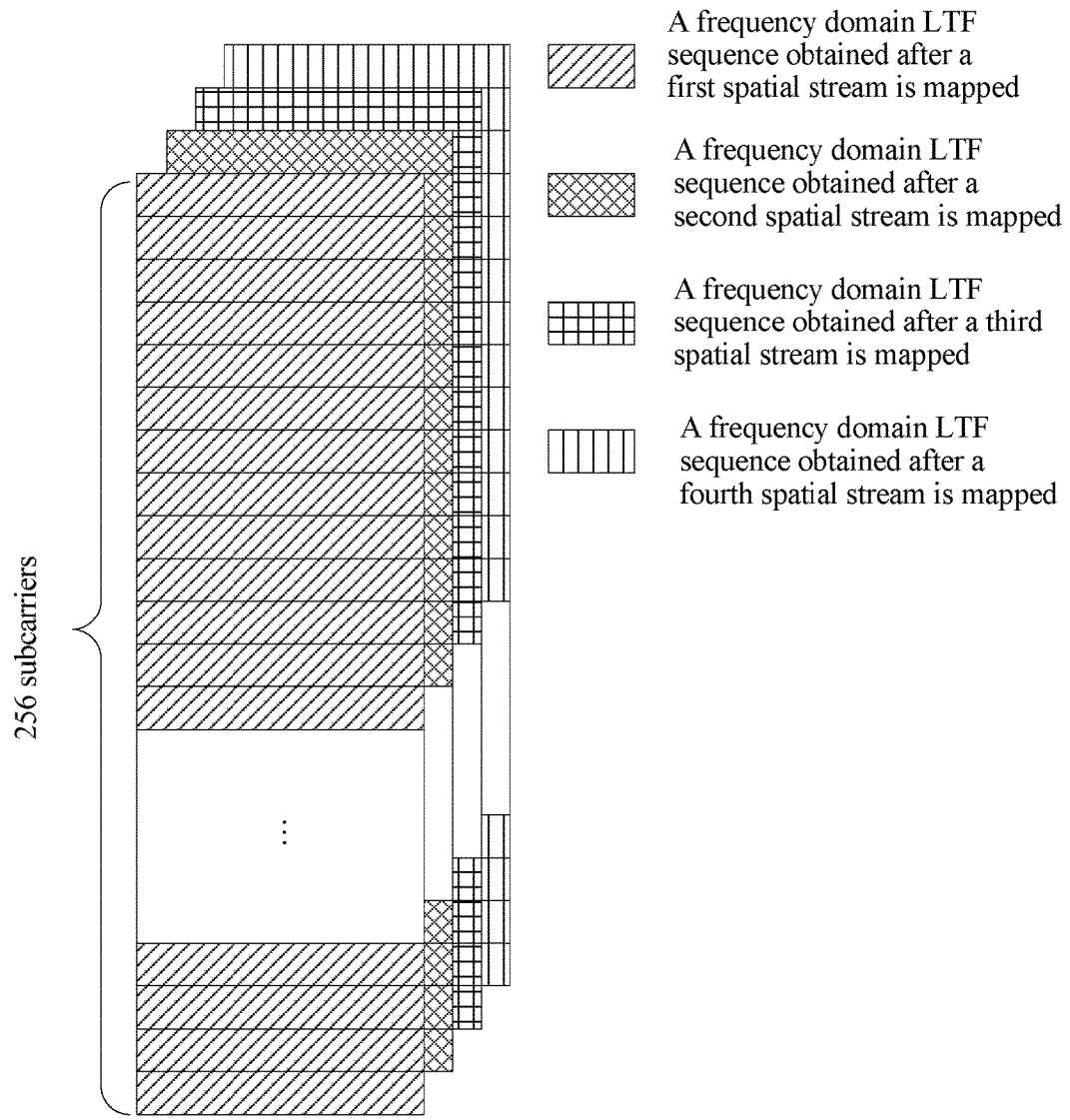
FIG. 12 is a schematic diagram of another frequency domain LTF sequence according to another embodiment of the present invention.

In a possible implementation manner, the AP maps, starting from I, each element in the LTF spread spectrum sequence to the corresponding subcarrier according to a designed or acquired pattern {f=[I+0+⌊S/L⌋*(l−1)], K, [I+(M−1)+⌊S/L⌋*(l−1)]; I=$I_0$, l=1, K, L}. l is the $l^{th}$ element in the LTF spread spectrum sequence, I is a start position of subcarriers allocated to a spatial stream, and $I_0$ is a start position of available subcarriers. For example, for ease of understanding by a person skilled in the art, the LTF parameters (S=256, N=2, M=4, and L=56) acquired in the example in step S502a1 is still used as an example. According to the frequency domain transform parameter M included in the LTF parameters, it may be determined that the quantity of spatial streams distinguished in the frequency domain is 4. Correspondingly, the designed or acquired pattern is {f=[I+⌊256/56⌋*(l−1)+0], K, [I+⌊256/56⌋*(l−1)+3]; l=1, K, 56}. Using the first spatial stream as an example, assuming that the start position $I_0$ of available subcarrier is equal to 1, the start position I of subcarriers allocated to the spatial stream in the frequency domain is equal to 1. The AP maps, starting from the subcarrier 1, each element in the LTF spread spectrum sequence to a corresponding subcarrier according to the designed or acquired pattern {f=[1+⌊256/56⌋*(l−1)], K, [4+⌊256/56⌋*(l−1)]; l=1, K, 56}. Mapping may be performed for the other three spatial streams by referring to the method for mapping the first spatial stream in the frequency domain. FIG. 12 shows a schematic diagram of a frequency domain LTF sequence obtained after frequency domain mapping is performed on the LTF spread spectrum sequence for the four spatial streams according to the frequency domain transform parameter and I.

S502b3. The AP performs an S-point IFFT transform on the frequency domain LTF sequence to obtain an LTF basic symbol.

S502b4. The AP combines the LTF basic symbol with a CP to generate the LTF symbol.

The CP is the same as an element in [($L_1$−Lcp), $L_1$] in the LTF basic symbol, where $L_1$ is a length of the LTF basic symbol, and Lcp is a length of the CP.

After the AP obtains the LTF symbol, the AP may perform, according to the time domain transform parameter, a time domain transform on the LTF symbol to obtain the LTF sequence. Specifically, step S503 may be included.

S503. The AP performs, according to N, spread spectrum processing on the LTF symbol to generate an LTF sequence.

The AP may determine, according to N, a quantity of spatial streams distinguished in a time domain. For each spatial stream, the AP repeats the LTF symbol for N times, and then multiplies the LTF symbol by a corresponding spread spectrum sequence to generate the LTF sequence.

In a possible implementation manner, the spread spectrum sequence may be a sequence {p(j,1), K, p(j,N)} j=1, K, N in the $j^{th}$ row of an N*N-dimensional P-matrix, where j is the $j^{th}$ row of the P-matrix. For example, for ease of understanding by a person skilled in the art, the LTF parameters (S=256, N=2, M=4, and L=56) acquired in the example in step S502a1 is still used as an example. According to the time domain transform parameter N included in the LTF parameters, it may be determined that, the P-matrix is 2*2-dimensional and that the quantity of spatial streams distinguished in the time domain is 2. Using the first spatial stream as an example, assuming that the spread spectrum sequence of the first spatial stream is a sequence in the first row of the P-matrix, after repeating the LTF symbol for two times, the AP multiplies the LTF symbol by the spread spectrum sequence (the sequence in the first row of the P-matrix) of the spatial stream to generate an LTF sequence. Spread spectrum processing may be performed for the other three spatial streams by referring to the method for spread spectrum processing of the first spatial stream. Because the spatial streams distinguished in the time domain by the AP are respectively multiplied by sequences in different rows of the P-matrix, the two spatial streams can be distinguished in the time domain. The spread spectrum sequence of the first spatial stream is the sequence in the $j^{th}$ row of the P-matrix, where a value of j may be either 1 or 2, as long as it is ensured that the value is different from a spread spectrum sequence of the other spatial stream. Corresponding j may be selected according to an actual application scenario, and the value of j is not limited herein in the embodiment of the present invention.

In summary, because M spatial streams can be distinguished in the frequency domain by using different subcarriers, and N spatial streams can be distinguished in the time domain by using different spread spectrum sequences, M*N spatial streams can be distinguished through a frequency domain transform and a time domain transform.

Assuming that bandwidth of a wireless local area network is 20 MHz, and that a CP is equal to 3.2 µs, a length of an LTF sequence generated by using the present invention through a frequency domain transform and a time domain transform is compared with a length of an LTF sequence generated by using the prior art through a time domain transform. When the mapping relationship table preconfigured in the AP uses Table 2 in manner 1, a specific comparison result is shown in Table 10:

TABLE 10

| $N_{SS}$ | Length of an LTF sequence generated by using the prior art | Length of an LTF sequence generated by using the present invention | Difference between the length of the LTF sequence generated by using the present invention and the length of the LTF sequence generated by using the prior art |
|---|---|---|---|
| 7, 8 | 8 * (CP + 3.2) | 2 * (CP + 12.8) | −6CP |
| 5, 6 | 6 * (CP + 3.2) | 2 * (CP + 12.8) | −4CP + 6.4 µs |
| 3, 4 | 4 * (CP + 3.2) | (CP + 12.8) | −3CP |
| 2 | 2 * (CP + 3.2) | (CP + 12.8) | −CP + 6.4 µs |
| 1 | (CP + 3.2) | (CP + 12.8) | +9.6 µs |

It can be seen from Table 10 that, when the quantity $N_{SS}$ of multiplexed spatial streams is greater than 2, the length of the LTF sequence generated by the AP by using the method provided by the embodiment of the present invention is shorter than the length of the LTF sequence generated by using the prior art.

When the mapping relationship table preconfigured in the AP uses Table 2 in manner 1, a specific comparison result is shown in Table 11.

TABLE 11

| $N_{SS}$ | Length of an LTF sequence generated by using the prior art | Length of an LTF sequence generated by using the present invention | Difference between the length of the LTF sequence generated by using the present invention and the length of the LTF sequence generated by using the prior art |
|---|---|---|---|
| 7, 8 | 8 * (CP + 3.2) | (CP + 25.6) | −7CP |
| 5, 6 | 6 * (CP + 3.2) | (CP + 25.6) | −5CP + 6.4 µs |
| 3, 4 | 4 * (CP + 3.2) | (CP + 25.6) | −3CP + 12.8 µs |
| 2 | 2 * (CP + 3.2) | (CP + 25.6) | −CP + 19.2 µs |
| 1 | (CP + 3.2) | (CP + 25.6) | +22.4 µs |

It can be seen from Table 11 that, when the quantity $N_{SS}$ of multiplexed spatial streams is greater than 4, the length of the LTF sequence generated by the AP by using the method provided by the embodiment of the present invention is shorter than the length of the LTF sequence generated by using the prior art.

When the mapping relationship table preconfigured in the AP uses Table 6 in manner 3, a specific comparison result is shown in Table 12.

TABLE 12

| $N_{SS}$ | Length of an LTF sequence generated by using the prior art | Length of an LTF sequence generated by using Table 6 | Difference between the length of the LTF sequence generated by using the present invention and the length of the LTF sequence generated by using the prior art |
|---|---|---|---|
| 7, 8 | 8 * (CP + 3.2) | 2 * (CP + 12.8) | −6CP |
| 5, 6 | 6 * (CP + 3.2) | 2 * (CP + 12.8) | −4CP + 6.4 µs |
| 3, 4 | 4 * (CP + 3.2) | (CP + 12.8) | −3CP |
| 2 | 2 * (CP + 3.2) | 2 * (CP + 3.2) | 0 |
| 1 | (CP + 3.2) | (CP + 3.2) | 0 |

It can be seen from Table 12 that, the length of the LTF sequence generated by the AP by using the method provided by the embodiment of the present invention is shorter than the length of the LTF sequence generated by using the method provided by the prior art.

When the mapping relationship table preconfigured in the AP uses Table 7a in manner 3, a specific comparison result is shown in Table 13:

TABLE 13

| $N_{SS}$ | Length of an LTF sequence generated by using the prior art | Length of an LTF sequence generated by using the present invention | Difference between the length of the LTF sequence generated by using the present invention and the length of the LTF sequence generated by using the prior art |
|---|---|---|---|
| 7, 8 | 8 * (CP + 3.2) | 4 * (CP + 6.4) | −4CP |
| 5, 6 | 6 * (CP + 3.2) | 3 * (CP + 6.4) | −3CP |

TABLE 13-continued

| $N_{SS}$ | Length of an LTF sequence generated by using the prior art | Length of an LTF sequence generated by using the present invention | Difference between the length of the LTF sequence generated by using the present invention and the length of the LTF sequence generated by using the prior art |
|---|---|---|---|
| 3, 4 | 4 * (CP + 3.2) | (CP + 6.4) | −3CP − 6.4 |
| 2 | 2 * (CP + 3.2) | 2 * (CP + 3.2) | 0 |
| 1 | (CP + 3.2) | (CP + 3.2) | 0 |

It can be seen from Table 13 that, when the quantity $N_{SS}$ of multiplexed spatial streams is greater than 2, the length of the LTF sequence generated by the AP by using the method provided by the embodiment of the present invention is shorter than the length of the LTF sequence generated by using the method provided by the prior art.

When the mapping relationship table preconfigured in the AP uses Table 7b in manner 3, a specific comparison result is shown in Table 14:

TABLE 14

| $N_{SS}$ | Length of an LTF sequence generated by using the prior art | Length of an LTF sequence generated by using the present invention | Difference between the length of the LTF sequence generated by using the present invention and the length of the LTF sequence generated by using the prior art |
|---|---|---|---|
| 7, 8 | 8 * (CP + 3.2) | 2 * (CP + 12.8) | −6CP |
| 5, 6 | 6 * (CP + 3.2) | 3 * (CP + 6.4) | −3CP |
| 4 | 4 * (CP + 3.2) | (CP + 12.8) | −3CP |
| 3 | 4 * (CP + 3.2) | 3 * (CP + 3.2) | −CP − 3.2 |
| 2 | 2 * (CP + 3.2) | (CP + 6.4) | −CP |
| 1 | (CP + 3.2) | (CP + 3.2) | 0 |

It can be seen from Table 14 that, when the quantity $N_{SS}$ of multiplexed spatial streams is greater than 1, the length of the LTF sequence generated by the AP by using the method provided by the embodiment of the present invention is shorter than the length of the LTF sequence generated by using the method provided by the prior art.

Because the STA needs to parse the LTF sequence to obtain the LTF basic sequence, the STA needs to learn the LTF parameters that are used by the AP to generate the LTF sequence. To reduce signaling overheads, the AP may notify the STA of indication information for acquiring the LTF parameters. Therefore, the AP adds the LTF sequence to a first data frame, and sends the first data frame to the STA. Specifically, the following step S504 may be included.

S504. The AP adds the LTF sequence and indication information to a first data frame, and sends the first data frame to a STA.

When the formation manner of the mapping relationship table preconfigured in the AP is manner 1, the indication information may include the quantity $N_{SS}$ of multiplexed spatial streams, or the indication information includes the quantity $N_{SS}$ of multiplexed spatial streams and the subcarrier quantity S.

When the formation manner of the mapping relationship table preconfigured in the AP is manner 2, the indication information includes the quantity $N_{SS}$ of multiplexed spatial streams.

When the formation manner of the mapping relationship table preconfigured in the AP is manner 3, the indication information includes the quantity $N_{SS}$ of multiplexed spatial streams, or the indication information includes the quantity N of the LTF symbols included in the LTF sequence.

When the formation manner of the mapping relationship table preconfigured in the AP is manner 4, the indication information includes the quantity $N_{SS}$ of multiplexed spatial streams and the MCS feature information.

It should be noted that, for the indication information carried in the first data frame, a corresponding parameter may be selected according to an actual application scenario. A specific parameter included in the indication information is not limited herein in the embodiment of the present invention.

S505. The STA receives the first data frame that carries the LTF sequence and the indication information and that is sent by the AP.

S506. The STA acquires the LTF parameters according to the indication information and a preconfigured mapping relationship table, and acquires the start position I of the allocated subcarriers.

The STA may acquire, according to explicit signaling (explicit signaling) sent by the AP, the start position I of the subcarriers allocated to the spatial stream, or may acquire, according to implicit signaling (implicit signaling) sent by the AP, the start position I of the subcarriers allocated to the spatial stream. When the STA acquires, according to the implicit signaling sent by the AP, the start position I of the subcarriers allocated to the spatial stream, the start position I of the allocated subcarriers that is acquired by the STA is a default sequence of the received spatial stream.

When a formation manner of the mapping relationship table preconfigured in the STA is manner 1, in a first possible implementation manner, when the indication information includes the $N_{SS}$ and the STA has acquired the type of the AP when accessing the AP, that the STA acquires the LTF parameters according to the indication information and a preconfigured mapping relationship table may specifically include: the STA uses, according to the $N_{SS}$ and the type of the AP, the parameters corresponding to the $N_{SS}$ and the type of the AP as the LTF parameters.

The STA queries the mapping relationship table according to the $N_{SS}$ and the type of the AP, acquires the parameters corresponding to the $N_{SS}$ and the type of the AP, and uses the parameters as the LTF parameters.

In a second possible implementation manner, when the indication information includes the $N_{SS}$ and the subcarrier quantity S, and the STA has not acquired the type of the AP when accessing the AP, that the STA acquires the LTF parameters according to the indication information and a preconfigured mapping relationship table may specifically include: the STA determines the type of the AP according to S, and uses, according to the $N_{SS}$ and the type of the AP, the parameters corresponding to the $N_{SS}$ and the type of the AP as the LTF parameters.

In the mapping relationship table preconfigured in the STA, because a correspondence exists between S and the type of the AP, the STA may determine the type of the AP by querying the mapping relationship table according to S. After determining the type of the AP, the STA queries the mapping relationship table according to the $N_{SS}$ and the determined type of the AP, and uses the found parameters as the LTF parameters.

In a third possible implementation manner, when the indication information includes the $N_{SS}$, and the STA has not acquired the type of the AP when accessing the AP, the process in which the STA acquires the LTF parameters according to the indication information and the preconfigured mapping relationship table may specifically include:

the STA determines S according to the length of the CP, determines the type of the AP according to S, and uses, according to the $N_{SS}$ and the type of the AP, the parameters corresponding to the $N_{SS}$ and the type of the AP as the LTF parameters.

The STA may acquire, from information exchanged with the AP when accessing the AP, that the length of the CP is Lcp. Assuming that the length of the LTF symbol is $L_2$, because the CP is the same as an element in $[(L_2-Lcp), L_2]$ in the LTF symbol, an autocorrelation operation may be performed on an element in [0, Lcp] of the LTF symbol and an element in $[(L_2-Lcp), L_2]$, and an obtained autocorrelation peak is compared with a preset threshold. If the obtained autocorrelation peak exceeds the preset threshold, it may be determined that the length of the LTF symbol is $L_2$. If the obtained autocorrelation peak does not exceed the preset threshold, the length of the LTF symbol may be reassumed to be $L_3$. Then an autocorrelation operation is performed on an element of the LTF symbol in [0, Lcp] and an element in $[(L_3-Lcp), L_3]$, and an obtained autocorrelation peak is compared with the preset threshold. If the obtained autocorrelation peak exceeds the preset threshold, it may be determined that the length of the LTF symbol is $L_3$. If the obtained autocorrelation peak does not exceed the preset threshold, the length of the LTF symbol may be reassumed, until the length of the LTF symbol is determined. After the STA determines the length of the LTF symbol, because the length of the LTF symbol is equal to a length of a symbol plus the length of the CP, and the length of the CP is known, the length of the symbol (the length of the LTF symbol minus the length of the CP) may be obtained according to the determined length of the LTF symbol. Then S may be determined according to the correspondence between the length of the symbol and S. In this case, the mapping relationship table may be queried according to S, and the type of the AP is determined. After determining the type of the AP, the STA queries the mapping relationship table according to the $N_{SS}$ and the determined type of the AP, and uses the found parameters as the LTF parameters.

When a formation manner of the mapping relationship table preconfigured in the STA is manner 2, when the indication information includes the $N_{SS}$, and when accessing the AP, the STA has acquired the type of the environment in which the AP is located, that the STA acquires the LTF parameters according to the indication information and a preconfigured mapping relationship table may include: the STA uses, according to the $N_{SS}$ and the type of the environment in which the AP is located, the parameters corresponding to the $N_{SS}$ and the type of the environment in which the AP is located, as the LTF parameters.

The STA queries the mapping relationship table according to the $N_{SS}$ and the type of the environment in which the AP is located, acquires the parameters corresponding to the $N_{SS}$ and the type of the AP, and uses the parameters as the LTF parameters.

When a formation manner of the mapping relationship table preconfigured in the STA is manner 3, in a first possible implementation manner, when the indication information includes the $N_{SS}$, that the STA acquires the LTF parameters according to the indication information and a preconfigured mapping relationship table may include: the STA determines, according to the $N_{SS}$, that the parameters corresponding to the $N_{SS}$ are the LTF parameters.

The STA queries the mapping relationship table according to the $N_{SS}$, acquires the parameters corresponding to the $N_{SS}$, and uses the parameters as the LTF parameters.

In a second possible implementation manner, when the indication information includes the quantity N of the LTF symbols included in the LTF sequence, that the STA acquires the LTF parameters according to the indication information and a preconfigured mapping relationship table may include: the STA determines the subcarrier quantity S according to the length of the CP, then determines the $N_{SS}$ according to N and S, and further determines, according to the $N_{SS}$, that the parameters corresponding to the $N_{SS}$ are the LTF parameters.

It should be noted that, for the method for determining the subcarrier quantity S according to the length of the CP by the STA, reference may be made to the description of related content in the embodiment of the present invention. Details are not described herein.

The STA may determine the $N_{SS}$ by querying the mapping relationship table according to N and S, then query the mapping relationship table according to the determined $N_{SS}$ to obtain the parameters corresponding to the $N_{SS}$, and determine that the corresponding parameters are the LTF parameters.

It should be noted that, for the method for determining the subcarrier quantity S according to the length of the CP by the STA, reference may be made to the description of related content in the embodiment of the present invention. Details are not described herein.

When a formation manner of the mapping relationship table preconfigured in the STA is manner 4, when the indication information includes the $N_{SS}$ and the MCS feature information, the process in which the STA acquires the LTF parameters according to the indication information and the preconfigured mapping relationship table may include: the STA uses, according to the $N_{SS}$ and the MCS feature information, the parameters corresponding to the $N_{SS}$ and the MCS feature information as the LTF parameters.

The STA queries the mapping relationship table according to the $N_{SS}$ and the MCS feature information, acquires the parameters corresponding to the $N_{SS}$ and the MCS feature information, and uses the parameters as the LTF parameters.

After the STA acquires the LTF parameters and the start position I of the allocated subcarriers, the STA performs, according to the time domain transform parameter, a time domain inverse transform on the LTF sequence to obtain the LTF symbol. Specifically, step S507 may be included.

S507. The STA performs, according to N, despread processing on the LTF sequence to obtain the LTF symbol.

The STA may determine, according to N, the quantity of spatial streams distinguished in the time domain. For each spatial stream, the STA multiplies the LTF sequence by a corresponding spread spectrum sequence to obtain the LTF symbol. The spread spectrum sequence is the sequence in the $j^{th}$ row in the N*N-dimensional P-matrix, and may be acquired in a process of exchanging information with the AP. For example, for ease of understanding by a person skilled in the art, the LTF parameters (S=256, N=2, M=4, and L=56) acquired in the example in step S502a1 is still used as an example. According to the time domain transform parameter N included in the LTF parameters, it may be determined that, the P-matrix is 2*2-dimensional and that the quantity of spatial streams distinguished in the time domain is 2. Using the first spatial stream as an example, the STA acquires, in the process of exchanging information with the AP, that the spread spectrum sequence of the first spatial stream is the sequence in the first row in the 2*2-dimensional P-matrix. Therefore, the STA may obtain the LTF symbol by multiplying the LTF sequence by the sequence in the first row in the 2*2-dimensional P-matrix. For a second spatial stream, despread processing may be performed by referring to the despread processing of the first spatial stream. The spread spectrum sequence used by the STA in the LTF sequence despread process is acquired from the information exchanged with the AP, that is, the spread spectrum sequence is the same as the spread spectrum sequence used in the spread spectrum processing at the AP end. Therefore, it can be ensured that the STA can properly despread the LTF symbol.

S508. The STA performs, according to the frequency domain transform parameter and I, a frequency domain inverse transform on the LTF symbol to obtain the LTF basic sequence.

After the STA performs, according to the time domain transform parameter, the time domain inverse transform on the LTF sequence to obtain the LTF symbol, the STA may perform, according to the frequency domain transform parameter and I in frequency domain FDM mode or frequency domain CDM mode, the frequency domain inverse transform on the LTF symbol to obtain the LTF basic sequence.

When the AP uses the frequency domain FDM mode to perform the frequency domain transform on the LTF symbol to obtain the LTF basic sequence, the STA may use the frequency domain FDM mode to perform the frequency domain inverse transform on the LTF symbol. When the STA uses the frequency domain FDM mode to perform the frequency domain inverse transform on the LTF symbol, that the STA performs, according to the frequency domain transform parameter and I, a frequency domain inverse transform on the LTF symbol to obtain the LTF basic sequence may specifically include the following steps S508$a$1 to S508$a$3:

S508$a$1. The STA determines the LTF basic symbol according to the LTF symbol.

The CP is an element in [0, Lcp] in the LTF symbol, and the LTF basic symbol may be obtained after the element in [0, Lcp] in the LTF symbol is removed.

S508$a$2. The STA performs an S-point FFT transform on the LTF basic symbol to obtain the frequency domain LTF sequence.

S508$a$3. The STA extracts, starting from I, at intervals of $\lfloor S/L \rfloor$ subcarriers, the LTF basic sequence according to the frequency domain LTF sequence.

After the STA obtains the frequency domain LTF sequence, the STA may perform, starting from I and according to the designed or acquired pattern, inverse mapping processing on the frequency domain LTF sequence according to the acquired M, L, S, and I, where $\lfloor \ \rfloor$ indicates round-down.

In a possible implementation manner, the STA extracts, starting from I, at intervals of $\lfloor S/L \rfloor$ subcarriers, the LTF basic sequence from the frequency domain LTF sequence according to the designed or acquired pattern $\{f=I+\lfloor S/L \rfloor*(l-1); I=I_0+m; l=1, K, L; m=0, K, M-1\}$, where l is the $l^{th}$ element in the frequency domain LTF sequence, I is a start position of subcarriers allocated to a spatial stream, and $I_0$ is a start position of available subcarriers. For example, for ease of understanding by a person skilled in the art, the LTF parameters (S=256, N=2, M=4, and L=56) acquired in the example in step S502$a$1 is still used as an example. According to the frequency domain transform parameter M included in the LTF parameters, it may be determined that the quantity of spatial streams distinguished in the frequency domain is 4.

Correspondingly, the designed or acquired pattern is $\{f=I+\lfloor 256/56 \rfloor*(l-1); I=I_0+m; l=1, K, 56; m=0, K, 3\}$. Using the first spatial stream as an example, m corresponding to the first spatial stream may be acquired in the process of exchanging information with the AP. In this case, the acquired m is equal to 0. Because the start position $I_0$ of available subframes is 1, the start position I of subcarriers allocated to the spatial stream is equal to 1. The STA extracts, starting from the subcarrier 1, at intervals of four subcarriers, the LTF basic sequence of the spatial stream from the frequency domain LTF sequence according to the designed or acquired pattern $\{f=1+\lfloor 256/56 \rfloor*(l-1); l=1, \ldots, 56\}$. Inverse mapping processing may be performed for the other three spatial streams by referring to the method for inverse mapping processing of the first spatial stream.

When the AP uses the frequency domain CDM mode to perform the frequency domain transform on the LTF basic sequence to obtain the LTF symbol, the STA may use the frequency domain CDM mode to perform the frequency domain inverse transform on the LTF symbol. When the STA uses the frequency domain CDM mode to perform the frequency domain inverse transform on the LTF symbol, that the STA performs, according to the frequency domain transform parameter and I, a frequency domain inverse transform on the LTF symbol to obtain the LTF basic sequence may specifically include steps S508$b$1 to S508$b$4.

In the process in which the STA uses the frequency domain CDM mode to perform the frequency domain inverse transform on the LTF symbol, the frequency domain transform parameter M may be specifically a quantity of contiguous subcarriers for distinguishing spatial streams.

S508$b$1. The STA determines the LTF basic symbol according to the LTF symbol.

It should be noted that, for the process in which the STA determines the LTF basic symbol according to the LTF symbol, reference may be made to the detailed description in step S508$a$1. Details are not described herein.

S508$b$2. The STA performs an S-point FFT transform on the LTF basic symbol to obtain the frequency domain LTF sequence.

S508$b$3. The STA extracts, starting from I, the LTF spread spectrum sequence from the corresponding subcarriers according to the frequency domain LTF sequence.

After the STA obtains the frequency domain LTF sequence, the STA performs, starting from I and according to the designed or acquired pattern, inverse mapping processing on the frequency domain LTF sequence to obtain the LTF spread spectrum sequence, where the LTF spread spectrum sequence includes M*L elements.

In a possible implementation manner, the STA extracts, starting from I, the LTF spread spectrum sequence from the corresponding subcarriers according to the designed or acquired pattern $\{f=[I+0+\lfloor S/L \rfloor*(l-1)], K, [I+(M-1)+\lfloor S/L \rfloor*(l-1)]; I=I_0, l=1, K, L\}$, where l is the $l^{th}$ element in the LTF sequence, I is a start position of subcarriers allocated to a spatial stream, and $I_0$ is a start position of available subcarriers. For example, for ease of understanding by a person skilled in the art, the LTF parameters (S=256, N=2, M=4, and L=56) acquired in the example in step S502$a$1 is still used as an example. According to the frequency domain transform parameter M included in the LTF parameters, it may be determined that the quantity of spatial streams distinguished in the frequency domain is 4. Correspondingly, the designed or acquired pattern is $\{f=[I+\lfloor 256/56 \rfloor*(l-1)+0], K, [I+\lfloor 256/56 \rfloor*(l-1)+3]; l=1, K, 56\}$. Using the first spatial stream as an example, because the start position $I_0$ of available subcarriers is equal to 1, the start position I of subcarriers allocated to the spatial stream is equal to 1. The STA extracts, starting from the subcarrier 1, the LTF spread spectrum sequence of the spatial stream from the corresponding subcarriers according to the designed or acquired pattern {f=[1+⌊256/56⌋*(l−1)], K, [4+⌊256/56⌋*(l−1)]; l=1, K, 56}. Inverse mapping processing may be performed for the other three spatial streams by referring to the method for inverse mapping processing of the first spatial stream.

S508b4. The STA performs, according to M, despread processing on the LTF spread spectrum sequence to obtain the LTF basic sequence.

The STA may determine, according to M, the quantity of spatial streams distinguished in the frequency domain. For each spatial stream, the STA multiplies the LTF spread spectrum sequence by a corresponding spread spectrum sequence to obtain the LTF basic sequence. The spread spectrum sequence is a sequence in the $i^{th}$ row in the M*M-dimensional P-matrix, and may be acquired in the process of exchanging information with the AP. For example, for ease of understanding by a person skilled in the art, the LTF parameters (S=256, N=2, M=4, and L=56) acquired in the example in step S502a1 is still used as an example. According to the time domain transform parameter M included in the LTF parameters, it may be determined that the P-matrix is 4*4-dimensional and that the quantity of spatial streams distinguished in the frequency domain is 4. Using the first spatial stream as an example, the STA acquires, in the process of exchanging information with the AP, that the spread spectrum sequence of the first spatial stream is a sequence in the first row in the 4*4-dimensional P-matrix. Therefore, the STA may obtain the LTF basic sequence by multiplying the LTF sequence by the sequence in the first row in the 4*4-dimensional P-matrix. For the other three spatial streams, despread processing may be performed by referring to the despread processing of the first spatial stream. The spread spectrum sequence used by the STA in the process of despreading the LTF spread spectrum sequence is acquired from the information exchanged with the AP, that is, the spread spectrum sequence is the same as the spread spectrum sequence used in the spread spectrum processing at the AP end. Therefore, it can be ensured that the STA can properly despread the LTF basic sequence.

S509. The STA performs channel estimation according to the LTF basic sequence.

After the STA despreads the LTF basic sequence, the STA may perform channel estimation according to the LTF basic sequence, and may further perform CFO estimation according to the LTF basic sequence. After the STA obtains the channel estimation and CFO estimation of the subcarriers carrying the LTF basic sequence, channel estimation of all subcarriers is obtained by interpolation. Then the STA detects data in a corresponding spatial stream according to the obtained channel estimation and CFO estimation.

It should be noted that, the method for transmitting a data frame according to the embodiment of the present invention is not only applicable to an application scenario in which a MU-MIMO technology is used in a downlink of a wireless local area network, but also applicable to an application scenario in which a SU-MIMO technology is used in the downlink of the wireless local area network and an application scenario in which the MU-MIMO technology and the SU-MIMO technology are used in the downlink of the wireless local area network. For the application scenario in which the SU-MIMO technology is used in the downlink of the wireless local area network, the method for transmitting a data frame is the same as or similar to the method for transmitting a data frame in the application scenario in which the MU-MIMO technology is used in the downlink of the wireless local area network. For specific steps of the method, reference may be made to specific steps in the method for transmitting a data frame in the application scenario in which the MU-MIMO technology is used in the downlink of the wireless local area network according to the embodiment of the present invention. In the method, the quantity $N_{SS}$ of multiplexed spatial streams is a quantity of data streams in single-user multiplexing. For the application scenario in which the MU-MIMO and SU-MIMO technologies are used in the downlink of the wireless local area network, the method for transmitting a data frame is the same as or similar to the method for transmitting a data frame in the application scenario in which the MU-MIMO technology is used in the downlink of the wireless local area network. For specific steps of the method, reference may be made to specific steps in the method for transmitting a data frame in the application scenario in which the MU-MIMO technology is used in the downlink of the wireless local area network according to the embodiment of the present invention. In the method, the quantity $N_{SS}$ of multiplexed spatial streams is a quantity of users in multi-user multiplexing and a quantity of data streams in single-user multiplexing. Details are not described herein.

Figure 13:
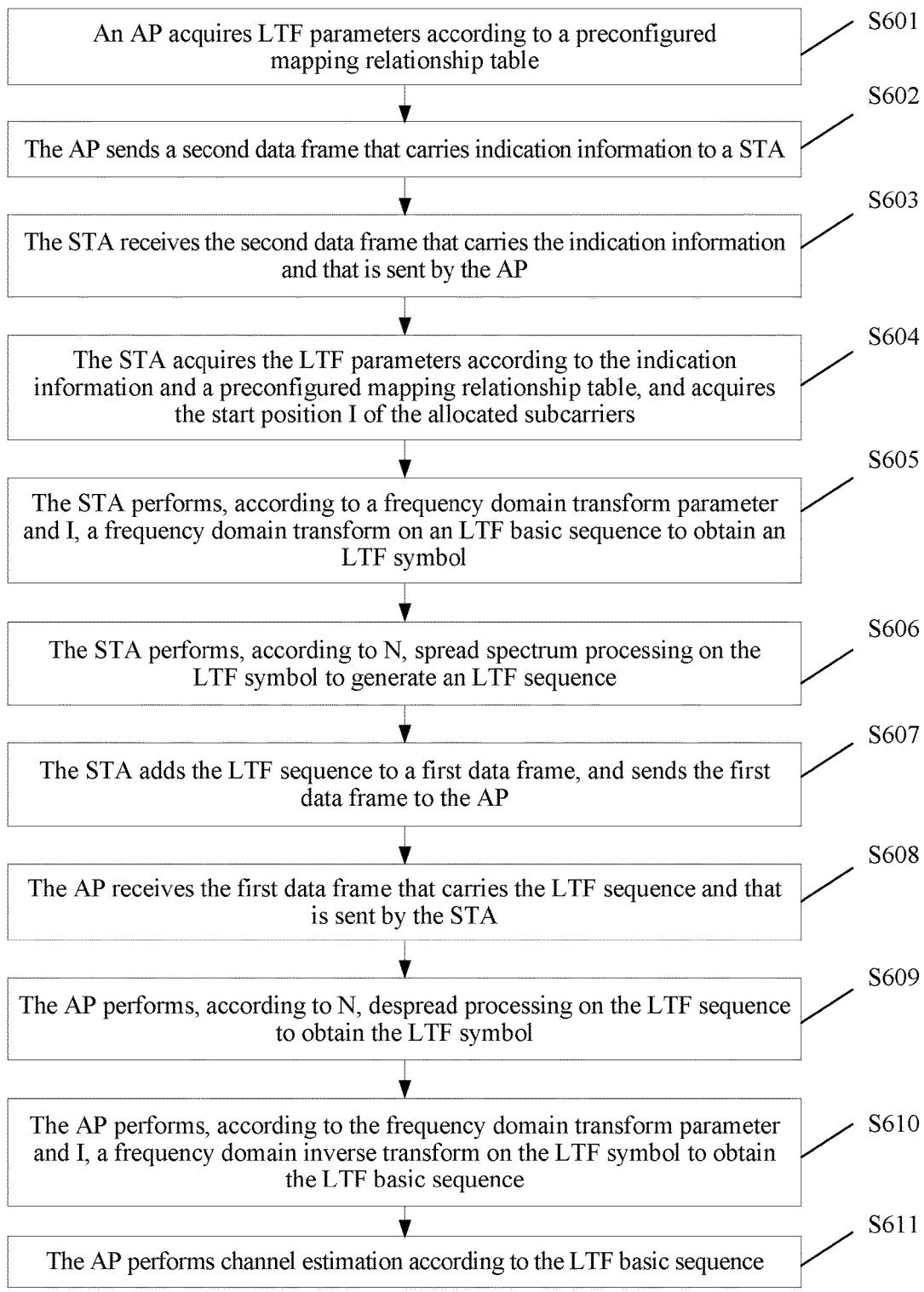
FIG. 13 is a schematic flowchart of another method for transmitting a data frame according to another embodiment of the present invention.

In a second application scenario, an example is used for description, in which a first device is a STA, a second device is an AP, a MIMO technology used in a wireless local area network is specifically a MU-MIMO technology, and a specific implementation process is used in a process of transmitting uplink data. In the application scenario, multiple STAs may perform communication with the AP simultaneously, and a spatial stream refers to a data stream that is sent by each user (STA) to the AP. The method for transmitting a data frame in the application scenario is shown in FIG. 13, and specifically, the method may include the following steps.

S601. An AP acquires LTF parameters according to a preconfigured mapping relationship table.

The AP may further acquire a start position I of allocated subcarriers, and send I to a STA.

It should be noted that, for a process in which the AP acquires the LTF parameters according to the preconfigured mapping relationship table and the process of acquiring the start position I of the allocated subcarriers, reference may be made to the detailed description in step S501. Details are not described herein.

S602. The AP sends a second data frame that carries indication information to a STA.

The indication information is used to acquire the LTF parameters for generating an LTF sequence.

It should be noted that, the AP may first generate an LTF sequence according to the acquired LTF parameters and I, and then add the generated LTF sequence and the indication information to the second data frame, and send the second data frame to the STA, or may add the indication information to a data field of the second data frame, and send the second data frame to the STA. A manner of sending the indication information is not limited in the present invention.

It should be noted that, for the process in which the AP may first generate the LTF sequence according to the acquired LTF parameters and I, reference may be made to the detailed description of related content in the embodiment of the present invention. Details are not described herein.

S603. The STA receives the second data frame that carries the indication information and that is sent by the AP.

S604. The STA acquires the LTF parameters according to the indication information and a preconfigured mapping relationship table, and acquires the start position I of the allocated subcarriers.

The STA may acquire, according to explicit signaling (explicit signaling) sent by the AP, the start position I of the subcarriers allocated to a spatial stream, or may acquire, according to implicit signaling (implicit signaling) sent by the AP, the start position I of the subcarriers allocated to a spatial stream. When the STA acquires, according to the implicit signaling sent by the AP, the start position I of the subcarriers allocated to the spatial stream, the start position I of the allocated subcarriers that is acquired by the STA is a default sequence of the received spatial stream.

It should be noted that, for the process in which the STA acquires the LTF parameters according to the indication information and the preconfigured mapping relationship table, reference may be made to the detailed description in step S506. Details are not described herein.

S605. The STA performs, according to a frequency domain transform parameter and I, a frequency domain transform on an LTF basic sequence to obtain an LTF symbol.

After the STA acquires the LTF parameters and I, the STA may perform, according to the frequency domain transform parameter included in the acquired LTF parameters and the acquired start position I of the allocated subcarriers, in frequency domain FDM mode or frequency domain CDM mode, a frequency domain transform on an LTF basic sequence to obtain an LTF symbol.

When the STA uses the frequency domain FDM mode to perform a frequency domain transform on an LTF basic sequence, that the STA performs, according to a frequency domain transform parameter and I, a frequency domain transform on an LTF basic sequence to obtain an LTF symbol may specifically include steps S605a1 to S605a3.

S605a1. The STA maps, starting from I, at intervals of $\lfloor S/L \rfloor$ subcarriers, each element in the LTF basic sequence to a corresponding subcarrier to obtain a frequency domain LTF sequence.

The LTF basic sequence is allocated by the AP. The STA may acquire, in a process of exchanging information with the AP, the LTF basic sequence allocated by the AP.

S605a2. The STA performs an S-point IFFT transform on the frequency domain LTF sequence to obtain an LTF basic symbol.

S605a3. The STA combines the LTF basic symbol with a CP to generate the LTF symbol.

When the STA uses the frequency domain CDM mode to perform a frequency domain transform on an LTF basic sequence, that the STA performs, according to a frequency domain transform parameter and I, a frequency domain transform on an LTF basic sequence to obtain an LTF symbol may specifically include steps S605b1 to S605b4:

S605b1. The STA performs, according to M, spread spectrum processing on each element in the LTF basic sequence to obtain an LTF spread spectrum sequence.

S605b2. The STA maps, starting from I, each element in the LTF spread spectrum sequence to a corresponding subcarrier to obtain a frequency domain LTF sequence.

S605b3. The STA performs an S-point IFFT transform on the frequency domain LTF sequence to obtain an LTF basic symbol.

S605b4. The STA combines the LTF basic symbol with a CP to generate the LTF symbol.

After the STA obtains the LTF symbol, the STA may perform, according to a time domain transform parameter, a time domain transform on the LTF symbol to obtain the LTF sequence. Specifically, step S606 may be included.

S606. The STA performs, according to N, spread spectrum processing on the LTF symbol to generate an LTF sequence.

It should be noted that, for the detailed description of the process in which the STA performs, according to the frequency domain transform parameter and I, the frequency domain FDM transform on the LTF basic sequence, that is, steps S605a1 to S605a3, reference may be made to the detailed description of steps S502a1 to S502a3 in the embodiment of the present invention. For the detailed description of the process in which the STA performs, according to the frequency domain transform parameter and I, the frequency domain CDM transform on the LTF basic sequence, that is, steps S605b1 to S605b4, reference may be made to the detailed description of steps S502b1 to S502b4 in the embodiment of the present invention. For the detailed description of the process in which the STA performs, according to the time domain transform parameter, the time domain transform on the LTF symbol, that is, step S606, reference may be made to the detailed description of step S503 in the embodiment of the present invention. The only difference lies in that that the process is performed by the STA. Details are not described herein.

In summary, because M spatial streams can be distinguished in a frequency domain by using different subcarriers, and N spatial streams can be distinguished in a time domain by using different spread spectrum sequences, M*N spatial streams can be distinguished through a frequency domain transform and a time domain transform.

S607. The STA adds the LTF sequence to a first data frame, and sends the first data frame to the AP.

Because the AP has acquired the LTF parameters in step S601, the STA only needs to add the LTF sequence to the first data frame and send the first data frame to the AP, but not need to notify the AP of indication information for acquiring the LTF parameters.

S608. The AP receives the first data frame that carries the LTF sequence and that is sent by the STA.

After the AP receives the first data frame that carries the LTF sequence and that is sent by the STA, the AP directly acquires LTF parameters stored in the AP, and performs, according to the time domain transform parameter included in the acquired LTF parameters, a time domain inverse transform on the LTF sequence to obtain the LTF symbol. Specifically, step S609 may be included.

S609. The AP performs, according to N, despread processing on the LTF sequence to obtain the LTF symbol.

S610. The AP performs, according to the frequency domain transform parameter and I, a frequency domain inverse transform on the LTF symbol to obtain the LTF basic sequence.

After the AP performs, according to the time domain transform parameter, the time domain inverse transform on the LTF sequence to obtain the LTF symbol, the AP acquires the start position I of the allocated subcarriers, and then performs, according to the frequency domain transform parameter and I in frequency domain FDM mode or frequency domain CDM mode, the frequency domain inverse transform on the LTF symbol to obtain the LTF basic sequence.

When the STA uses the frequency domain FDM mode to perform the frequency domain transform on the LTF basic sequence to obtain the LTF symbol, the AP may use the frequency domain FDM mode to perform the frequency domain inverse transform on the LTF symbol. When the AP uses the frequency domain FDM mode to perform the frequency domain inverse transform on the LTF symbol, that the AP performs, according to the frequency domain transform parameter and I, a frequency domain inverse transform on the LTF symbol to obtain the LTF basic sequence may specifically include steps S610a1 to S610a3.

S610a1. The AP determines the LTF basic symbol according to the LTF symbol.

S610a2. The AP performs an S-point FFT transform on the LTF basic symbol to obtain the frequency domain LTF sequence.

S610a3. The AP extracts, starting from I, at intervals of $\lfloor S/L \rfloor$ subcarriers, the LTF basic sequence according to the frequency domain LTF sequence.

When the STA uses the frequency domain CDM mode to perform the frequency domain transform on the LTF basic sequence to obtain the LTF symbol, the AP may use the frequency domain CDM mode to perform the frequency domain inverse transform on the LTF symbol. When the AP uses the frequency domain CDM mode to perform the frequency domain inverse transform on the LTF symbol, that the AP performs, according to the frequency domain transform parameter and I, a frequency domain inverse transform on the LTF symbol to obtain the LTF basic sequence may specifically include steps S610b1 to S610b4.

S610b1. The AP determines the LTF basic symbol according to the LTF symbol.

S610b2. The AP performs an S-point FFT transform on the LTF basic symbol to obtain the frequency domain LTF sequence.

S610b3. The AP extracts, starting from I, the LTF spread spectrum sequence from the corresponding subcarriers according to the frequency domain LTF sequence.

S610b4. The AP performs, according to M, despread processing on the LTF spread spectrum sequence to obtain the LTF basic sequence.

S611. The AP performs channel estimation according to the LTF basic sequence.

It should be noted that, for the detailed description of steps S609 to S611, reference may be made to the detailed description of steps S507 to S509. The only difference lies in that the process is performed by the AP. Details are not described herein.

It should be noted that, in the embodiment of the present invention, a quantity $N_{SS}$ of multiplexed spatial streams is a quantity of users in multi-user multiplexing.

Figure 14:
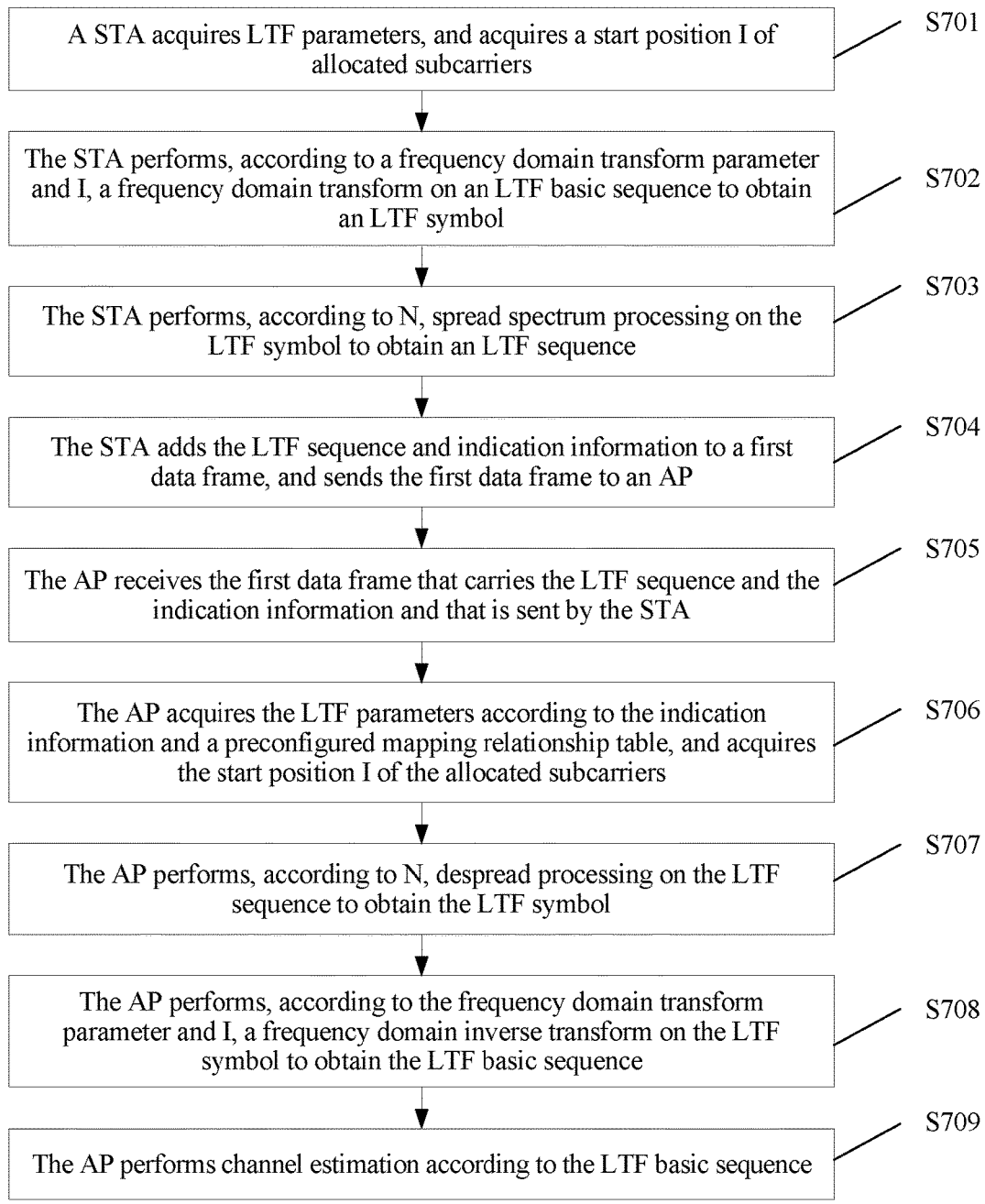
FIG. 14 is a schematic flowchart of still another method for transmitting a data frame according to another embodiment of the present invention.

In a third application scenario, an example is used for description, in which a first device is a STA, a second device is an AP, a MIMO technology used in a wireless local area network is specifically a SU-MIMO technology, and a specific implementation process is used in a process of transmitting uplink data. In the application scenario, multiple spatial streams exist between the AP and the STA, and a spatial stream refers to a data stream between the AP and the STA. The method for transmitting a data frame in the application scenario is shown in FIG. 14, and specifically, the method may include the following steps.

S701. A STA acquires LTF parameters, and acquires a start position I of allocated sub carriers.

A process of acquiring the start position I of the allocated subcarriers in a frequency domain may be acquiring by the STA through allocation. A specific acquiring process is: the STA allocates a start position I of subcarriers to each spatial stream according to an actual application scenario, or the STA allocates, according to a sequence of each spatial stream, a start position I of subcarriers in a sequence same as that of the spatial stream to each spatial stream.

S702. The STA performs, according to a frequency domain transform parameter and I, a frequency domain transform on an LTF basic sequence to obtain an LTF symbol.

After the STA acquires the LTF parameters and the start position I of the allocated subcarriers, the STA may perform, according to the frequency domain transform parameter included in the acquired LTF parameters and the acquired start position I of the allocated subcarriers, in frequency domain FDM mode or frequency domain CDM mode, a frequency domain transform on an LTF basic sequence to obtain an LTF symbol.

When the STA uses the frequency domain FDM mode to perform a frequency domain transform on an LTF basic sequence, that the STA performs, according to a frequency domain transform parameter and I, a frequency domain transform on an LTF basic sequence to obtain an LTF symbol may specifically include steps S702a1 to S702a3.

S702a1. The STA maps, starting from I, at intervals of $\lfloor S/L \rfloor$ subcarriers, each element in the LTF basic sequence to a corresponding subcarrier to obtain a frequency domain LTF sequence.

The LTF basic sequence is allocated by the STA. When a mapping relationship table preconfigured in the STA uses manner 1, the STA directly acquires the stored LTF basic sequence. When the mapping relationship table preconfigured in the STA uses any one of manner 2, manner 3, or manner 4, after the STA acquires the LTF parameters, the STA may select, from prestored LTF basic sequences, according to the frequency domain transform parameter L included in the LTF parameters, an LTF basic sequence that needs to be used. For example, when the frequency domain transform parameter L included in the LTF parameters acquired by the STA is 56, an LTF basic sequence selected according to L may be:

LTF basic sequence=$\{11 \text{LTF}_{left} 0 \text{LTF}_{right} -1-1\}$, where quantities of elements included in $\text{LTF}_{left}$ and $\text{LTF}_{right}$ are both 26.

S702a2. The STA performs an S-point IFFT transform on the frequency domain LTF sequence to obtain an LTF basic symbol.

S702a3. The STA combines the LTF basic symbol with a CP to generate the LTF symbol.

When the STA uses the frequency domain CDM mode to perform a frequency domain transform on an LTF basic sequence, that the STA performs, according to a frequency domain transform parameter and I, a frequency domain transform on an LTF basic sequence to obtain an LTF symbol may specifically include steps S702b1 to S702b4.

S702b1. The STA performs, according to M, spread spectrum processing on each element in the LTF basic sequence to obtain an LTF spread spectrum sequence.

S702b2. The STA maps, starting from I, each element in the LTF spread spectrum sequence to a corresponding subcarrier to obtain a frequency domain LTF sequence.

S702b3. The STA performs an S-point IFFT transform on the frequency domain LTF sequence to obtain an LTF basic symbol.

S702b4. The STA combines the LTF basic symbol with a CP to generate the LTF symbol.

After the STA obtains the LTF symbol, the STA may perform, according to a time domain transform parameter, a time domain transform on the LTF symbol to obtain an LTF sequence. Specifically, step S703 may be included.

S703. The STA performs, according to N, spread spectrum processing on the LTF symbol to obtain an LTF sequence.

In summary, because M spatial streams can be distinguished in the frequency domain by using different subcarriers, and N spatial streams can be distinguished in a time domain by using different spread spectrum sequences, M*N spatial streams can be distinguished through a frequency domain transform and a time domain transform.

Because an AP needs to parse the LTF sequence to obtain the LTF basic sequence, the AP needs to learn the LTF parameters that are used by the STA to generate the LTF sequence. To reduce signaling overheads, the STA may notify the AP of indication information for acquiring the LTF parameters. Therefore, the STA adds the LTF sequence to a first data frame, and sends the first data frame to the AP. Specifically, the following step S704 may be included.

S704. The STA adds the LTF sequence and indication information to a first data frame, and sends the first data frame to an AP.

S705. The AP receives the first data frame that carries the LTF sequence and the indication information and that is sent by the STA.

S706. The AP acquires the LTF parameters according to the indication information and a preconfigured mapping relationship table, and acquires the start position I of the allocated subcarriers.

The AP may acquire, according to explicit signaling sent by the STA, the start position I of the subcarriers allocated to the spatial stream, or may acquire, according to implicit signaling sent by the STA, the start position I of the subcarriers allocated to the spatial stream. When the AP acquires, according to the implicit signaling sent by the STA, the start position I of the subcarriers allocated to the spatial stream, the start position I of the allocated subcarriers that is acquired by the AP is a default sequence of the received spatial stream.

The mapping relationship table may be specifically formed in any one manner of the following manners:

Manner 1: The mapping relationship table includes a quantity $N_{SS}$ of multiplexed spatial streams, a type of the AP, and parameters corresponding to the $N_{SS}$ and the type of the AP.

The quantity $N_{SS}$ of multiplexed spatial streams is a quantity of data streams in single-user multiplexing.

Manner 2: The mapping relationship table includes a quantity $N_{SS}$ of multiplexed spatial streams, a type of an environment in which the AP is located, and parameters corresponding to the quantity $N_{SS}$ of users and the type of the environment in which the AP is located.

Manner 3: The mapping relationship table includes a quantity $N_{SS}$ of multiplexed spatial streams, and parameters corresponding to the $N_{SS}$.

Manner 4: The mapping relationship table includes a quantity $N_{SS}$ of multiplexed spatial streams, MCS feature information, and parameters corresponding to the $N_{SS}$ and the MCS feature information.

When a formation manner of the mapping relationship table preconfigured in the AP is manner 1, when the indication information includes the $N_{SS}$, that the AP acquires the LTF parameters according to the indication information and a preconfigured mapping relationship table may include: the AP uses, according to the $N_{SS}$ and the type of the AP, the parameters corresponding to the $N_{SS}$ and the type of the AP as the LTF parameters.

When a formation manner of the mapping relationship table preconfigured in the AP is manner 2, when the indication information includes the $N_{SS}$, that the AP acquires the LTF parameters according to the indication information and a preconfigured mapping relationship table may include: the AP uses, according to the $N_{SS}$ and the type of the environment in which the AP is located, the parameters corresponding to the $N_{SS}$ and the type of the environment in which the AP is located, as the LTF parameters.

When a formation manner of the mapping relationship table preconfigured in the AP is manner 3, in a first possible implementation manner, when the indication information includes the $N_{SS}$, that the AP acquires the LTF parameters according to the indication information and a preconfigured mapping relationship table may include: the AP uses, according to the $N_{SS}$, the parameters corresponding to the $N_{SS}$ as the LTF parameters.

In a second possible implementation manner, when the indication information includes a quantity N of the LTF symbols included in the LTF sequence, that the AP acquires the LTF parameters according to the indication information and a preconfigured mapping relationship table may include: the AP determines a subcarrier quantity S according to a length of the CP, then determines the $N_{SS}$ according to N and S, and further determines, according to the $N_{SS}$, that the parameters corresponding to the $N_{SS}$ are the LTF parameters.

It should be noted that, for the method for determining the subcarrier quantity S according to the length of the CP by the AP, reference may be made to the method for determining the subcarrier quantity S according to the length of the CP by the STA. Details are not described herein.

When a formation manner of the mapping relationship table preconfigured in the AP is manner 4, when the indication information includes the $N_{SS}$ and the MCS feature information, that the AP acquires the LTF parameters according to the indication information and a preconfigured mapping relationship table may include: the AP uses, according to the $N_{SS}$ and the MCS feature information, the parameters corresponding to the $N_{SS}$ and the MCS feature information as the LTF parameters.

After the AP acquires the LTF parameters and the start position I of the allocated subcarriers, the AP performs, according to the time domain transform parameter, a time domain inverse transform on the LTF sequence to obtain the LTF symbol. Specifically, step S707 may be included:

S707. The AP performs, according to N, despread processing on the LTF sequence to obtain the LTF symbol.

S708. The AP performs, according to the frequency domain transform parameter and I, a frequency domain inverse transform on the LTF symbol to obtain the LTF basic sequence.

After the AP performs, according to the time domain transform parameter, the time domain inverse transform on the LTF sequence to obtain the LTF symbol, the AP may perform, according to the frequency domain transform parameter and I, in frequency domain FDM mode or frequency domain CDM mode, the frequency domain inverse transform on the LTF symbol to obtain the LTF basic sequence.

When the STA uses the frequency domain FDM mode to perform the frequency domain transform on the LTF basic sequence to obtain the LTF symbol, the AP may use the frequency domain FDM mode to perform the frequency domain inverse transform on the LTF symbol. When the AP uses the frequency domain FDM mode to perform the frequency domain inverse transform on the LTF symbol, that the AP performs, according to the frequency domain transform parameter and I, a frequency domain inverse transform on the LTF symbol to obtain the LTF basic sequence may specifically include steps S708a1 to S708a3:

S708a1. The AP determines the LTF basic symbol according to the LTF symbol.

S708a2. The AP performs an S-point FFT transform on the LTF basic symbol to obtain the frequency domain LTF sequence.

S708a3. The AP extracts, starting from I, at intervals of $\lfloor S/L \rfloor$ subcarriers, the LTF basic sequence according to the frequency domain LTF sequence.

When the STA uses the frequency domain CDM mode to perform the frequency domain transform on the LTF basic sequence to obtain the LTF symbol, the AP may use the frequency domain CDM mode to perform the frequency domain inverse transform on the LTF symbol. When the AP uses the frequency domain CDM mode to perform the frequency domain inverse transform on the LTF symbol, that the AP performs, according to the frequency domain transform parameter and I, a frequency domain inverse transform on the LTF symbol to obtain the LTF basic sequence may specifically include steps S708b1 to S708b4.

S708b1. The AP determines the LTF basic symbol according to the LTF symbol.

S708b2. The AP performs an S-point FFT transform on the LTF basic symbol to obtain the frequency domain LTF sequence.

S708b3. The AP extracts, starting from I, the LTF spread spectrum sequence from the corresponding subcarriers according to the frequency domain LTF sequence.

S708b4. The AP performs, according to M, despread processing on the LTF spread spectrum sequence to obtain the LTF basic sequence.

S709. The AP performs channel estimation according to the LTF basic sequence.

It should be noted that, for the detailed description in steps S701 to S709, reference may be made to the detailed description in steps S501 to S509. Details are not described herein.

Preferably, when the MIMO technology used in the wireless local area network is the MU-MIMO and SU-MIMO technologies, in the application scenario, the AP performs communication with multiple STAs simultaneously, and multiple spatial streams exist in the process of communication between each STA and the AP, where the spatial streams include data streams of all users transmitted between the AP and the STAs. For spatial streams transmitted between the AP and a same STA, a same crystal oscillator is used for the spatial streams transmitted between the same STA and the AP, that is, frequency offsets of the spatial streams transmitted between the same STA and the AP are the same, and orthogonality in the time domain may be maintained. Therefore, the time domain CDM mode may be used to distinguish the spatial streams transmitted between the same STA and the AP. However, for spatial streams transmitted between the AP and different STAs, frequency offsets of the spatial streams transmitted between the AP and different STAs are different, and it is not easy to maintain orthogonality in the time domain. Therefore, the frequency domain FDM mode or frequency domain CDM mode may be used as far as possible to distinguish the spatial streams transmitted between the AP and different STAs. On a premise that CDM orthogonality in the time domain is ensured, to reduce signaling overheads, a length of an LTF sequence needs to be reduced. Therefore, parameters such as N, M, S, and L in the mapping relationship table need to be adjusted properly. For example, if the AP performs communication with two STAs simultaneously, four spatial streams exist in a process of communication between each STA and the AP; according to the foregoing rule, it may be determined that a value of a subcarrier quantity M for distinguishing spatial streams is 2, and that a quantity N of LTF symbols included in an LTF sequence is 4. If the AP performs communication with four STAs simultaneously, two spatial streams exist in a process of communication between each STA and the AP; according to the foregoing rule, it may be determined that a value of a subcarrier quantity M for distinguishing spatial streams is 4, and that a quantity N of LTF symbols included in an LTF sequence is 2.

According to the method for transmitting a data frame according to the present invention, a first device performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to a second device, so that the second device determines the LTF basic sequence according to the LTF sequence and performs channel estimation according to the LTF basic sequence. In a process in which the first device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced. In addition, because the quantity of LTF symbols included in the LTF sequence is reduced in the process of sending a data frame, a probability of crosstalk between symbols in the time domain is reduced, and therefore, a Doppler frequency shift effect is better resisted.

Figure 15:
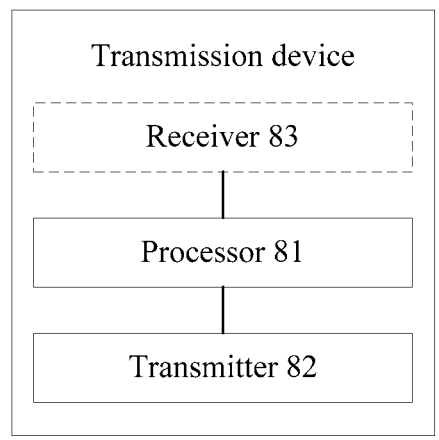
FIG. 15 is a schematic structural diagram of a transmission device according to another embodiment of the present invention.

Another embodiment of the present invention provides a transmission device, which is applied to a wireless local area network system using a multiple-input multiple-output MIMO technology. As shown in FIG. 15, the transmission device includes a processor 81 and a transmitter 82.

The processor 81 is configured to: acquire long training field LTF parameters, and acquire a start position I of allocated subcarriers, where the LTF parameters include a frequency domain transform parameter and a time domain transform parameter that are required for generating an LTF sequence; perform, according to the frequency domain transform parameter and I, a frequency domain transform on an LTF basic sequence to obtain an LTF symbol; and perform, according to the time domain transform parameter, a time domain transform on the LTF symbol to obtain the LTF sequence.

The transmitter 82 is configured to add the LTF sequence obtained by the processor 81 to a first data frame, and send the first data frame to a second device, so that the second device determines the LTF basic sequence according to the LTF sequence and performs channel estimation according to the LTF basic sequence.

In the embodiment of the present invention, further optionally, the frequency domain transform parameter includes a subcarrier quantity M for distinguishing spatial streams, a quantity L of elements in the LTF basic sequence, and a subcarrier quantity S.

The processor 81 is specifically configured to: map, starting from I, at intervals of $\lfloor S/L \rfloor$ subcarriers, each element in the LTF basic sequence to a corresponding subcarrier to obtain a frequency domain LTF sequence, where $\lfloor \ \rfloor$ indicates round-down; perform an S-point inverse fast Fourier transform IFFT transform on the frequency domain LTF sequence to obtain an LTF basic symbol; and combine the LTF basic symbol with a cyclic prefix CP to generate the LTF symbol.

In the embodiment of the present invention, further optionally, the frequency domain transform parameter includes a subcarrier quantity M for distinguishing spatial streams, a quantity L of elements in the LTF basic sequence, and a subcarrier quantity S.

The processor 81 is specifically configured to: perform, according to M, spread spectrum processing on each element in the LTF basic sequence to obtain an LTF spread spectrum sequence, where the LTF spread spectrum sequence includes M*L elements; map, starting from I, each element in the LTF spread spectrum sequence to a corresponding subcarrier to obtain a frequency domain LTF sequence; perform an S-point IFFT transform on the frequency domain LTF sequence to obtain an LTF basic symbol; and combine the LTF basic symbol with a CP to generate the LTF symbol.

In the embodiment of the present invention, further optionally, the time domain transform parameter includes a quantity N of the LTF symbols included in the LTF sequence.

The processor 81 is specifically configured to perform, according to N, spread spectrum processing on the LTF symbols to generate the LTF sequence.

In the embodiment of the present invention, further optionally, the transmission device is a station STA, and the second device is an access point AP.

The transmission device further includes a receiver 83.

The receiver 83 is configured to receive a second data frame that carries indication information and that is sent by the second device, where the indication information is used to indicate the LTF parameters.

The processor 81 is specifically configured to acquire the LTF parameters according to the indication information and a preconfigured mapping relationship table.

In the embodiment of the present invention, further optionally, the mapping relationship table includes a quantity $N_{SS}$ of multiplexed spatial streams, a type of the AP, and parameters corresponding to the $N_{SS}$ and the type of the AP.

When the indication information includes the $N_{SS}$, and the transmission device has acquired the type of the AP when accessing the AP, the processor 81 is specifically configured to use, according to the $N_{SS}$ and the type of the AP, the parameters corresponding to the $N_{SS}$ and the type of the AP as the LTF parameters.

When the indication information includes the $N_{SS}$ and the subcarrier quantity S, and the transmission device has not acquired the type of the AP when accessing the AP, the processor 81 is specifically configured to determine the type of the AP according to S, where a correspondence exists between S and the type of the AP, and use, according to the $N_{SS}$ and the type of the AP, the parameters corresponding to the $N_{SS}$ and the type of the AP as the LTF parameters.

When the indication information includes the $N_{SS}$, and the transmission device has not acquired the type of the AP when accessing the AP, the processor 81 is specifically configured to determine S according to a length of the CP, determine the type of the AP according to S, and use, according to the $N_{SS}$ and the type of the AP, the parameters corresponding to the $N_{SS}$ and the type of the AP as the LTF parameters.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located; the indication information includes the $N_{SS}$, and when accessing the AP, the transmission device has acquired the type of the environment in which the AP is located.

The processor 81 is specifically configured to use, according to the $N_{SS}$ and the type of the environment in which the AP is located, the parameters corresponding to the $N_{SS}$ and the type of the environment in which the AP is located, as the LTF parameters.

In the embodiment of the present invention, further optionally, the mapping relationship table includes a quantity $N_{SS}$ of multiplexed spatial streams and parameters corresponding to the $N_{SS}$.

When the indication information includes the $N_{SS}$, the processor 81 is specifically configured to determine, according to the $N_{SS}$, that the parameters corresponding to the $N_{SS}$ are the LTF parameters.

When the indication information includes the quantity N of the LTF symbols included in the LTF sequence, the processor 81 is specifically configured to determine the subcarrier quantity S according to a length of the CP, determine the $N_{SS}$ according to N and S, and determine, according to the $N_{SS}$, that the parameters corresponding to the $N_{SS}$ are the LTF parameters.

In the embodiment of the present invention, further optionally, the mapping relationship table includes a quantity $N_{SS}$ of multiplexed spatial streams, modulation and coding scheme MCS feature information, and parameters corresponding to the $N_{SS}$ and the MCS feature information; the indication information includes the $N_{SS}$ and the MCS feature information.

The processor 81 is specifically configured to use, according to the $N_{SS}$ and the MCS feature information, the parameters corresponding to the $N_{SS}$ and the MCS feature information as the LTF parameters.

In the embodiment of the present invention, further optionally, the transmission device is an AP, and the second device is a STA; or the transmission device is a STA, and the second device is an AP.

The processor 81 is specifically configured to acquire the LTF parameters according to a preconfigured mapping relationship table.

The transmitter 82 is specifically configured to add the LTF sequence and indication information to the first data frame, and send the first data frame to the second device, so that the second device determines the LTF basic sequence according to the LTF sequence and the indication information.

In the embodiment of the present invention, further optionally, the mapping relationship table includes a quantity $N_{SS}$ of multiplexed spatial streams, a type of the AP, and parameters corresponding to the $N_{SS}$ and the type of the AP; when the transmission device is the STA, the transmission device has acquired the type of the AP when accessing the AP.

The processor 81 is specifically configured to use, according to the $N_{SS}$ and the type of the AP, the parameters corresponding to the $N_{SS}$ and the type of the AP as the LTF parameters.

If the transmission device is the STA, and the second device is the AP, the indication information includes the $N_{SS}$.

If the transmission device is the AP, and the second device is the STA, the indication information includes the $N_{SS}$, or the indication information includes the $N_{SS}$ and the subcarrier quantity S.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located; when the transmission device is the STA, the transmission device has acquired the type of the environment in which the AP is located when accessing the AP.

The processor 81 is specifically configured to use, according to the $N_{SS}$ and the type of the environment in which the AP is located, the parameters corresponding to the $N_{SS}$ and the type of the environment in which the AP is located, as the LTF parameters; and the indication information includes the $N_{SS}$.

In the embodiment of the present invention, further optionally, the mapping relationship table includes a quantity $N_{SS}$ of multiplexed spatial streams and parameters corresponding to the $N_{SS}$.

The processor 81 is specifically configured to determine, according to the $N_{SS}$, that the parameters corresponding to the $N_{SS}$ are the LTF parameters; and the indication information includes the $N_{SS}$, or the indication information includes the quantity N of the LTF symbols included in the LTF sequence.

In the embodiment of the present invention, further optionally, the mapping relationship table includes a quantity $N_{SS}$ of multiplexed spatial streams, MCS feature information, and parameters corresponding to the $N_{SS}$ and the MCS feature information.

The processor 81 is specifically configured to use, according to the $N_{SS}$ and the MCS feature information, the parameters corresponding to the $N_{SS}$ and the MCS feature information as the LTF parameters; and the indication information includes the $N_{SS}$ and the MCS feature information.

In the embodiment of the present invention, further optionally, the quantity of multiplexed spatial streams includes a quantity of users in multi-user multiplexing and/or a quantity of data streams in single-user multiplexing.

It should be noted that, for a specific work process of each functional module in the transmission device provided by the embodiment of the present invention, reference may be made to a detailed description of a corresponding process in a method embodiment, and details are not described herein in the embodiment of the present invention.

The transmission device provided by the present invention performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to a second device, so that the second device determines the LTF basic sequence according to the LTF sequence and performs channel estimation according to the LTF basic sequence. In a process in which the transmission device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced. In addition, because the quantity of LTF symbols included in the LTF sequence is reduced in the process of sending a data frame, a probability of crosstalk between symbols in the time domain is reduced, and therefore, a Doppler frequency shift effect is better resisted.

Figure 16:
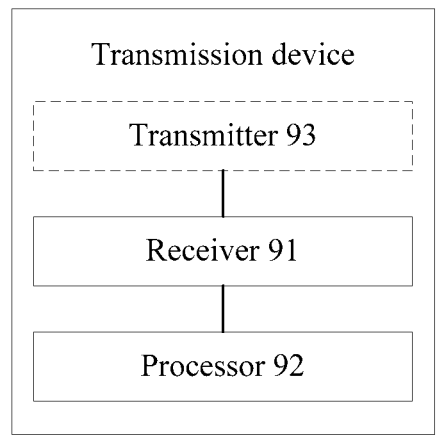
FIG. 16 is a schematic structural diagram of a transmission device according to another embodiment of the present invention.

Another embodiment of the present invention provides a transmission device, which is applied to a wireless local area network system using a multiple-input multiple-output MIMO technology. As shown in FIG. 16, the transmission device includes a receiver 91 and a processor 92.

The receiver 91 is configured to receive a first data frame that carries a long training field LTF sequence and that is sent by a first device.

The processor 92 is configured to determine an LTF basic sequence according to the LTF sequence received by the receiver 91, and perform channel estimation according to the LTF basic sequence.

In the embodiment of the present invention, further optionally, the processor 92 is further configured to: before determining the LTF basic sequence according to the LTF sequence, acquire LTF parameters, and acquire a start position I of allocated subcarriers, where the LTF parameters include a frequency domain transform parameter and a time domain transform parameter that are required for generating the LTF sequence by the first device.

The processor 92 is specifically configured to: perform, according to the time domain transform parameter, a time domain inverse transform on the LTF sequence to obtain an LTF symbol; and perform, according to the frequency domain transform parameter and I, a frequency domain inverse transform on the LTF symbol to obtain the LTF basic sequence.

In the embodiment of the present invention, further optionally, the time domain transform parameter includes a quantity N of the LTF symbols included in the LTF sequence.

The processor 92 is specifically configured to perform, according to N, despread processing on the LTF sequence to obtain the LTF symbols.

In the embodiment of the present invention, further optionally, the frequency domain transform parameter includes a subcarrier quantity M for distinguishing spatial streams, a quantity L of elements in the LTF basic sequence, and a subcarrier quantity S.

The processor 92 is specifically configured to: determine an LTF basic symbol according to the LTF symbol, where the LTF symbol includes the LTF basic symbol and a cyclic prefix CP; perform an S-point fast Fourier transform FFT transform on the LTF basic symbol to obtain a frequency domain LTF sequence; and extract, starting from I, at intervals of $\lfloor S/L \rfloor$ subcarriers, the LTF basic sequence according to the frequency domain LTF sequence, where $\lfloor \ \rfloor$ indicates round-down.

In the embodiment of the present invention, further optionally, the frequency domain transform parameter includes a subcarrier quantity M for distinguishing spatial streams, a quantity L of elements in the LTF basic sequence, and a subcarrier quantity S.

The processor 92 is specifically configured to: determine an LTF basic symbol according to the LTF symbol, where the LTF symbol includes the LTF basic symbol and a CP; perform an S-point FFT transform on the LTF basic symbol to obtain a frequency domain LTF sequence; extract, starting from I, an LTF spread spectrum sequence from corresponding subcarriers according to the frequency domain LTF sequence, where the LTF spread spectrum sequence includes M*L elements; and perform, according to M, despread processing on the LTF spread spectrum sequence to obtain the LTF basic sequence.

In the embodiment of the present invention, further optionally, the first device is a station STA, and the transmission device is an access point AP.

The processor 92 is further configured to acquire the LTF parameters according to a preconfigured mapping relationship table before the receiver 91 receives the first data frame that carries the long training field LTF sequence and that is sent by the first device.

The transmission device further includes a transmitter 93.

The transmitter 93 is configured to send a second data frame carrying indication information to the first device, where the indication information indicates the LTF parameters.

In the embodiment of the present invention, further optionally, the mapping relationship table includes a quantity $N_{SS}$ of multiplexed spatial streams, a type of the AP, and parameters corresponding to the $N_{SS}$ and the type of the AP.

The processor 92 is specifically configured to use, according to the $N_{SS}$ and the type of the AP, the parameters corresponding to the $N_{SS}$ and the type of the AP as the LTF parameters; and the indication information includes the $N_{SS}$, or the indication information includes the $N_{SS}$ and the subcarrier quantity S.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located.

The processor 92 is specifically configured to use, according to the $N_{SS}$ and the type of the environment in which the AP is located, the parameters corresponding to the $N_{SS}$ and the type of the environment in which the AP is located, as the LTF parameters; and the indication information includes the $N_{SS}$.

In the embodiment of the present invention, further optionally, the mapping relationship table includes a quantity $N_{SS}$ of multiplexed spatial streams and parameters corresponding to the $N_{SS}$.

The processor 92 is specifically configured to determine, according to the $N_{SS}$, that the parameters corresponding to the $N_{SS}$ are the LTF parameters; and the indication information includes the $N_{SS}$, or the indication information includes the quantity N of the LTF symbols included in the LTF sequence.

In the embodiment of the present invention, further optionally, the mapping relationship table includes a quantity $N_{SS}$ of multiplexed spatial streams, MCS feature information, and parameters corresponding to the $N_{SS}$ and the MCS feature information.

The processor 92 is specifically configured to use, according to the $N_{SS}$ and the MCS feature information, the parameters corresponding to the $N_{SS}$ and the MCS feature information as the LTF parameters; and the indication information includes the $N_{SS}$ and the MCS feature information.

In the embodiment of the present invention, further optionally, the first device is an AP, and the transmission device is a STA; or the first device is a STA, and the transmission device is an AP.

The receiver 91 is specifically configured to receive the first data frame that carries the LTF sequence and indication information and that is sent by the first device.

The processor 92 is specifically configured to acquire the LTF parameters according to the indication information received by the receiver 91 and a preconfigured mapping relationship table.

In the embodiment of the present invention, further optionally, the mapping relationship table includes a quantity $N_{SS}$ of multiplexed spatial streams, a type of the AP, and parameters corresponding to the $N_{SS}$ and the type of the AP.

If the first device is the STA, and the transmission device is the AP, the indication information includes the $N_{SS}$; and the processor 92 is specifically configured to use, according to the $N_{SS}$ and the type of the AP, the parameters corresponding to the $N_{SS}$ and the type of the AP as the LTF parameters.

If the first device is the AP, and the transmission device is the STA:

when the indication information includes the $N_{SS}$, and the transmission device has acquired the type of the AP when accessing the AP, the processor 92 is specifically configured to use, according to the $N_{SS}$ and the type of the AP, the parameters corresponding to the $N_{SS}$ and the type of the AP as the LTF parameters; or when the indication information includes the $N_{SS}$ and the subcarrier quantity S, and the transmission device has not acquired the type of the AP when accessing the AP, the processor 92 is specifically configured to determine the type of the AP according to S, where a correspondence exists between S and the type of the AP, and use, according to the $N_{SS}$ and the type of the AP, the parameters corresponding to the $N_{SS}$ and the type of the AP as the LTF parameters; or when the indication information includes the $N_{SS}$, and the transmission device has not acquired the type of the AP when accessing the AP, the processor 92 is specifically configured to determine S according to a length of the CP, determine the type of the AP according to S, and use, according to the $N_{SS}$ and the type of the AP, the parameters corresponding to the $N_{SS}$ and the type of the AP as the LTF parameters.

In the embodiment of the present invention, further optionally, the mapping relationship table includes a quantity $N_{SS}$ of multiplexed spatial streams, a type of an environment in which the AP is located, and parameters corresponding to the $N_{SS}$ and the type of the environment in which the AP is located; the indication information includes the $N_{SS}$, and when the transmission device is the STA, the transmission device has acquired the type of the environment in which the AP is located when accessing the AP.

The processor 92 is specifically configured to use, according to the $N_{SS}$ and the type of the environment in which the AP is located, the parameters corresponding to the $N_{SS}$ and the type of the environment in which the AP is located, as the LTF parameters.

In the embodiment of the present invention, further optionally, the mapping relationship table includes a quantity $N_{SS}$ of multiplexed spatial streams and parameters corresponding to the $N_{SS}$.

When the indication information includes the $N_{SS}$, the processor 92 is specifically configured to use, according to the $N_{SS}$, the parameters corresponding to the $N_{SS}$ as the LTF parameters.

When the indication information includes the quantity N of the LTF symbols included in the LTF sequence, the processor 92 is specifically configured to determine the subcarrier quantity S according to a length of the CP, determine the $N_{SS}$ according to N and S, and determine, according to the $N_{SS}$, that the parameters corresponding to the $N_{SS}$ are the LTF parameters.

In the embodiment of the present invention, further optionally, the mapping relationship table includes a quantity $N_{SS}$ of multiplexed spatial streams, modulation and coding scheme MCS feature information, and parameters corresponding to the $N_{SS}$ and the MCS feature information; the indication information includes the $N_{SS}$ and the MCS feature information.

The processor 92 is specifically configured to use, according to the $N_{SS}$ and the MCS feature information, the parameters corresponding to the $N_{SS}$ and the MCS feature information as the LTF parameters.

In the embodiment of the present invention, further optionally, the quantity of multiplexed spatial streams includes a quantity of users in multi-user multiplexing and/or a quantity of data streams in single-user multiplexing.

It should be noted that, for a specific work process of each functional module in the transmission device provided by the embodiment of the present invention, reference may be made to a detailed description of a corresponding process in the method embodiment, and details are not described herein in the embodiment of the present invention.

According to the transmission device provided by the present invention, a first device performs, according to a frequency domain transform parameter included in acquired LTF parameters and an acquired start position I of allocated subcarriers, a frequency domain transform on an LTF basic sequence to obtain an LTF symbol, and performs, according to a time domain transform parameter included in the LTF parameters, a time domain transform on the LTF symbol to obtain an LTF sequence, then adds the obtained LTF sequence to a first data frame, and sends the first data frame to the transmission device, so that the transmission device determines the LTF basic sequence according to the LTF sequence and performs channel estimation according to the LTF basic sequence. In a process in which the first device generates the LTF sequence, spatial streams are distinguished in a frequency domain and a time domain, so that a quantity of LTF symbols included in the LTF sequence is reduced. Therefore, signaling overheads are reduced, and a delay in reception of a data field is reduced. In addition, because the quantity of LTF symbols included in the LTF sequence is reduced in the process of sending a data frame, a probability of crosstalk between symbols in the time domain is reduced, and therefore, a Doppler frequency shift effect is better resisted.

From the description of the foregoing implementation manners, a person skilled in the art may clearly understand, different variations may be made on a formula in each implementation manner without affecting a function of the formula, for example, round-down may be changed to (round-up minus 1), which is not further described in each implementation manner.

From the descriptions of the foregoing implementation manners, a person skilled in the art may clearly understand that, for ease and brevity of description, division of the foregoing functional modules is used only as an example for description. In an actual application, the foregoing functions can be allocated to different functional modules and implemented according to requirements, that is, an internal structure of an apparatus is divided into different functional modules to implement all or some of the functions described above.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

Figure 17A:
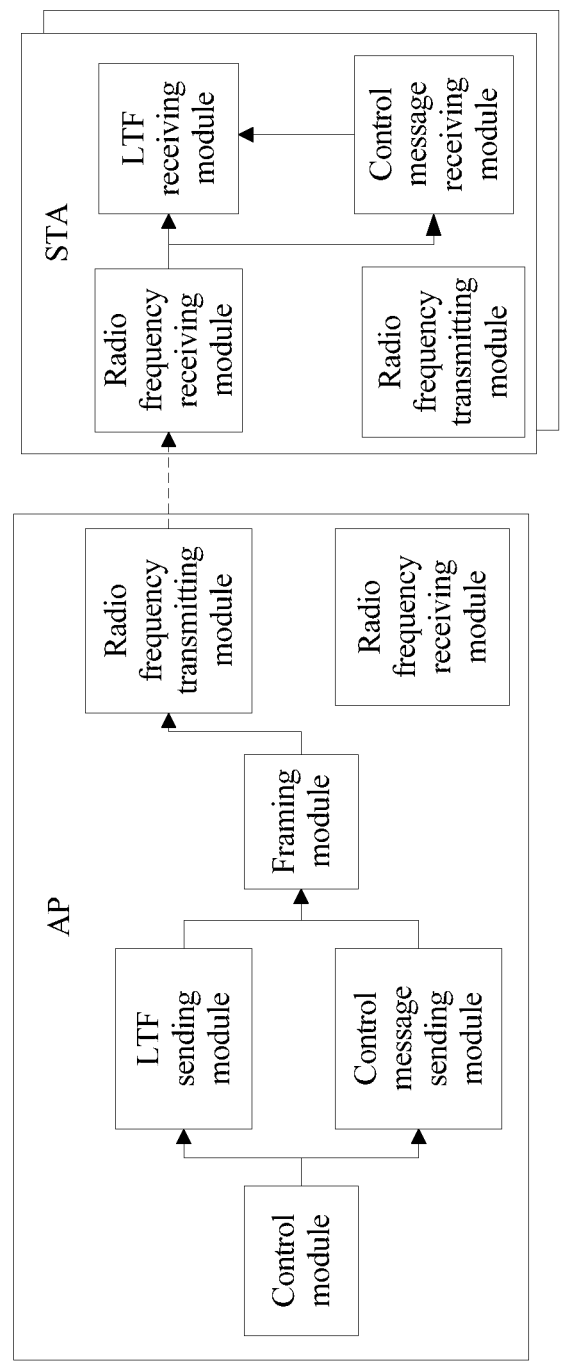
FIG. 17a is a schematic structural diagram of a system for sending a downlink signal according to an embodiment of the present invention.
Figure 17B:
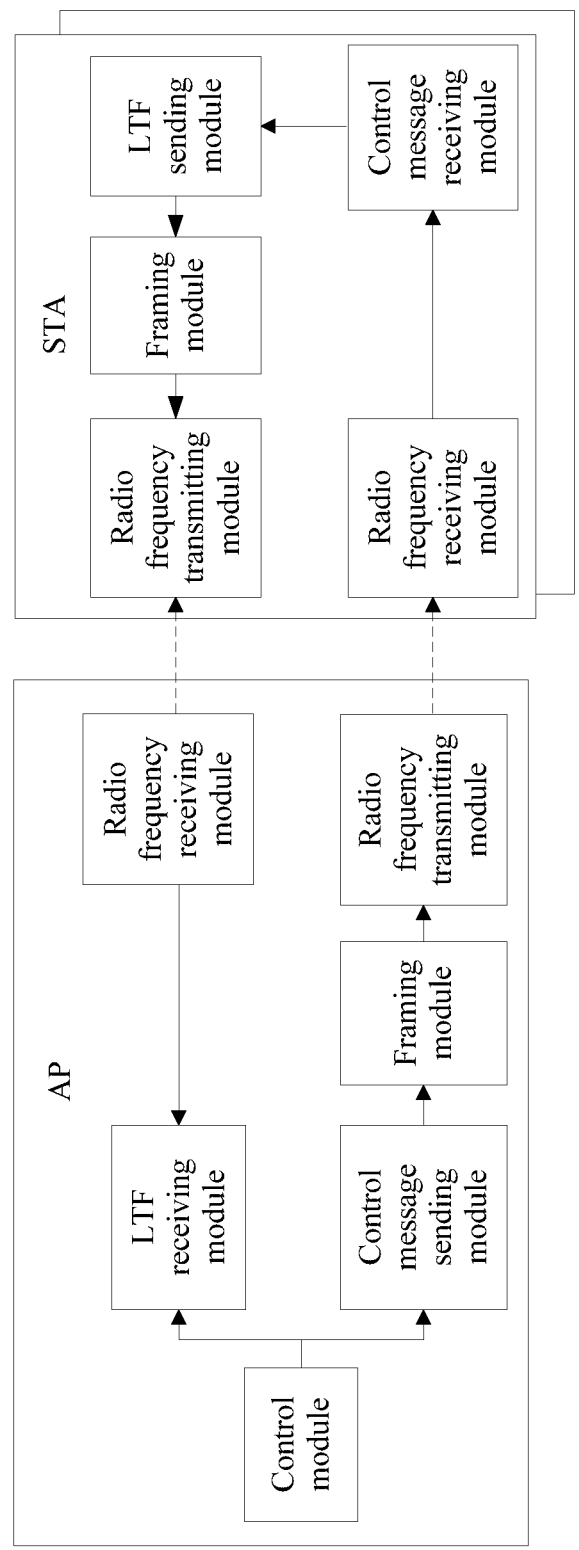
FIG. 17b is a schematic structural diagram of a system for sending an uplink signal according to an embodiment of the present invention.
Figure 18A:
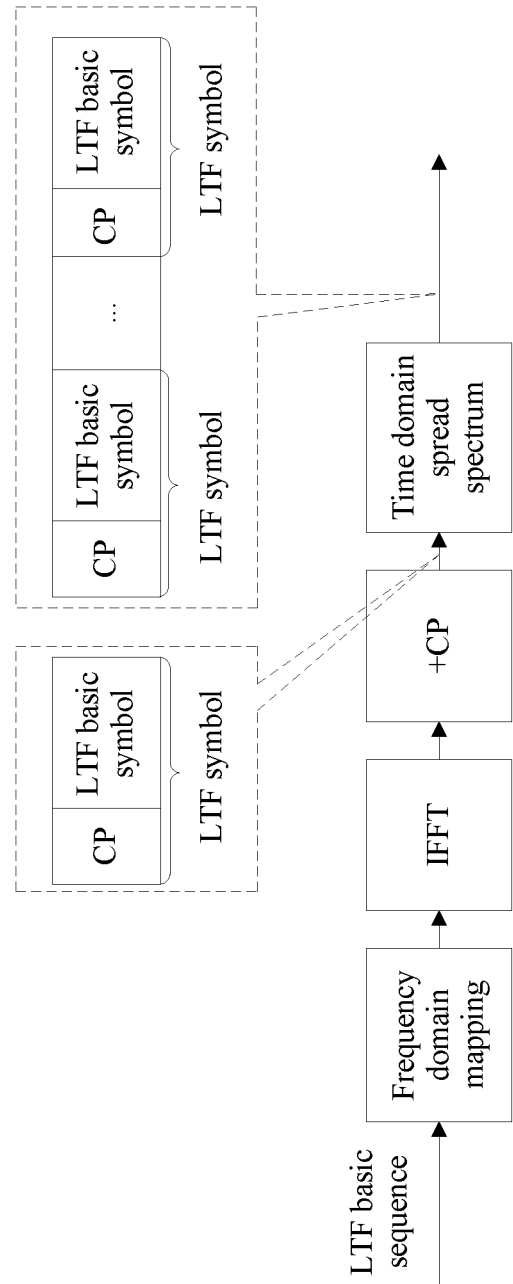
FIG. 18a is a specific schematic structural diagram of an LTF sending module according to an embodiment of the present invention.
Figure 18B:
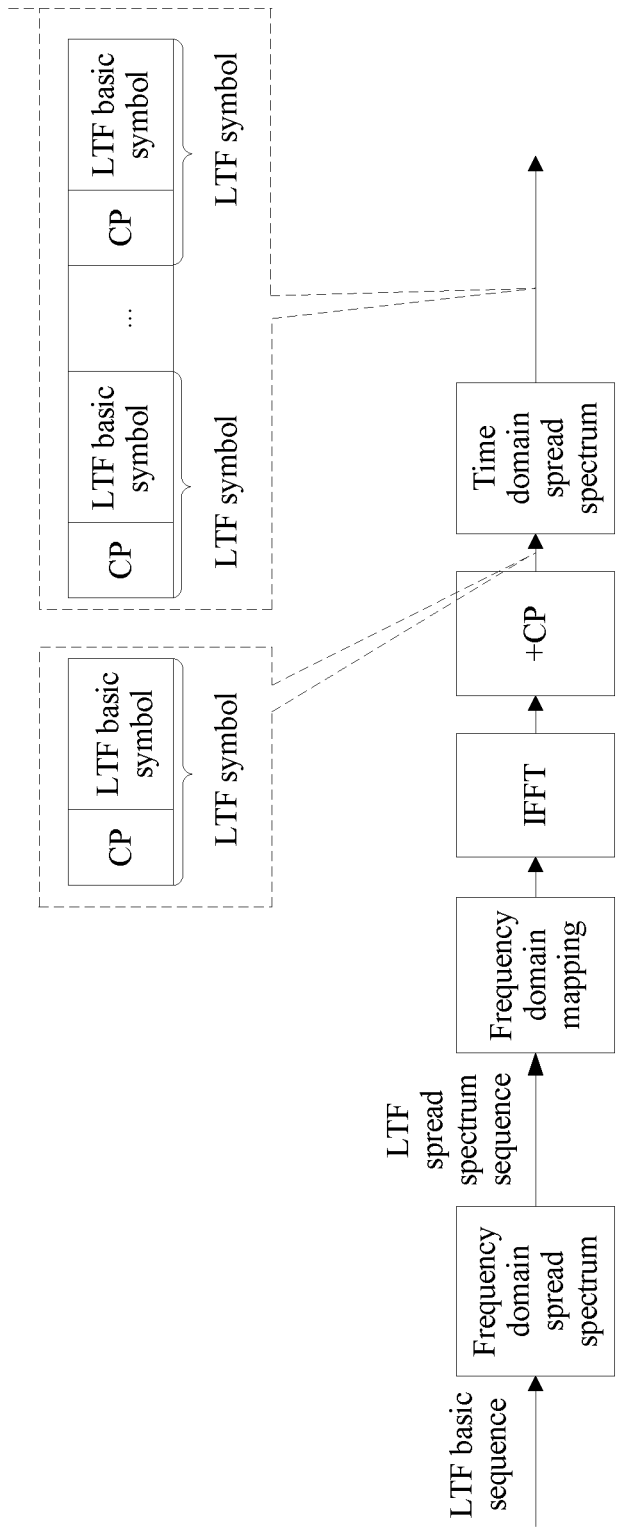
FIG. 18b is a specific schematic structural diagram of another LTF sending module according to an embodiment of the present invention.
Figure 19A:
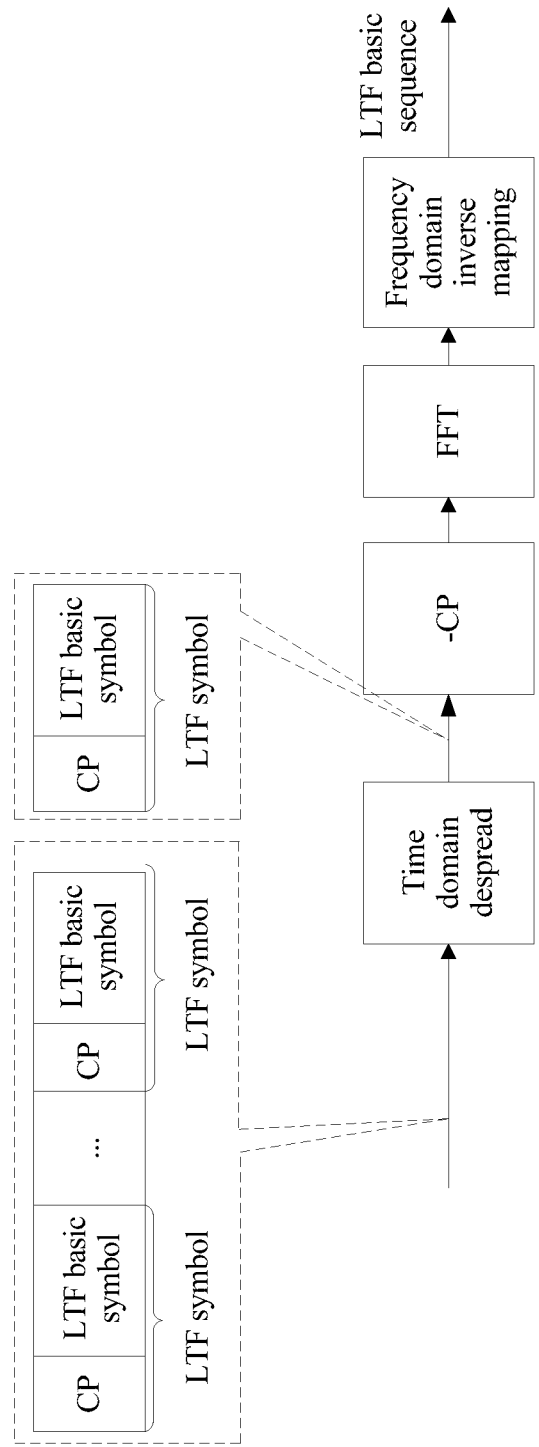
FIG. 19a is a specific schematic structural diagram of an LTF receiving module according to an embodiment of the present invention.
Figure 19B:
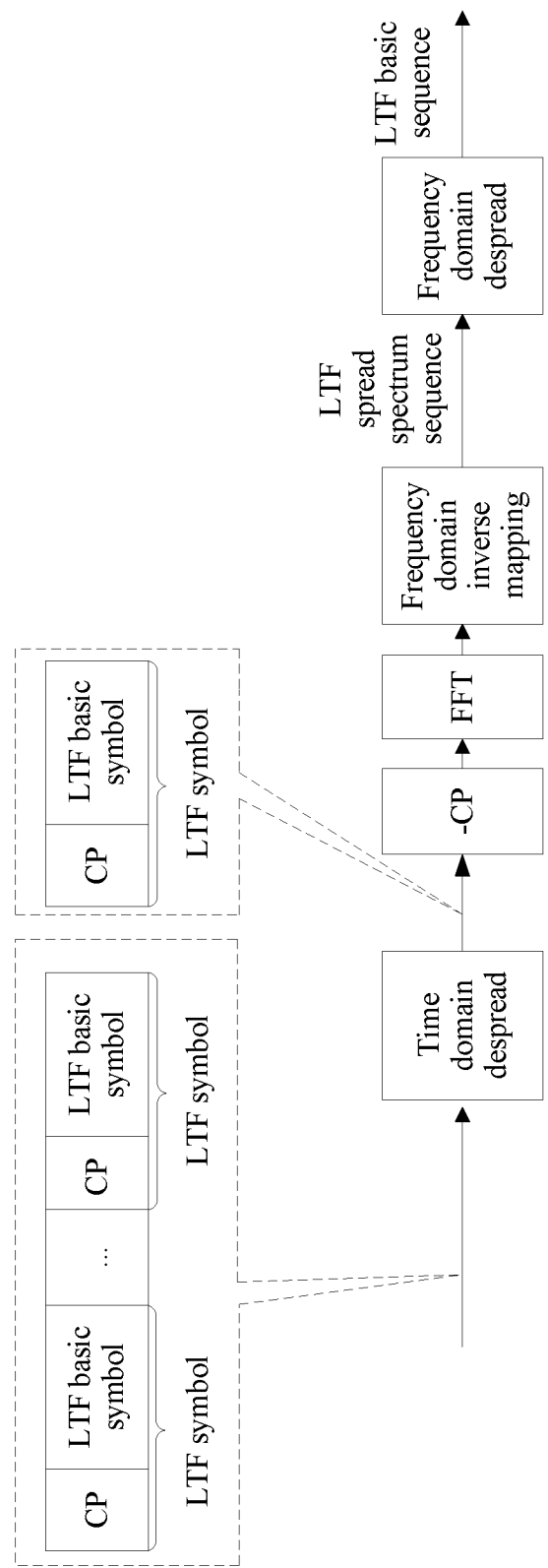
FIG. 19b is a specific schematic structural diagram of another LTF receiving module according to an embodiment of the present invention.

For example, reference may be made to a system for sending a downlink signal as shown in FIG. 17a, and a system for sending an uplink signal as shown in FIG. 17b. For a specific structure of an LTF sending module (LTF Transmitter), reference may be made to FIG. 18a and FIG. 18b. For a specific structure of an LTF receiving module (LTF Reception), reference may be made to FIG. 19a and FIG. 19b. For processes or operating principles of the LTF sending module and the LTF receiving module, reference may be made to the detailed description of corresponding content shown in FIG. 10, FIG. 13, and FIG. 14. Details are not described herein.

Referring to FIG. 17a and FIG. 17b, an AP or a STA in a WiFi system may include a control module to acquire CDM LTF parameters in a time domain and FDM/CDM LTF parameters in a frequency domain, where the LTF parameters are used to generate an LTF sequence. The AP and the STA share information about the LTF parameters, so that the LTF sequence is generated according to the LTF parameters acquired by the control module at a transmit end (the AP or the STA), and that a receive end (when the transmit end is the AP, the receive end is the STA; when the transmit end is the STA, the receive end is the AP) receives the LTF sequence according to the LTF parameters acquired by a control message receiving module (Control information reception). Channel estimation of multiple streams or multiple users is identified by using time domain and frequency domain resources.

Referring to FIG. 17a, for downlink SU-MIMO or MU-MIMO, at the AP end, a control module (Control Unit) designs or acquires LTF parameters, and an LTF sending module (LTF transmitter) generates an LTF sequence according to the designed or acquired LTF parameters. In addition, some designed or acquired parameters are placed in a SIG-A by a control message sending module (Control information transmitter), enter a framing module (Frame multiplexing), and constitute a packet frame with the generated LTF sequence and downlink data according to a frame structure, and a radio frequency transmitting module (TX) sends the packet frame to the STA. At the STA side, a radio frequency receiving module (RX) receives the packet frame, and a control message receiving module (Control information reception) receives information of the SIG-A, and extracts the designed or acquired parameters of the LTF sequence from the information. Then an LTF receiving module (LTF reception) distinguishes, according to the designed or acquired parameters of the LTF sequence, an LTF basic sequence corresponding to the receiving STA, and uses the LTF basic sequence to perform channel estimation and CFO estimation (where the performing channel estimation is optional).

Referring to FIG. 17b, using uplink MU-MIMO as an example, a control module (Control Unit) at the AP side needs to design or acquire LTF parameters of multiple users in a unified manner. An LTF transmitter generates an LTF sequence according to the designed or acquired LTF parameters. In addition, some designed or acquired parameters are placed in a SIG-A by a Control information transmitter, enter a Frame multiplexing module, and constitute a packet frame with downlink data according to a frame structure, and a TX sends the packet frame to the STA. At the STA side, an RX receives the data, and a Control information reception receives information of the SIG-A, and extracts the designed or acquired parameters of the LTF sequence from the information. Then an LTF transmitter module generates an LTF sequence of each STA according to the designed or acquired parameters of the LTF sequence. The LTF sequence enters a Frame multiplexing module, and constitutes a packet frame with uplink data according to a frame structure, and a TX sends the packet frame to the AP. At the AP, an LTF reception receives an LTF basic sequence of each STA according to the LTF parameters designed or acquired by the Control Unit, and uses the LTF basic sequence to perform channel estimation and CFO estimation (where the performing CFO estimation is optional).

In addition, for uplink SU-MIMO, the Control Unit and the Control information transmitter responsible for designing or acquiring the LTF parameters may also be included in the STA. In this case, the LTF parameters are designed or acquired by the STA according to a quantity of streams in SU-MIMO, instead of being designed or acquired by the AP and notified to the STA. Correspondingly, the Control information reception is included in the AP side, and is configured to extract, from the SIG-A, the designed or acquired parameters of the LTF sequence.

A person skilled in the art may understand that, the type mentioned in each implementation manner of the specification, included in various application scenarios in which different parameters for generating an LTF may be set, includes but is not limited to a quantity $N_{SS}$ of spatial streams, an environment type, or an MCS feature. Using the environment type only as an example, in addition to the mentioned indoor or outdoor, the environment type includes but is not limited to a dense area (such as a shopping mall, a court, or an office area), a non-dense area (such as a home), a remote area, or an urban area. In brief, as long as different parameters are used for different application scenarios when an LTF is generated, such practice falls within the scope of the implementation manner of the present invention.

A person skilled in the art may understand that, in a specific AP or STA, various possible variations may be made to the foregoing mapping relationship table according to an actual condition. For example, because the AP generally does not need to move and generally does not change if used in an application environment, only parameters of one or more types may be configured on the AP, where the parameters include at least frequency domain transform parameters that are different from those in the prior art, for example, a subcarrier quantity M for distinguishing spatial streams in LTF symbols included in an LTF sequence (referring to parameters in the type 2 in Tables 2, 3, and 3a, or parameters in the environment types 1 and 2 in Tables 4 and 5, or parameters in the environment type 1 in Table 5a, and referring to parameters in Tables 6, 7, 7a, and 7b). For another example, some STAs may configure, due to an unknown reason, only some types and corresponding parameters of the types mentioned in the implementation manner.

The mapping relationship table in each implementation manner is only an example of mapping relationship content. On the one hand, the mapping relationship table in each implementation manner may be combined when no contradiction or conflict occurs; on the other hand, a specific form or status stored in a specific AP or STA is not limited. For example, the AP or the STA may store parameters in Tables 6, 7, 7a, and 7b simultaneously, and select and use the parameters according to a requirement. For another example, a stored mapping relationship may also be a character string, or an arrangement for saving storage resources is made according to an actual requirement. For example, some particular parameters that do not change according to an application scenario are set as default parameters and do not need to be stored repeatedly, for example, parameters S in Tables 4, 5, and 5a. Alternatively, a value of a parameter is indicated by using a special indicator value to save storage resources. For example, in Table 4, for L, an indicator value 1 is used to indicate L=56, an indicator value 2 is used to indicate L=112, and an indicator value 3 is used to indicate L=224, and only three indicator values for L are required. As long as specific content in the mapping relationship table shown in each implementation manner is used when an LTF is generated, such practice falls within the scope of the implementation manner.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmission device, applied to a wireless local area network system using a multiple-input multiple-output (MIMO) technology, wherein the transmission device comprises:
   an acquiring unit, configured to:
      acquire a long training field (LTF) parameters, and
      acquire a start position I of allocated subcarriers,
      wherein the LTF parameters comprise a frequency domain transform parameter and a time domain transform parameter that are required for generating an LTF sequence;

a frequency domain transform unit, configured to perform, according to the frequency domain transform parameter and the start position I acquired by the acquiring unit, a frequency domain transform on an LTF basic sequence to obtain an LTF symbol;

a time domain transform unit, configured to perform, according to the time domain transform parameter acquired by the acquiring unit, a time domain transform on the LTF symbol obtained by the frequency domain transform unit to obtain the LTF sequence; and a sending unit, configured to:
    add the LTF sequence obtained by the time domain transform unit to a first data frame, and
    send the first data frame to a second device, so that the second device determines the LTF basic sequence according to the LTF sequence and performs channel estimation according to the LTF basic sequence, wherein the frequency domain transform parameter comprises a subcarrier quantity M for distinguishing spatial streams, a quantity L of elements in the LTF basic sequence, and a subcarrier quantity S; and the frequency domain transform unit comprises:
    a mapping module, configured to map, starting from the start position I at intervals of $\lfloor S/L \rfloor$ subcarriers, each element in the LTF basic sequence to a corresponding subcarrier to obtain a frequency domain LTF sequence, wherein $\lfloor\ \rfloor$ indicates round-down;
    an inverse transform module, configured to perform an S-point inverse fast Fourier transform (IFFT) transform on the frequency domain LTF sequence obtained by the mapping module to obtain an LTF basic symbol; and
    a generation module, configured to combine the LTF basic symbol obtained by the inverse transform module with a cyclic prefix (CP) to generate the LTF symbol.

2. The transmission device according to claim 1, wherein the time domain transform parameter comprises a quantity N of the LTF symbols comprised in the LTF sequence; and
    wherein the time domain transform unit is specifically configured to perform, according to N, spread spectrum processing on the LTF symbols to generate the LTF sequence.

3. The transmission device according to claim 1, wherein the transmission device is a station (STA), and the second device is an access point AP; and
    wherein the acquiring unit comprises:
        a receiving module, configured to receive a second data frame that carries indication information and that is sent by the second device, wherein the indication information is used to indicate the LTF parameters; and
        an acquiring module, configured to acquire the LTF parameters according to the indication information obtained by the receiving module and a preconfigured mapping relationship table.

4. A transmission device, applied to a wireless local area network system using a multiple-input multiple-output (MIMO) technology, wherein the transmission device comprises:
    an acquiring unit, configured to:
        acquire a long training field (LTF) parameters, and
        acquire a start position I of allocated subcarriers,
        wherein the LTF parameters comprise a frequency domain transform parameter and a time domain transform parameter that are required for generating an LTF sequence;
    a frequency domain transform unit, configured to perform, according to the frequency domain transform parameter and the start position I acquired by the acquiring unit, a frequency domain transform on an LTF basic sequence to obtain an LTF symbol;
    a time domain transform unit, configured to perform, according to the time domain transform parameter acquired by the acquiring unit, a time domain transform on the LTF symbol obtained by the frequency domain transform unit to obtain the LTF sequence; and
    a sending unit, configured to:
        add the LTF sequence obtained by the time domain transform unit to a first data frame, and
        send the first data frame to a second device, so that the second device determines the LTF basic sequence according to the LTF sequence and performs channel estimation according to the LTF basic sequence,
    wherein the frequency domain transform parameter comprises a subcarrier quantity M for distinguishing spatial streams, a quantity L of elements in the LTF basic sequence, and a subcarrier quantity S; and
    wherein the frequency domain transform unit comprises:
        a spread spectrum module, configured to perform, according to M, spread spectrum processing on each element in the LTF basic sequence to obtain an LTF spread spectrum sequence, wherein the LTF spread spectrum sequence comprises M*L elements;
        a mapping module, configured to map, starting from the start position I, each element in the LTF spread spectrum sequence obtained by the spread spectrum module to a corresponding subcarrier to obtain a frequency domain LTF sequence;
        an inverse transform module, configured to perform an S-point inverse fast Fourier transform (IFFT) transform on the frequency domain LTF sequence obtained by the mapping module to obtain an LTF basic symbol; and
        a generation module, configured to combine the LTF basic symbol obtained by the inverse transform module with a cyclic prefix (CP to generate the LTF symbol.

5. A transmission device, applied to a wireless local area network system using a multiple-input multiple-output (MIMO) technology, wherein the transmission device comprises:
    a receiving unit, configured to receive a first data frame that carries a long training field (LTF) sequence and that is sent by a first device;
    a processing unit, configured to:
        determine an LTF basic sequence according to the LTF sequence received by the receiving unit, and
        perform channel estimation according to the LTF basic sequence; and
    an acquiring unit, configured to, before the processing unit determines the LTF basic sequence according to the LTF sequence:
        acquire LTF parameters, and
        acquire a start position I of allocated subcarriers,
        wherein the LTF parameters comprise a frequency domain transform parameter and a time domain transform parameter that are required for generating the LTF sequence by the first device,
    wherein the processing unit comprises:
        a time domain inverse transform subunit, configured to perform, according to the time domain transform parameter acquired by the acquiring unit, a time domain inverse transform on the LTF sequence to obtain an LTF symbol; and a frequency domain inverse transform subunit, configured to perform, according to the frequency domain transform parameter and the start position I acquired by the acquiring unit, a frequency domain inverse transform on the LTF symbol obtained by the time domain inverse transform subunit to obtain the LTF basic sequence, wherein the frequency domain transform parameter comprises a subcarrier quantity M for distinguishing spatial streams, a quantity L of elements in the LTF basic sequence, and a subcarrier quantity S, wherein the frequency domain inverse transform subunit comprises:
   a determining module, configured to determine an LTF basic symbol according to the LTF symbol, wherein the LTF symbol comprises the LTF basic symbol and a cyclic prefix (CP);
   a transform module, configured to perform an S-point fast Fourier transform (FFT) transform on the LTF basic symbol obtained by the determining module to obtain a frequency domain LTF sequence; and
   an extraction module, configured to extract, starting from the start position I, at intervals of ⌊S/L⌋ subcarriers, the LTF basic sequence according to the frequency domain LTF sequence obtained by the transform module, wherein ⌊ ⌋ indicates round-down.

6. The transmission device according to claim 5, wherein the time domain transform parameter comprises a quantity N of the LTF symbols comprised in the LTF sequence; and
   wherein the time domain inverse transform subunit is specifically configured to perform, according to N, despread processing on the LTF sequence to obtain the LTF symbols.

7. A method for transmitting a data frame, applied to a wireless local area network system using a multiple-input multiple-output (MIMO) technology, wherein the method comprises:
   acquiring, by a first device, a long training field (LTF) parameters, and acquiring a start position I of allocated subcarriers, wherein the LTF parameters comprise a frequency domain transform parameter and a time domain transform parameter that are required for generating an LTF sequence;
   performing, according to the frequency domain transform parameter and the start position I, a frequency domain transform on an LTF basic sequence to obtain an LTF symbol;
   performing, according to the time domain transform parameter, a time domain transform on the LTF symbol to obtain the LTF sequence; and
   adding the LTF sequence to a first data frame, and sending the first data frame to a second device, so that the second device determines the LTF basic sequence according to the LTF sequence and performs channel estimation according to the LTF basic sequence,
   wherein the frequency domain transform parameter comprises a subcarrier quantity M for distinguishing spatial streams, a quantity L of elements in the LTF basic sequence, and a subcarrier quantity S;
   wherein the performing, according to the frequency domain transform parameter and the start position I, a frequency domain transform on an LTF basic sequence to obtain an LTF symbol, comprises:
   mapping, starting from the start position I, at intervals of ⌊S/L⌋ subcarriers, each element in the LTF basic sequence to a corresponding subcarrier to obtain a frequency domain LTF sequence, wherein ⌊ ⌋ indicates round-down;
   performing an S-point inverse fast Fourier transform (IFFT) transform on the frequency domain LTF sequence to obtain an LTF basic symbol; and
   combining the LTF basic symbol with a cyclic prefix (CP) to generate the LTF symbol.

8. The method according to claim 7, wherein the time domain transform parameter comprises a quantity N of the LTF symbols comprised in the LTF sequence; and
   wherein the performing, according to the time domain transform parameter, a time domain transform on the LTF symbol to obtain the LTF sequence, comprises:
   performing, according to N, spread spectrum processing on the LTF symbols to generate the LTF sequence.

9. A method for transmitting a data frame, applied to a wireless local area network system using a multiple-input multiple-output (MIMO) technology, wherein the method comprises:
   acquiring, by a first device, long training field LTF parameters, and acquiring a start position I of allocated subcarriers, wherein the LTF parameters comprise a frequency domain transform parameter and a time domain transform parameter that are required for generating an LTF sequence;
   performing, according to the frequency domain transform parameter and the start position L a frequency domain transform on an LTF basic sequence to obtain an LTF symbol;
   performing, according to the time domain transform parameter, a time domain transform on the LTF symbol to obtain the LTF sequence; and
   adding the LTF sequence to a first data frame, and sending the first data frame to a second device, so that the second device determines the LTF basic sequence according to the LTF sequence and performs channel estimation according to the LTF basic sequence,
   wherein the frequency domain transform parameter comprises a subcarrier quantity M for distinguishing spatial streams, a quantity L of elements in the LTF basic sequence, and a subcarrier quantity S; and
   the performing, according to the frequency domain transform parameter and the start position I, a frequency domain transform on an LTF basic sequence to obtain an LTF symbol, comprises:
   performing, according to M, spread spectrum processing on each element in the LTF basic sequence to obtain an LTF spread spectrum sequence, wherein the LTF spread spectrum sequence comprises M*L elements;
   mapping, starting from the start position I, each element in the LTF spread spectrum sequence to a corresponding subcarrier to obtain a frequency domain LTF sequence;
   performing an S-point IFFT transform on the frequency domain LTF sequence to obtain an LTF basic symbol; and
   combining the LTF basic symbol with a CP to generate the LTF symbol.

10. A method for transmitting a data frame, applied to a wireless local area network system using a multiple-input multiple-output (MIMO) technology, the method comprising:
   receiving, by a second device, a first data frame that carries a long training field LTF sequence and that is sent by a first device; and determining an LTF basic sequence according to the LTF sequence, and performing channel estimation according to the LTF basic sequence;

wherein, before the determining an LTF basic sequence according to the LTF sequence, the method further comprises:

acquiring LTF parameters, and acquiring a start position I of allocated subcarriers, wherein the LTF parameters comprise a frequency domain transform parameter and a time domain transform parameter that are required for generating the LTF sequence by the first device, wherein the determining an LTF basic sequence according to the LTF sequence comprises:

performing, according to the time domain transform parameter, a time domain inverse transform on the LTF sequence to obtain an LTF symbol; and performing, according to the frequency domain transform parameter and the start position L a frequency domain inverse transform on the LTF symbol to obtain the LTF basic sequence, wherein the frequency domain transform parameter comprises a subcarrier quantity M for distinguishing spatial streams, a quantity L of elements in the LTF basic sequence, and a subcarrier quantity S, and wherein the performing, according to the frequency domain transform parameter and the start position I, a frequency domain inverse transform on the LTF symbol to obtain the LTF basic sequence, comprises:

determining an LTF basic symbol according to the LTF symbol, wherein the LTF symbol comprises the LTF basic symbol and a cyclic prefix (CP);

performing an S-point fast Fourier transform (FFT) transform on the LTF basic symbol to obtain a frequency domain LTF sequence; and extracting, starting from the start position L at intervals of $\lfloor S/L \rfloor$ subcarriers, the LTF basic sequence according to the frequency domain LTF sequence, wherein $\lfloor \ \rfloor$ indicates round-down.

11. The method according to claim 10, wherein the time domain transform parameter comprises a quantity N of the LTF symbols comprised in the LTF sequence; and the performing, according to the time domain transform parameter, a time domain inverse transform on the LTF sequence to obtain an LTF symbol, comprises:

performing, according to N, despread processing on the LTF sequence to obtain the LTF symbols.

* * * * *

UNITED STATES PATENT AND TRADEMARK OFFICE
CERTIFICATE OF CORRECTION

PATENT NO. : 10,341,067 B2
APPLICATION NO. : 15/418462
DATED : July 2, 2019
INVENTOR(S) : Liu et al.

Page 1 of 1

It is certified that error appears in the above-identified patent and that said Letters Patent is hereby corrected as shown below:

In the Claims

Claim 1, Column 55, Line 24 "start position L" should read -- start position I --.

Claim 9, Column 58, Line 29 "start position L" should read -- start position I --.

Claim 10, Column 59, Line 19 "start position L" should read -- start position I --.

Claim 10, Column 60, Line 11 "start position L" should read -- start position I --.

Signed and Sealed this
Eighteenth Day of February, 2020

Andrei Iancu
*Director of the United States Patent and Trademark Office*